US012192732B2

(12) United States Patent
Wang et al.

(10) Patent No.: US 12,192,732 B2
(45) Date of Patent: Jan. 7, 2025

(54) ACOUSTIC DEVICES AND MAGNETIC CIRCUIT ASSEMBLIES THEREOF

(71) Applicant: SHENZHEN SHOKZ CO., LTD., Guangdong (CN)

(72) Inventors: Liwei Wang, Shenzhen (CN); Lei Zhang, Shenzhen (CN); Fengyun Liao, Shenzhen (CN); Xin Qi, Shenzhen (CN); Junjiang Fu, Shenzhen (CN); Shuailin Xie, Shenzhen (CN); Chaowu Li, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 288 days.

(21) Appl. No.: 17/814,228

(22) Filed: Jul. 21, 2022

(65) Prior Publication Data

US 2022/0360905 A1 Nov. 10, 2022

Related U.S. Application Data

(63) Continuation of application No. PCT/CN2021/088446, filed on Apr. 20, 2021.

(30) Foreign Application Priority Data

Apr. 29, 2020 (CN) ........................ 202010358223.0
Aug. 12, 2020 (CN) ........................ 202021689802.5

(51) Int. Cl.
*H04R 9/06* (2006.01)
*H04R 1/02* (2006.01)
(Continued)

(52) U.S. Cl.
CPC ............... *H04R 9/06* (2013.01); *H04R 1/025* (2013.01); *H04R 7/12* (2013.01); *H04R 7/18* (2013.01);
(Continued)

(58) Field of Classification Search
CPC . H04R 1/025; H04R 7/12; H04R 7/18; H04R 9/025; H04R 9/045; H04R 9/066;
(Continued)

(56) References Cited

U.S. PATENT DOCUMENTS 6,839,443 B2 * 1/2005 Fukuda .................. H04R 13/00 381/151
7,319,773 B2 * 1/2008 Lee ........................ H04B 1/385 381/326

(Continued)

FOREIGN PATENT DOCUMENTS

CN 201230371 Y 4/2009
CN 202435600 U 9/2012

(Continued)

OTHER PUBLICATIONS

The Office Action in Russian Application No. 2022120837 mailed on Feb. 3, 2023, 18 pages.

(Continued)

*Primary Examiner* — Huyen D Le
(74) *Attorney, Agent, or Firm* — METIS IP LLC

(57) ABSTRACT

The present disclosure provides an acoustic device. The acoustic device may include a shell including a first accommodation cavity, a speaker configured in the first accommodation cavity. The speaker may include one or more magnetic circuit assemblies, a voice coil, a vibration assembly, and a vibration transmission plate. The one or more magnetic circuit assemblies may form a magnetic gap. One end of the voice coil may be arranged in a magnetic gap, and another end of the voice coil may be connected with the vibration assembly. The vibration assembly may be connected with the vibration transmission plate, and the vibration transmission plate may be connected with the shell.

19 Claims, 34 Drawing Sheets

(51) Int. Cl.
*H04R 7/12* (2006.01)
*H04R 7/18* (2006.01)
*H04R 9/02* (2006.01)
*H04R 9/04* (2006.01)
*H04R 25/00* (2006.01)

(52) U.S. Cl.
CPC ............. *H04R 9/025* (2013.01); *H04R 9/045* (2013.01); *H04R 25/606* (2013.01); *H04R 2400/07* (2013.01); *H04R 2460/13* (2013.01)

(58) Field of Classification Search
CPC ........ H04R 9/06; H04R 25/606; H04R 11/02; H04R 2400/07; H04R 2460/13
See application file for complete search history.

(56) References Cited

U.S. PATENT DOCUMENTS

| | | | | |
|---|---|---|---|---|
| 2006/0165246 | A1 | 7/2006 | Lee et al. | |
| 2006/0262954 | A1* | 11/2006 | Lee | H04M 1/03 381/380 |
| 2011/0150264 | A1 | 6/2011 | Konuma | |
| 2019/0358225 | A1 | 11/2019 | Cai et al. | |
| 2020/0336824 | A1 | 10/2020 | Zheng et al. | |
| 2021/0092525 | A1 | 3/2021 | Zheng et al. | |
| 2021/0160633 | A1 | 5/2021 | Liao et al. | |
| 2022/0060834 | A1 | 2/2022 | Zhang et al. | |
| 2022/0248140 | A1 | 8/2022 | Zhang et al. | |

FOREIGN PATENT DOCUMENTS

| | | | |
|---|---|---|---|
| CN | 104936108 | A | 9/2015 |
| CN | 207995381 | U | 10/2018 |
| CN | 109511043 | A | 3/2019 |
| CN | 110730410 | A | 1/2020 |
| JP | S55168337 | U | 12/1980 |
| JP | S6399700 | A | 4/1988 |
| JP | 2016116177 | A | 6/2016 |
| JP | 2018186572 | A | 11/2018 |
| WO | 2004032566 | A1 | 4/2004 |
| WO | 2008123667 | A1 | 10/2008 |

OTHER PUBLICATIONS

International Search Report in PCT/CN2021/088446 mailed on Jul. 12, 2021, 6 pages.
Notice of Reasons for Rejection in Japanese Application No. 2022-557173 mailed on Oct. 16, 2023, 16 pages.
The Extended European Search Report in European Application No. 21795695.2 mailed on Jun. 12, 2023, 10 pages.

* cited by examiner

ACOUSTIC DEVICES AND MAGNETIC CIRCUIT ASSEMBLIES THEREOF

CROSS-REFERENCE TO RELATED APPLICATIONS

This application is a continuation of International Application No. PCT/CN2021/088446, filed on Apr. 20, 2021, which claims priority of Chinese Patent Application No. 202010358223.0, filed on Apr. 29, 2020 and Chinese Patent Application No. 202021689802.5, filled on Aug. 12, 2020, the contents of each of which are entirely incorporated herein by reference.

TECHNICAL FIELD

The present disclosure involves the field of acoustic technology and, in particular, relates to a bone conduction acoustic device.

BACKGROUND

Bone conduction is a sound conduction mode that may transform sounds to mechanic vibrations in different frequencies and transmit sound through human bones and tissues (such as the skull, the bone labyrinth, inner ear lymph liquid, spiral organ, auditory nerve, auditory center). A bone conduction acoustic device (such as a bone conduction headphone) may be clinging to the bone, and receive voices through the bone conduction technique, and sound waves may be transmitted directly through the bone to the auditory nerve, so as to keep the ears open and do no harm to the eardrum. The bone conduction technique may be widely applied to different scenes, such as hearing aids. As the vocal quality of the bone conduction acoustic device may directly affect the user's hearing experience, improving sound quality is particularly important for the bone conduction acoustic device.

SUMMARY

The present disclosure involves an acoustic device. The acoustic device may include: a shell including a first accommodation cavity; a speaker configured in the first accommodation cavity, the speaker including: one or more magnetic circuit assemblies, a voice coil, a vibration assembly, and a vibration transmission plate; the magnetic circuit assembly forming a magnetic gap; one end of the voice coil being configured in the magnetic gap, and another end of the voice coil being connected with the vibration transmission assembly, the vibration assembly being connected with the vibration transmission plate, the vibration transmission plate being connected with the shell.

In some embodiments, the vibration assembly may include an inner support, an outer support, and a vibration diaphragm; another end of the voice coil may be connected with the inner support; one end of the outer support may be physically connected with both sides of the one or more magnetic circuit assemblies; the vibration diaphragm may be physically connected with the inner support and the outer support to limit a relative movement of the inner support and the outer support in a first direction; the first direction being a radial direction of the accommodation cavity; at least one of the inner support, the outer support, or the vibration diaphragm may be connected with the vibration transmission plate to transmit vibration to the vibration transmission plate.

In some embodiments, the outer support and the inner support may be movably connected with the vibration diaphragm to limit the relative movement of the outer support and the inner support in the first direction, allowing a movement of the inner support and the vibration diaphragm relative to the outer support in a second direction; the second direction being an extension direction of the inner support and the outer support.

In some embodiments, a first convex column may be configured on another end of the outer support, the vibration diaphragm has a first through hole, the first convex column movably connects the vibration diaphragm through the first through hole.

In some embodiments, one end of the inner support may be configured with a second convex column, the vibration diaphragm has a second through hole, the second convex column movably connects the vibration diaphragm through the second through hole.

In some embodiments, the speaker may further include an elastic shock absorber, which is arranged between the vibration transmission plate and the one end of the inner support to damp vibration of the inner support in the second direction.

In some embodiments, the second convex column may include a first column section and a second column section physically connected with the first column section, the second column section may be configured above the first column section; the first column section may be configured to pass through the second through hole, the second column may be inserted in the vibration transmission plate; the elastic shock absorber may have a third through hole, the elastic shock absorber may be sleeved on the second column section through the third through hole, and may be supported on the first column section.

In some embodiments, the device may further include a protection element; the protection element includes a fitting part, an accommodation part and a supporting part, and the fitting part and the accommodation part may form a second accommodation cavity; the vibration transmission plate may be configured in the second accommodation cavity, the fitting part may be fitted on an outer end surface of the vibration transmission plate, the supporting part may be connected with the second accommodation cavity, and arranged above the shell.

In some embodiments, an inner wall of the shell may be configured with an annular bearing platform to support the annular supporting part and the elastic shock absorber.

In some embodiments, the one or more magnetic circuit assemblies may include a set of magnetic assemblies and a magnetic cover; the magnetic conduction cover includes a cover bottom, a cover side, and a cylinder groove, the cylinder groove may be formed by the bottom of the cover and the side of the cover; the set of magnetic assemblies may be configured in the cylinder groove, and form the magnetic gap with the magnetic conduction cover.

In some embodiments, the device may further include a fixed part configured to fix the magnetic assemblies set at the cover bottom; the fixed part includes a bolt and a nut, and the bolt passes through the magnetic assemblies set in sequence and passes through the bottom of the cover to fix the magnetic elements set and the bottom of the cover through a screw connection.

In some embodiments, the inner support may form a lid slot, a portion of the magnetic elements set partly extends into the lid slot, the outer support may be arranged in a cylindrical shape.

In some embodiments, the one or more magnetic circuit assemblies may include a first magnetic circuit assembly and a second magnetic circuit assembly, the second magnetic circuit assembly may surround the first magnetic circuit assembly to form the magnetic gap; the first magnetic circuit assembly may include a first magnetic assembly and a second magnetic assembly, a magnetic field strength of a total magnetic field generated by the magnetic circuit assembly in the magnetic gap may be greater than a magnetic field strength of the first magnetic assembly or the second magnetic assembly in the magnetic gap.

In some embodiments, an angle between magnetization directions of the first magnetic assembly and the second magnetic assembly may be between 150° and 180°.

In some embodiments, the magnetization directions of the first magnetic element and the second magnetic element may be opposite.

In some embodiments, the magnetization directions of the first magnetic element and the second magnetic element may both be perpendicular to or parallel with a vibration direction of the voice coil in the magnetic gap.

In some embodiments, the second magnetic circuit assembly may include a third magnetic assembly, the first magnetic circuit assembly may include a first magnetic conduction element; the first magnetic conduction element may be arranged between the first magnetic element and the second magnetic element, at least a portion of the third magnetic element may surround the first magnetic element and the second magnetic element.

In some embodiments, a magnetization direction of the first magnetic element and a magnetization direction of the second magnetic element may be perpendicular to a connection surface of the first magnetic element and the first magnetic conduction element, and the magnetization directions of the first magnetic element and the second magnetic element may be opposite.

In some embodiments, an angle between a magnetization direction of the third magnetic assembly and a magnetization direction of the first magnetic element or the second magnetic element may be between 60° and 120°.

In some embodiments, an angle between a magnetization direction of the third magnetic assembly and a magnetization direction of the first magnetic element or the second magnetic element falls between 0° and 30°.

In some embodiments, the second magnetic assembly may include a first magnetic conduction element and the first magnetic assembly may include a second magnetic conduction element; the second magnetic conduction element may be configured between the first magnetic element and the second magnetic element; at least a portion of the first magnetic conduction element may surround the first magnetic element and the second magnetic element.

In some embodiments, a magnetization direction of the first magnetic element and a magnetization direction of the second magnetic element may be perpendicular to a connection surface of the first magnetic assembly and the second magnetic conduction element, and the magnetization direction of the first magnetic element and the magnetization direction of the second magnetic element may be opposite.

In some embodiments, the second magnetic conduction element surrounds the first magnetic element, the first magnetic element may surround the second magnetic element.

In some embodiments, an upper surface of the second magnetic conduction element may be connected with a lower surface of the first magnetic element, a lower surface of the second magnetic conduction element may be connected with an upper surface of the second magnetic element.

In some embodiments, the one or more magnetic circuit assemblies may include a first magnetic circuit assembly and a second magnetic circuit assembly, the second magnetic circuit assembly may surround the first magnetic circuit assembly to form the magnetic gap; the first magnetic circuit assembly may include a first magnetic element and the second magnetic circuit assembly may include a first magnetic conduction element; at least a portion of the first magnetic element surrounds the first magnetic element; a magnetization direction of the first magnetic element may point to an outside area of the first magnetic element from a central area of the first magnetic element, or point to the first magnetic element from the outside area of the first magnetic element.

In some embodiments, the one or more magnetic circuit assemblies may include the first magnetic circuit assembly and the second magnetic circuit assembly, the second magnetic circuit assembly may surround the first magnetic circuit assembly to form the magnetic gap; the first magnetic circuit assembly may include the first magnetic element and the second magnetic circuit assembly, which includes the second magnetic element; at least a portion of the second magnetic element may surround the first magnetic element; the magnetization direction of the first magnetic element may point to the outside area of the first magnetic element from the central area of the first magnetic element, or point to the first magnetic element from the outside area of the first magnetic element.

In some embodiments, a magnetization direction of the second magnetic element may point to an inner ring of the second magnetic element from an outer ring of the second magnetic element, or point to the inner ring of the second magnetic element from the outer ring of the second magnetic element.

Some additional features of the present disclosure may be explained in the following description. For those skilled in the art, some additional features of the present disclosure may be obvious through the understanding of the manufacturing or operation of the embodiments or through checking the following descriptions and corresponding drawings.

BRIEF DESCRIPTION OF THE DRAWINGS

The drawings described herein are used to provide further understanding of the present disclosure and form a part of the present disclosure. The embodiments and descriptions of the present disclosure are for illustration only and do not constitute a limitation to the present disclosure. In each drawing, the same number denotes the same structure, wherein.

DETAILED DESCRIPTION

Figure 1:
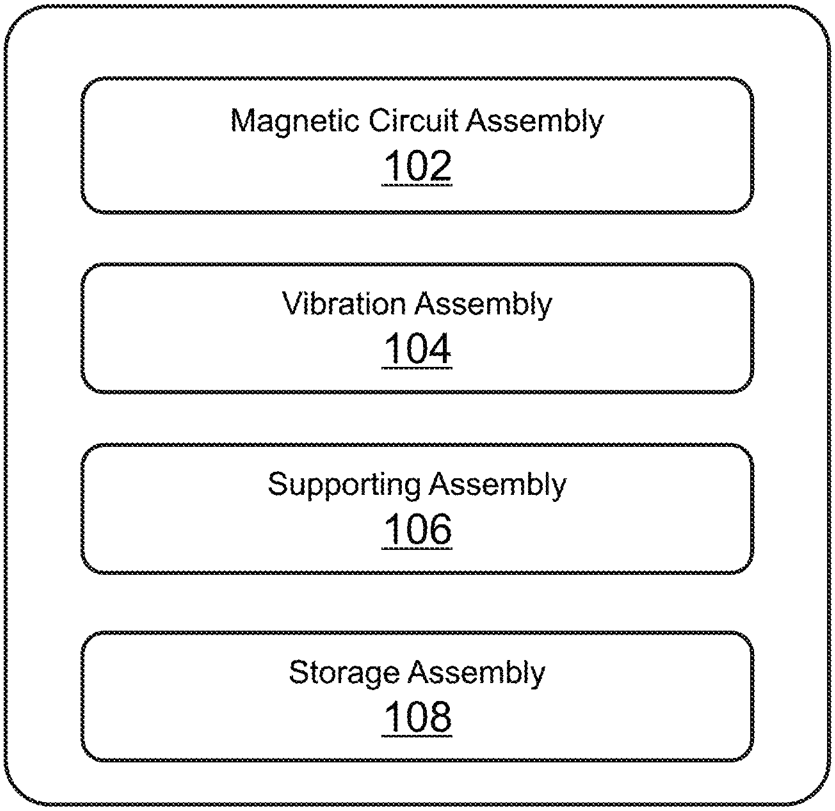
FIG. 1 is a schematic diagram illustrating an exemplary acoustic device according to some embodiments of the present disclosure.

In order to illustrate technical solutions of the embodiments of the present disclosure, a brief introduction regarding the drawings used to describe the embodiments is provided below. Obviously, the drawings described below are merely some examples or embodiments of the present disclosure. Those having ordinary skills in the art, without further creative efforts, may apply the present disclosure to other similar scenarios according to these drawings. It should be understood that the exemplary embodiments are provided merely for better comprehension and application of the present disclosure by those skilled in the art, and not intended to limit the scope of the present disclosure. Unless obvious according to the context or illustrated specifically, the same numeral in the drawings refers to the same structure or operation.

The terminology used herein is for the purpose of describing particular embodiments only and is not intended to be limiting. As used herein, the singular forms "a," "an," and "the" may be intended to include the plural forms as well, unless the context clearly indicates otherwise. It will be further understood that the terms "comprise," and "include," when used in this specification, specify the presence of stated operations and elements, but do not preclude the presence or addition of one or more other operations and elements. The term "one embodiment" represents "at least one embodiment; term "another embodiment" represents "at least one other embodiment". Relative definitions of other terms will be given in the following descriptions.

In the following, without loss of generality, the description of "bone conduction speaker" or "bone conduction headset" will be used when describing the bone conduction related technologies in the present disclosure. This description may only be a form of bone conduction application. For those skilled in the art, "speaker" or "headphone" may further be replaced with other similar words, such as "player", "hearing aid", or the like. In fact, the various implementations of the present disclosure may be easily applied to other non-speaker-type hearing devices. For example, for those skilled in the art, after understanding the basic principle of bone conduction speaker, it is possible to make various modifications and changes in the form and details of the specific means and steps of implementing bone conduction speaker without departing from this principle. In particular, an ambient sound pickup and processing function may be added to a bone conduction speaker to enable the bone conduction speaker to implement the function of a hearing aid. For example, microphone and other speakers may pick up the sound of the surrounding environment of the user/wearer. Under a certain algorithm, the processed sound (or the electrical signal generated) may be transmitted to the bone conduction speaker. That is, the bone conduction speakers may be modified to pick up the environmental sound, and pass the sound to the user/wearer through the bone conduction speaker after a certain signal processing, so as to achieve the function of a bone conduction hearing aid. As an example, the algorithm mentioned here may include one or any combinations of noise elimination, automatic gain control, sound feedback suppression, wide dynamic range compression, active environmental recognition, active noise resistance, directional treatment, tinnitus treatment, multi-channel wide dynamic range compression, active howling suppression, volume control.

In some embodiments, an acoustic device may be a device with acoustic output ability. For example, the acoustic device may include a hearing aid, a listening bracelet, headphones, a speaker, and smart glasses, etc. The hearing aid may be a small microphone configured to amplify the sound that was originally inaudible, and then send the sound to the auditory center of the brain based on the residual hearing of the hearing-impaired person. In some embodiments, the hearing aid may use the ear canal to transmit sound. However, when the low frequency of the hearing-impaired person is poor or the overall hearing loss is heavier, the way of sound transmission through the ear canal may have a limited improvement in the hearing effect of the hearing-impaired person.

In some embodiments, the acoustic device may include a bone conduction headphone. The bone conduction headphone may transfer audio into mechanical vibrations with different frequencies, and then transmit mechanical vibrations to the hearing nerves by using human bones as medium for transmitting mechanical vibrations. In this way, users may receive sound without passing through the ear's external auditory canal and tympanic membrane.

FIG. 1 is a schematic diagram illustrating an exemplary acoustic device according to some embodiments of the present disclosure. As shown in FIG. 1, an acoustic device 100 (such as a bone conduction speaker, a bone conduction headphone, etc.) may include a magnetic circuit assembly 102, a vibration assembly 104, a supporting assembly 106, and a storage assembly 108.

The magnetic circuit assembly 102 may provide a magnetic field. The magnetic field may be used to transfer signals containing sound information into vibration signals. In some embodiments, the sound information may include a video with a specific data format, an audio file, or data or a file that could be transferred into sounds through a specific way. The signals containing sound information may come from the storage assembly 108 of the acoustic device 100 itself, or from an information generation, storage, or transformation systems outside the acoustic device 100. The signals containing sound information may include an electrical signal, a light signal, a magnetic signal, a mechanical signal, or the like, or a combination thereof. The signals containing sound information may come from one single signal source or a plurality of signal sources. The plurality of signal sources may be related or unrelated. In some embodiments, the acoustic device 100 may obtain the signals containing sound information in a variety of ways. The signals may be obtained through a wired connection or a wireless connection, and may be obtained in real-time or delayed. For example, the acoustic device 100 may receive an electrical signal containing sound information through a wired or wireless connection, or may obtain data directly from the storage medium (e.g., the storage assembly 108) to generate the sound signals. As another example, a bone-conduction hearing aid may include an assembly having a sound collection function. By picking up the sound in the environment, and transferring the mechanic vibrations of the sound into an electrical signal, the electrical signal that meets a specific requirement after being processed through an amplifier may be obtained. In some embodiments, the wired connection may include a metal cable, an optical cable, or a mixed cable of a metal cable and an optical cable, such as a coaxial cable, a communication cable, a soft cable, a spiral cable, a non-metallic sheathed cable, a metal sheathed cable, a multicore cable, a twisted-pair cable, a ribbon cable, a shield cable, a telecommunications cable, a duplex cable, a twin-lead cable, etc., or a combination thereof. The examples described above are only used for the purpose of illustration, the media of the wired connection may be in other forms, such as other transmission carriers of electrical signals or optical signals.

The wireless connection may include radio communication, free space optical communication, sound communication, and electromagnetic induction, etc. The radio communication may include IEEE802.11 series standards, IEEE802.15 series standards (such as Bluetooth technology and Zigbee Technology, etc.), the first generation of mobile communication technology, the second generation of mobile communication technology (such as FDMA, TDMA, SDMA, CDMA, and SSMA, etc.), general packet radio service technology, the third generation of mobile communication technology (such as CDMA2000, WCDMA, TD-SCDMA, and WIMAX, etc.), the fourth generation mobile communication technology (such TD-LTE and FDD-LTE, etc.), the satellite communication (such as GPS technology, etc.), the near-field communication (NFC), and other technologies that run in ISM frequency bands (such as 2.4 GHz, etc.). The free space optical communication may include visible light, infrared signals, etc. The sound communication may include sound waves, ultrasound signals, etc. The electromagnetic induction may include near-field communication technology, etc. The examples described above are only used for the purpose of illustration, the media of wired connection may be in other forms, such as Z-wave technology, other rechargeable civil radio frequency bands, and military radio frequency bands. For example, as some application scenarios of the present technology, the acoustic device 100 may obtain the signals containing sound information from other devices through Bluetooth technology.

The vibration assembly 104 may generate mechanical vibrations. The generation of the vibrations may be accompanied by the transformation of energy, the acoustic device 100 may use the specific magnetic circuit assembly 102 and vibration assembly 104 to transfer the signals containing sound into mechanical vibrations. The transformation process may include the coexistence and transformation of a variety of different types of energy. For example, the electrical signals may be directly transformed into the mechanical vibrations through a transducer to generate sound. As another example, the sound information may be contained in optical signals, and a specific transducer may accomplish the process of transforming the optical signals to vibration signals. Other energy types that may be coexisted and transformed in the working process of the transducer may include thermal energy, magnetic field energy, etc. The energy transformation manner of the transducer may include a moving coil manner, an electrostatic manner, a piezoelectric manner, a moving iron manner, a pneumatic manner, an electromagnetic manner, etc. The frequency response range and sound quality of the acoustic device 100 may be affected by the vibration assembly 104. For example, in a moving coil transducer, the vibration assembly 104 may include a wound columnar voice coil and a vibration body (e.g., a vibration plate or a vibration diaphragm), the columnar voice coil may drive the vibration body to vibrate and make a sound in the magnetic field in the effect of the signal current. The expansion and contraction of the material of the vibration body, the deformation of the wrinkles, the size, the shape and the fixing manner, the magnetic density of a magnetic field, etc., may cause a huge impact on the sound quality of the acoustic device 100. The vibration body in the vibration assembly 104 may be a mirror-symmetrical structure, a central symmetrical structure, or an asymmetric structure. The vibration body may be provided with discontinuous hole-like structures to make the vibration body produce greater displacement, so that the speaker may achieve higher sensitivity, thereby enhancing the output power of the vibration and sound. The vibration body may be a torus structure, and a plurality of rods converging toward the center may be arranged in the vibration body, and the number of rods may be two or more.

The support assembly 106 may support the magnetic circuit assembly 102, the vibration assembly 104 and/or the storage assembly 108. The support assembly 106 may include one or more shells and one or more connectors. The one or more shells may form an accommodation space for accommodating the magnetic circuit assembly 102, the vibration assembly 104, and/or the storage assembly 108.

The one or more connectors may connect the shells and the magnetic circuit assembly 102, the vibration assembly 104 and/or the storage assembly 108.

The storage assembly 108 may store signals containing sound information. In some embodiments, the storage assembly 108 may include one or more storage devices. The storage devices may include a storage device on a storage system, such as direct attached storage, network attached storage, and storage area network, etc. The storage devices may have different types, such as a solid-state storage device (solid-state hard disk, solid-state hybrid hard disk, etc.), a mechanical hard disk, USB flash memory, a memory stick, a memory card (such as CF, SD, etc.), other drivers (such as CD, DVD, HD DVD, Blu-ray, etc.), random memory (RAM) and only read memory (ROM). The RAM may include a decimal counter, a selector tube, delay line memory, a Williams tube, dynamic random memories (DRAM), static random memories (SRAM), thyristor RAMs (T-RAM), and zero-capacitance RAMs (Z-RAM), etc.; the ROM may include magnetic bubble memories, magnetic button line memories, film memories, magnetic plating wire memory, core entrapments, drum memories, CD-ROMs, hard disks, tapes, early NVRAM non-volatile memories, phase change memories, magneto resistive random access memories, ferroelectric random access memories, non-volatile SRAM memories, flash memories, electronic erasable rewritable read only memories, erasable programmable read-only memories, programmable column ROMs, on-screen heap read memories, floating link gate random access memories, nano random access memories, track memories, variable resistance memories, and programmable metalized units, etc. The storage devices/storage units mentioned above are some examples listed and the storage devices that the storage devices/storage units may use is not limited to this.

The above description of the structure of the acoustic device is only provided for the purpose of illustration, and it should not be considered as the only feasible embodiment. Obviously, for those skilled in the art, after understanding the basic principles of the acoustic device, various modifications and changes may be made to the details of the specific methods and operations on implementing the acoustic device under the situation of not departing from the principles. However, these modifications and changes are still within the scope of the above description. For example, the acoustic device 100 may include one or more processors, the processors may perform one or more sound signal processing algorithms. The sound signal processing algorithms may correct or strengthen the sound signals. For example, the sound signal processing algorithms may be used in noise reduction, sound feedback suppression, wide dynamic range compression, automatic gain control, active environmental recognition, active noise cancellation, orientation processing, tinnitus treatment, multi-channel wide dynamic range compression, active scream suppression, volume control, or other similar processing, or any combinations thereof, these amendments and changes are still within the protection range of the claims of the present disclosure. As another example, the acoustic device 100 may include one or more sensors, such as temperature sensors, humidity sensors, speed sensors, displacement sensors, etc. The sensors may collect user information or environmental information. For another example, the storage assembly 108 may not be necessary, and removed from the acoustic device 100.

Figure 2:
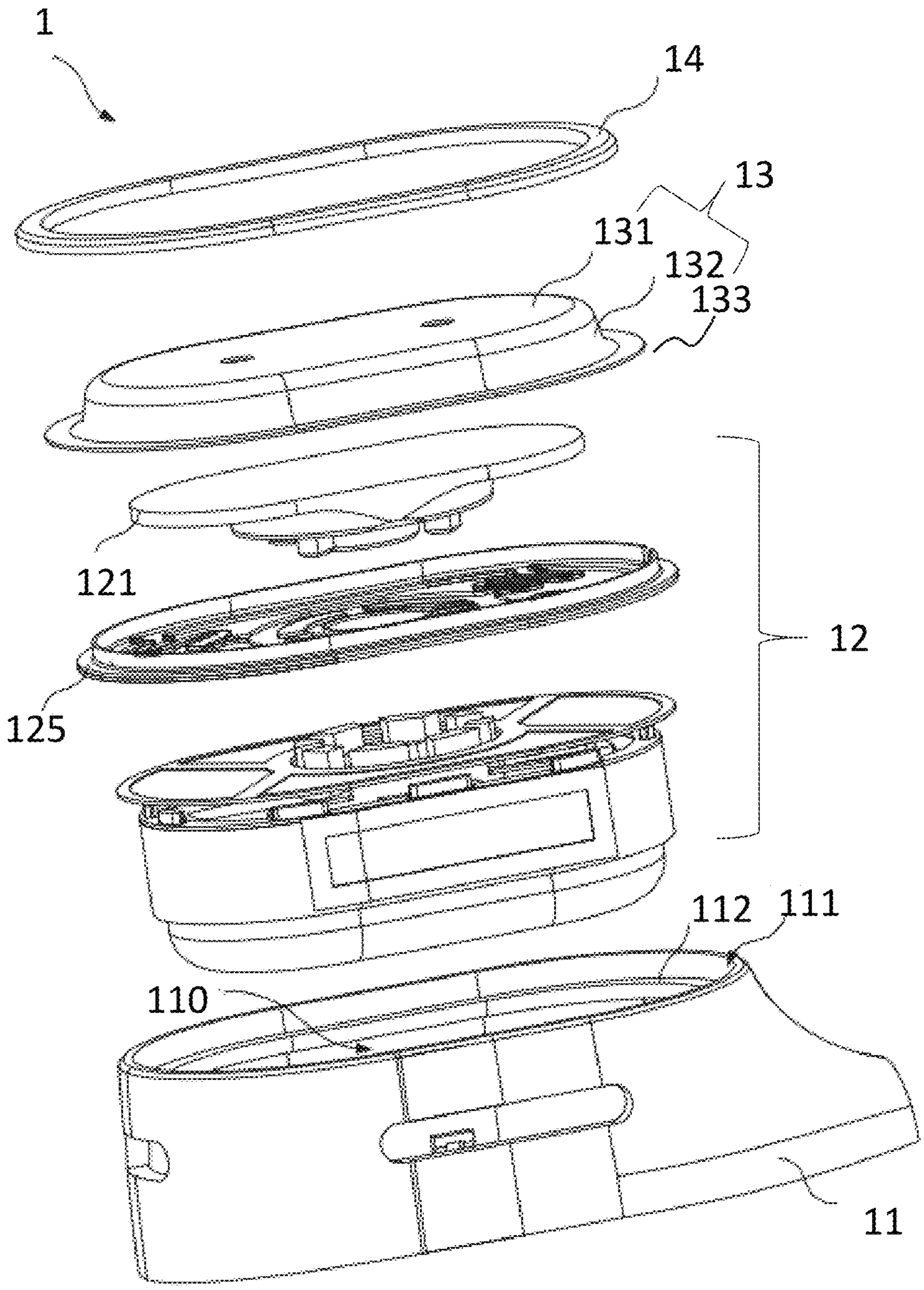
FIG. 2 is a schematic diagram illustrating an exemplary acoustic device according to some embodiments of the present disclosure.

FIG. 2 is a schematic diagram illustrating an exemplary acoustic device according to some embodiments of the present disclosure. As shown in FIG. 2, an acoustics device 1 may include a shell 11, a speaker assembly 12, and a protective element 13. The speaker assembly 12 may be arranged in the shell 11. The protective element 13 may support the shell 11 for protecting the speaker assembly 12.

As shown in FIG. 2, the shell 11 may have an accommodation cavity 110 (also called a first accommodation cavity), which is used to accommodate the speaker assembly 12, that is, the speaker assembly 12 may be arranged in the accommodation cavity 110. In some embodiments, when the acoustic device 1 is used, the side of the shell 11 facing the opening end 111 of the accommodation cavity 110 may attach to the user's head, the mechanical vibration generated by the speaker assembly 12 may be transferred towards the head of the user through the side of the shell facing the opening end 111.

In some embodiments, the inner wall of the shell 11 may be arranged with an annular bearing platform 112, and the inner wall of the shell 11 refers to the inner wall of the accommodation cavity 110 of the shell. In some embodiments, the annular bearing platform 112 may be arranged on the inner wall at the position near the opening end 111. In some embodiments, the annular bearing platform 112 may be arranged on the inner wall of the shell above the speaker assembly 12. The annular bearing platform 112 may be used to support the protective element 13. By arranging the protective element 13 on the annular bearing platform 112, the protective element 13 may cover or roughly cover the opening end 111, and further protect the speaker assembly 12 within the accommodation cavity 110.

In some embodiments, the speaker assembly 12 may include a magnetic circuit assembly (not shown in the figure), a voice coil (not shown in the figure), a vibration assembly (not shown in the figure), and a vibration transmission plate 121. The magnetic circuit assembly may form a magnetic gap, at least part of the voice coil may be arranged in the magnetic gap, the other end of the voice coil may be physically connected with the vibration transmission plate 121, the vibration assembly may be physically connected with the vibration assembly transmission plate 121, the vibration transmission plate 121 may be physically connected with the shell 11. Specifically, the magnetic circuit assembly may form a magnetic field, the voice coil may be located in the magnetic gap, that is, in the magnetic field formed by the magnetic circuit assembly, and may be affected by the ampere force. The ampere force drives the voice coil to vibrate, and then drives the vibration assembly to generate mechanical vibrations. The vibration assembly may transmit the vibrations to the vibration transmission plate 121, and the vibration transmission plate 121 may transmit the vibrations to the shell 11. Finally, the shell 11 may transmit the vibrations through human body tissues and bones to the hearing nerve, so that the user may hear the sound. In some embodiments, the vibration transmission plate 121 and at least part of the shell 11 may further be called as the elements in the vibration assembly.

In some embodiments, the magnetic circuit assembly, the voice coil, and the vibration assembly may be arranged within the accommodation cavity 110. The vibration transmission plate 121 may be connected with the vibration assembly, and exposed outside the accommodation cavity 110 through the opening end. By exposing the vibration transmission plate 121 outside the accommodation cavity 110, the vibration transmission plate 121 may be closer to the user's head, and the vibrations of the exposed vibration transmission plate 121 may be transmitted to the user's bones faster and more powerful. Thus, the mechanical vibrations transmitted to the human ear may be more complete and may not be easy to lose frequency bands, which effectively improves the auditory effect of the hearing-impaired.

As shown in FIG. 2, the protective element 13 may be arranged above the opening end 111 and fit the outer end surface of the vibration transmission plate 121. In some embodiments, the protection element 13 may include a fitting part 131 (i.e., the bottom), an accommodation part 132 (i.e., the side wall), and a supporting part 133 (e.g., an annular supporting part, that is, an extension part). The fitting part 131 and the accommodation part 132 may form an accommodation cavity (or a second accommodation cavity, e.g., a cylindrical accommodation cavity), the vibration transmission plate 121 may be arranged in the second accommodation cavity. The fitting part 131 may fit the outer end surface of the vibration transmission plate 121, the supporting part 133 may be connected with the accommodation part 132, and arranged above the shell 11. Specifically, the outer end surface of the vibration transmission plate 121 refers to the end surface away from the accommodation cavity 110 or away from the vibration assembly.

During the assembly process of the protective element 13, the protective element 13 may be covered on the opening end 111, and the vibration transmission plate 121 exposed outside the accommodation cavity 110 may extend into the second accommodation cavity, and fit the fitting part 121 and the outer end surface of the vibration transmission plate 121. In some embodiments, the supporting part 133 may be arranged above the annular bearing platform 112.

In some embodiments, the protective element 13 may include a protective gauze. The mesh structure of the protective gauze allows air inside and outside of the accommodation cavity 110 communicate with each other when the speaker assembly 12 generates mechanical vibrations, so that the air pressure difference inside and outside the accommodation cavity 110 may be balanced, thereby reducing the sound generated due to the vibrations of the air in the accommodation cavity 110, attenuating the sound generated from air vibration near the vibration transmission plate 121, and reducing the phenomena of sound leakage, so that the sound quality and sound effect of the acoustic device 1 may be improved.

In some embodiments, to improve the connection stability between the supporting part 133 and the annular bearing platform 112, as shown in FIG. 2, the acoustic device 1 may include an upper cover 14 (e.g., an annular cover), which may be used to press the supporting part 133 on the annular bearing platform 112. In this way, the protective element 13 may be arranged (or supported) on the annular bearing platform 112 stably to reduce the drop of the supporting part 133.

There may be a plurality of implementing manners considering the position relationship and the supporting structures of the upper cover 14, the supporting part 133 as well as the annular bearing platform.

Figure 3A:
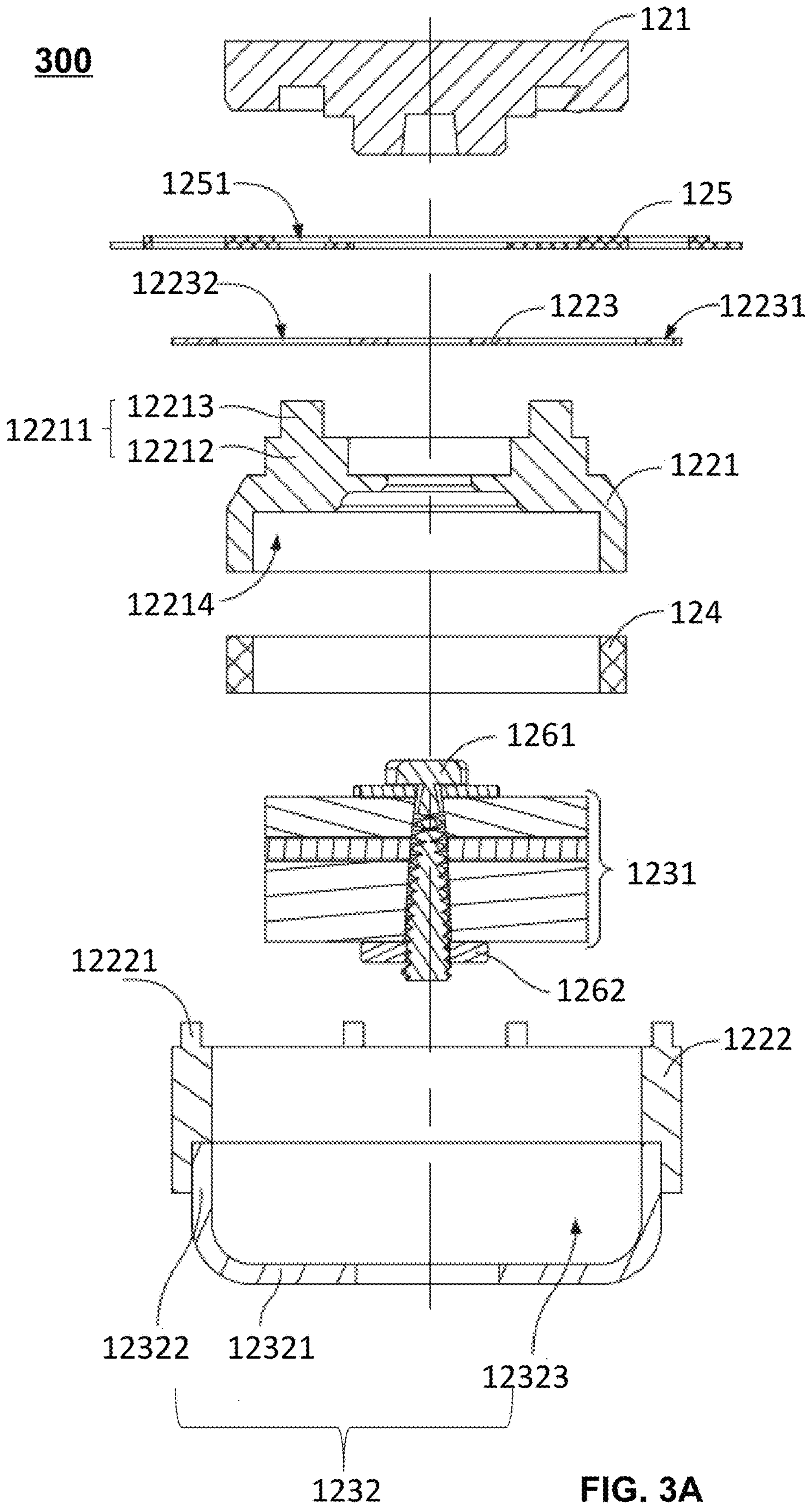
FIG. 3A is a schematic diagram illustrating the disassembly structure of the acoustic device in FIG. 2 according to some embodiments of the present disclosure.
Figure 3B:
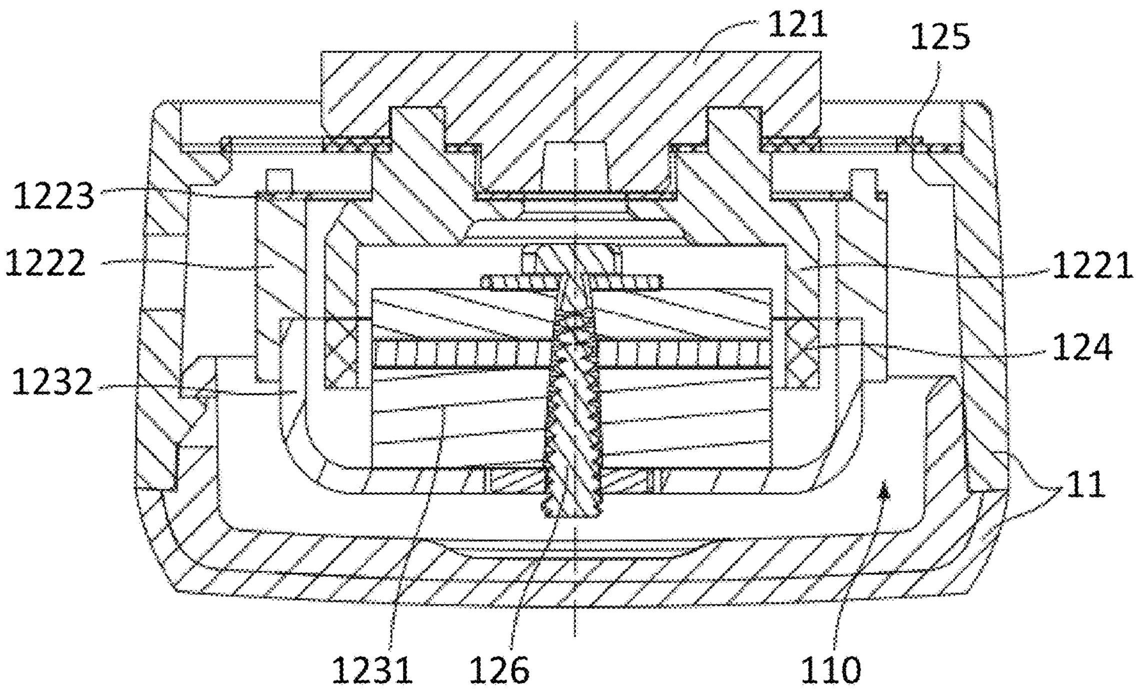
FIG. 3B is a schematic diagram illustrating a section view of the acoustic device in FIG. 3A according to some embodiments of the present disclosure.
Figure 3C:
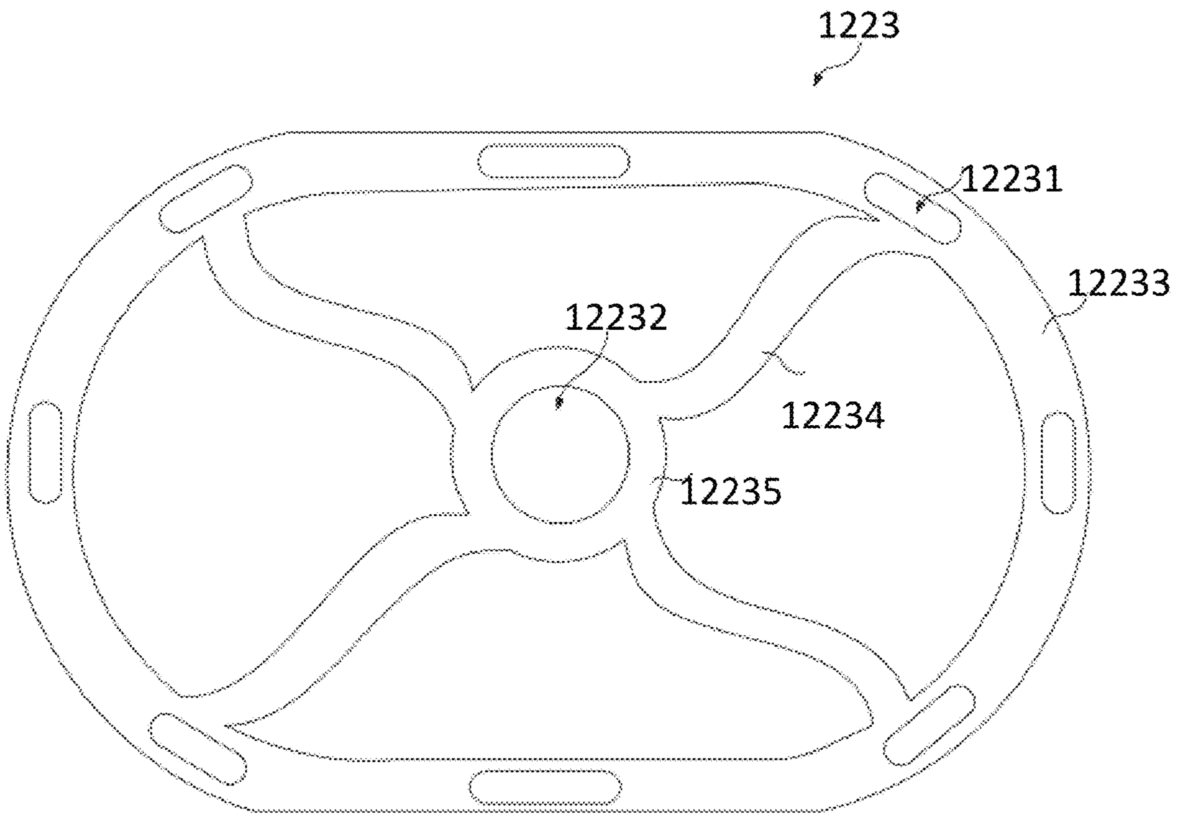
FIG. 3C is a schematic diagram illustrating a vibration diaphragm of the acoustic device in FIG. 3A according to some embodiments of the present disclosure.

FIG. 3A is a schematic diagram illustrating the disassembly structure of the acoustic device in FIG. 2 according to some embodiments of the present disclosure; FIG. 3B is a schematic diagram illustrating a section view of the acoustic device in FIG. 3A according to some embodiments of the present disclosure; FIG. 3C is a schematic diagram illustrating a vibration diaphragm of the acoustic device in FIG. 3A according to some embodiments of the present disclosure. As shown in FIG. 3A, an acoustic device 300 may include a shell 11 and a speaker assembly 12. The speaker assembly 12 may be arranged in the shell 11. The speaker assembly 12 may include a vibration transmission plate 121, a vibration assembly, one or more magnetic circuit assemblies, and a voice coil 124.

As shown in FIGS. 3A and 3B, the magnetic circuit assemblies may include a first magnetic circuit assembly 1231 and a second magnetic circuit assembly 1232 (e.g., a magnetic conduction cover). In some embodiments, the first magnetic circuit assembly 1231 may include one or more magnetic elements and/or one or more magnetic conduction elements. In some embodiments, the second magnetic circuit assembly 1232 may include one or more magnetic elements and/or one or more magnetic conduction elements. In some embodiments, the magnetic elements of a magnetic circuit assembly may have a corresponding magnetization direction to form a relatively stable magnetic field. As described in the present disclosure, a magnetic element refers to an element that may generate a magnetic field. In some embodiments, the magnetic element may include a single magnet or a combination of a plurality of magnets. In some embodiments, the second magnetic circuit assembly 1232 may be used to adjust the magnetic field generated by the first magnetic circuit assembly 1231 to increase the utilization rate of the magnetic field. In some embodiments, the vibration assembly may be physically connected with the second magnetic circuit assembly 1232. More information on the magnetic circuit assembly, the first magnetic circuit assembly 1231, and the second magnetic circuit assembly 1232, may be referred to in the detailed description in FIGS. 4-61.

For illustration, FIG. 3A illustrates the second magnetic circuit assembly 1231 as the magnetic conduction cover. It should be noted that in the present disclosure, taking the second magnetic circuit assembly 1231 as the magnetic conduction cover is only for the purpose of illustration, and is not intended to limit the scope of the present disclosure. The magnetic conduction cover may include a cover bottom 12321, a cover side 12322, and a tube groove 12323, the cover bottom 12321 and the cover side 12322 may form the cylinder groove 12323. In some embodiments, the cover side 12322 may be configured as cylindrical structure.

In some embodiments, the first magnetic circuit assembly 1231 may be arranged in the cylinder groove 12323, and form a magnetic gap between a magnetic conduction cover 1232 and the first magnetic circuit assembly 1231. Correspondingly, at least part of a voice coil 124 may be arranged in the magnetic gap, that is, the voice coil 124 may be in the magnetic field formed between the first magnetic circuit assembly 1231 and the magnetic conduction cover 1232, thereof the voice coil 124 may generate an ampere force under the incentive of electrical signals, and then drive the vibration transmission plate 121 to generate a mechanical vibration. In some embodiments, the first magnetic circuit assembly 1231 may include one or more magnetic elements and/or one or more magnetic conduction elements, and may be arranged above or inside the first magnetic circuit assembly 1231. More information on the first magnetic circuit assembly 1231 may be referred to in the detailed description in FIGS. 6-64.

In some embodiments, the first magnetic circuit assembly 1231 may be physically connected with the magnetic conduction cover 1232, for example, the cover bottom 12321 of the magnetic conduction cover 1232 through a manner, such as magnetic adsorption, cementing, clamping, threaded connection, etc., or a combination thereof.

In some embodiments, as shown in FIG. 3B, the acoustic device 300 may include a fixed part 126, which is used to fix the first magnetic circuit assembly 1231 at the cover bottom 12321.

In some embodiments, the fixed part 126 may include a bolt 1261 and a nut 1262, the bolt 1261 may pass through the first magnetic circuit assembly 1231 in sequence and out of the cover bottom 12321, so that the first magnetic circuit assembly 1231 may be fixed with the cover bottom 12321 through threaded connection. In this way, as the nut 1262 is embedded in the cover bottom 12321, the size of the speaker assembly 12 in the extension direction of inside and outside brackets may be reduced, which is conducive to control the overall size of the speaker assembly 12. Of course, if the above overall size allows, the nut 1262 may further be arranged on the side of the cover bottom 12321 away from the cylinder groove 12323, which may also achieve the relative fixing between the first magnetic circuit assembly 1231 and the magnetic conduction cover 1232.

In some embodiments, the fixed part 126 may connect the first magnetic circuit assembly 1231 and the magnetic conduction cover 1232. In this case, a colloid may further be configured between the first magnetic circuit assembly 1231 and the magnetic conduction cover 1232 (not shown in FIG. 3A and FIG. 3B) so that the gap between the first magnetic circuit assembly 1231 and the magnetic conduction cover 1232 may be filled, and the relatively fixing between the first magnetic circuit assembly 1231 and the magnetic conduction cover 1232 may be more stable, thereby avoiding the noise generated by the first acoustic device 300 when relative movements occur between the first magnetic circuit assembly 1231 and the magnetic conduction cover 1232 under the mechanical vibration.

When the first magnetic circuit assembly 1231 and the magnetic conduction cover 1232 are relatively fixed, there may be a gap between the first magnetic circuit assembly 1231 and the magnetic conduction cover 1232 (not marked in FIG. 3A), which is used to accommodate the voice coil 124. The magnetic field generated by the first magnetic circuit assembly 1231 may be distributed in the gap (or the magnetic gap). In some embodiments, the size of the magnetic gap may be as same as possible to increase the uniformity of the magnetic field distribution, thereby increasing the stability of the vibration of the voice coil 124 in the effect of the magnetic field.

It should be noted that to add to the stability of the vibration of the voice coil 124 in the effect of the magnetic field, the spacings between the voice coil 124 and the first magnetic circuit assembly 1231 or the magnetic conduction cover 1232 may be the same everywhere. In some embodiments, in the process of pre-processing and post-assembly of speaker assembly, the coaxiality of the first magnetic circuit assembly 1231, the magnetic conduction cover 1232, the voice coil 124 and other structural assemblies may be ensured.

In some embodiments, as shown in FIG. 3A and FIG. 3B, the vibration assembly may include an inner support 1221, an outer support 1222, and a vibration diaphragm 1223. One end of the outer support 1222 may be physically connected with both sides of the magnetic circuit assembly (e.g., the cover side 12322 of the magnetic conduction cover 1232). In some embodiments, the physical connection may include using magnetic adsorption, clamping, threaded connection, etc., or a combination thereof. In some embodiments, one end of the outer support 1222 may be integrated with both sides of the magnetic circuit assembly (e.g., the cover side 12322 of the magnetic conduction cover 1232). Through configuring the elements in the outer support 1222 and the magnetic assemblies (e.g., the magnetic conduction cover 1232 and the cover side 12322) as an integrated part, the assembly errors between the outer support 1222 and the magnetic assemblies may be effectively reduced.

One end of the inner support 1221 may be physically connected with the voice coil 124. As mentioned above, in the magnetic field formed by the magnetic circuit assembly, the voice coil 124 may be affected by the ampere force, the ampere power drives the voice coil 124 to vibrate, and the inner support 1221 connected with the voice coil 124 may vibrate. The inner support 1221 and the outer support 1222 may be connected through the vibration diaphragm 1223. Therefore, the outer support 1222 and the vibration diaphragm 1223 may further vibrate. In some embodiments, at least one of the inner support 1221, the outer support 1222 and the vibration diaphragm 1223 may be connected with the vibration transmission plate 121, so that the vibration may be transferred to the vibration transmission plate 121.

In some embodiments, the vibration diaphragm 1223 may be physically connected with the inner support 1221 and the outer support 1222. The vibration diaphragm 1223 may be used to limit the relative movements of the inner support 1221 and the outer support 1222 in a first direction. The first direction may be the radial direction of the accommodation cavity 110. As the vibration diaphragm 1223 is connected with the inner support 1221 and the outer support 1222, the assembly error of the outer support 1222 may further lead to the assembly error between the inner support 1221 and the magnetic circuit assemblies, which leads to stability reduction of the vibration of the voice coil 124 under the influence of the magnetic field. That is, the stability of the mechanical vibration generated by the vibration assembly driven by the voice coil 124 may decrease, which may affect the sound quality of the acoustic device 300.

In some embodiments, the outer support 1222 and/or inner support 1221 may be moveably connected with the vibration diaphragm 1223 so that the relative movement of the outer support 1222 and the inner support 1221 in the first direction may be limited; while allowing the inner support 1221 and the vibration diaphragm 1223 to move in a second direction relative to the outer support 1222. The second direction may be the extension direction of the inner support 1221 and the outer support 1222.

In some embodiments, the outer support 1222 may be connected with the vibration diaphragm 1223 flexibly. As described in the present disclosure, a first element (e.g., the outer support 1222) flexibly or moveably connected with a second element refers to that the first element and the second element may perform relative movement through the connection part between the first element and the second element. In some embodiments, a first convex column 12221 may be arranged on the end of the outer support 1222 away from the magnetic circuit assemblies (that is, close to the vibration transmission plate 1121), a first through hole 12231 may be opened on the vibration diaphragm 1223, the first convex column 12221 may be flexibly connected with the vibration diaphragm 1223 through the first through hole 12231, which means the vibration diaphragm 1223 may move up and down along the first convex column 12221. In some embodiments, the first convex column 12221 may be matched with the first through hole 12231. The first convex column 12221 may be moveably threaded in the first through hole 12231.

In some embodiments, there may be a plurality of first convex columns 12221 and a plurality of first through holes 12231.

In some embodiments, the inner support 1221 may be flexibly connected with the vibration diaphragm 1223. In some embodiments, one end of the inner support 1221 may be provided with a second convex column 12211, a second through hole 12232 may be opened on the vibration diaphragm 1223, and the second convex column 12211 may flexibly connect the vibration diaphragm 1223 through the second through hole 12232.

In some embodiments of the present disclosure, through the cooperation of the first convex column 12221 and the first through hole 12231 as well as the cooperation of the second convex column 12211 and the second through hole 12232, the relative movement of the outer support 1222 and the inner support 1221 in the first direction may be limited, while allowing the inner support 1221 and the vibration diaphragm 1223 to move in the second direction relative to the outer support 1222, so that the mechanical vibrations generated by the vibration assembly may be transmitted. Other parts of the inner support 1221 may be fixedly connected with the vibration diaphragm 1223, so that under the vibration of the voice coil, the inner support 1221 may transfer the vibrations through the inner support 1221 to the vibration diaphragm 1223. As described in the present disclosure, the first element (e.g., the inner support 1221) may be fixedly connected with the second element refers to that the first element and the second element may not perform relative movement through the connection part between the first element and the second element, that is, the first element and the second element may keep relative rest through the connection part.

As shown in FIG. 3C, in some embodiments, the vibration diaphragm 1223 may include an annular edge part 12233 and one or more ribs 12234 connected within the annular edge part 12233. The annular edge part 12233 may be provided with the first through hole 12231. The side of the inner support 1221 facing a vibration transmission plate 121 may be opened with one or more through slots corresponding to the ribs 12234 (not shown in the figure). The ribs 12234 may be accommodated in the through slots, which may limit the relative movement of the outer support 1222 and the inner support 1221 along the first direction, while allowing the movement of the inner support 1221 and the vibration diaphragm 1223 in the second direction relative to the outer support 1222. The second direction may be the extension direction of the inner support 1221 and the outer support 1222.

FIG. 3C is a schematic diagram illustrating the vibration diaphragm of the acoustic device in FIG. 3A according to some embodiments of the present disclosure. As shown in FIG. 3C, in some embodiments, the vibration diaphragm 1223 may further include an annular intermediate part 12235 and the one or more ribs 12234 may be connected between the annular edge part 12233 and the annular intermediate part 12235. The annular intermediate part 12235 may be provided with the second through hole 12232, and the position of the second convex column 12211 may correspond to the position of the second through hole 12232 (not limited to the situation shown in FIG. 3A). The annular edge part 12233 may be provided with the first through hole 12231, and the position of the first convex column 12221 may correspond to the position of the first through hole 12231.

In some embodiments, the speaker assembly 12 may include an elastic shock absorber 125, the elastic shock absorber 125 may be configured between one end of the inner support 1221 and the vibration transmission plate 121 to slow down the vibration of the inner support 1221 in a second direction.

In some embodiments, the second convex column 12211 may include a first column section 12212 and a second column section 12213 physically connected with each other. As shown in FIG. 3A, the second column section 12213 may be configured above the first column section 12212; the first column section 12212 may pass through the second through hole 12232, and the second column section 12213 may be inserted in the vibration transmission plate 121; the elastic shock absorber 125 may be provided with a third through hole 1251, and the elastic shock absorber 125 may be sleeved on the second column section 12213 through the third through hole 1251 and may be supported on the first column section 12212.

In some embodiments, the first column section 12212 and the second column section 12213 may be an integrated part, and the cross-sectional area of the second column section 12213 may be smaller than the cross-sectional area of the first column section 12212.

In some embodiments, the outer edge of the elastic shock absorber 125 may be connected with the shell 11. In some embodiments, the outer edge of the elastic shock absorber 125 may be configured between the shell 11 and a protective element (not shown in the figure, refer to the protective element 13 in FIG. 2). Specifically, the outer edge of the elastic shock absorber 125 may be fixedly connected with the shell 11, and the protective element may then be fixedly connected with the elastic shock absorber 125.

In some embodiments, the elastic shock absorber 125 may be clamped between an annular bearing platform configured on the inner wall of the shell 11 and a supporting part of the protective element (not shown in the figure, refer to the supporting part 133 in FIG. 2), the annular bearing platform may support the elastic shock absorber 125. In some embodiments, the inner surface of the supporting part may be connected with the elastic shock absorber 125 through bonding, and the elastic shock absorber 125 may be connected with the annular bearing platform through bonding.

The elastic shock absorber 125 may be clamped between the annular bearing platform and the supporting part, and the annular bearing platform may support the elastic shock absorber 125. In some embodiments, the outer surface of the supporting part may be connected with the elastic shock absorber 125 through bonding, and the elastic shock absorber 125 may be connected with the annular bearing platform through bonding.

In some embodiments, the elastic shock absorber 125 may be clamped between an upper cover (not shown in the figure) and the annular bearing platform, the annular bearing platform may support the elastic shock absorber 125. In some embodiments, the elastic shock absorber 125 may be respectively fixed with the second cover and the annular bearing platform through bonding.

In some embodiments of the present disclosure, through configuring the elastic shock absorber 125, the vibration of the inner support 11401 in the second direction may be slowed down, and the stability of the vibration of the vibration transmission plate 121 may be enhanced.

In some embodiments, the inner support 1221 may form a lid slot 12214. In some embodiments, the end of the inner support 1221 facing the first magnetic circuit assembly 1231 may form the lid slot 12214. The first magnetic circuit assembly 1231 may partly extend into the lid slot 12214. In some embodiments, one end of the inner support 1221 (the end toward the first magnetic circuit assembly 1231) may be covered on the first magnetic circuit assembly 1231, so that the first magnetic circuit assembly 1231 partially extend into the lid slot 12214. In this way, while satisfying the sound production requirement of the speaker assembly 12, the size of the speaker assembly 12 in the extension direction of the inner and the outer supports may be reduced, which is conducive to control the overall size of the speaker assembly 12.

Figure 4:
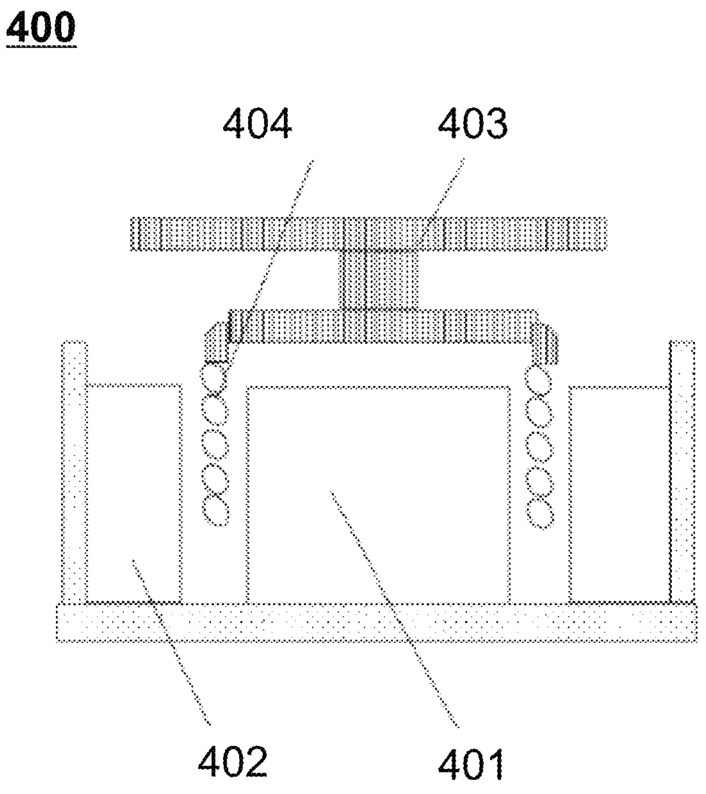
FIG. 4 is a schematic diagram illustrating the lengthwise section of the bone conduction acoustic device according to some embodiments of the present disclosure.

FIG. 4 is a schematic diagram illustrating the lengthwise section of the bone conduction acoustic device according to some embodiments of the present disclosure. As shown in the figure, a bone conduction acoustic device 400 may include one or more magnetic circuit assemblies (not shown in the figure), a vibration assembly 403, and a voice coil 404. In some embodiments, the magnetic circuit assemblies may include a first magnetic circuit assembly 401 and a second magnetic circuit assembly 402. The second magnetic circuit assembly 402 may surround the first magnetic circuit assembly 401 to form a magnetic gap. The voice coil 404 may be provided in the magnetic gap, the voice coil 404 may be connected with the vibration assembly 403.

At least one of the first magnetic circuit assembly 401 and the second magnetic circuit assembly 402 may include magnetic elements and/or a magnetic conduction elements. In the present disclosure, through the combination and the position change of the magnetic elements and magnetic conduction elements, and through configuring the magnetization direction of each magnetic element, the strength and distribution of the magnetic field in the magnetic gap may be changed.

In some embodiments, the first magnetic circuit assembly may include a first magnetic element and a second magnetic element. The magnetic field strength of the total magnetic field generated by the magnetic circuit assemblies in the magnetic gap may be greater than the magnetic field strength of the first magnetic element or the second magnetic element in the magnetic gap. In some embodiments, the magnetization directions of the first magnetic element and the second magnetic element may be opposite. In some embodiments, the angle between the magnetization directions of the first magnetic element and the second magnetic element may be in a range of 150-180 degrees. For example, the angle between the magnetization directions of the first magnetic element and the second magnetic element may be 150°, 170°, or 180°, etc. In some embodiments, the magnetization directions of the first magnetic element and the second magnetic element may be perpendicular to or parallel to the vibration direction of the voice coil in the magnetic gap and may be opposite. As described in the present disclosure, the vibration direction of the voice coil in the magnetic gap refers to the vibration direction of the voice coil at a certain moment. In some embodiments, if the magnetization directions of the first magnetic element and the second magnetic element are parallel to the vibration direction of the voice coil in the magnetic gap, the first magnetic element and the second magnetic element may be stacked along the vibration direction of the voice coil in the magnetic gap; if the magnetization directions of the first magnetic element and the second magnetic element are perpendicular to the vibration direction of the voice coil in the magnetic gap, the first magnetic element and the second magnetic element may be stacked along the direction perpendicular to the vibration direction of the voice coil in the magnetic gap. For more details about the first magnetic circuit assembly, please refer to FIG. 6-FIG. 63.

In some embodiments, the first magnetic circuit assembly may include the first magnetic element, the second magnetic element, and a first magnetic conduction element. The second magnetic circuit assembly may include a third magnetic element. The first magnetic element may be arranged between the first magnetic element and the second magnetic element. The third magnetic element may at least partly surround the first magnetic element and the second magnetic element. In some embodiments, the magnetization direction of the first magnetic element and the magnetization direction of the second magnetic element may both perpendicular to the connection surface of the first magnetic element and the first magnetic conduction element, and the magnetization direction of the first magnetic element and the magnetization direction of the second magnetic element may be opposite. In some embodiments, the angle between the magnetization direction of the third magnetic element and the magnetization direction of the first magnetic element or the magnetization direction of the second magnetic element may be within 60-120 degrees, and/or within 0-30 degrees. For more descriptions of the first magnetic conduction element of the first magnetic circuit assembly and the third magnetic element of the second magnetic circuit assembly, please refer to FIGS. 6, 8, 34, 36, 38, 40, 42, 54 and/or 56.

In some embodiments, the first magnetic assembly may include the first magnetic element, the second magnetic element, and a second magnetic conduction element. The second magnetic assembly may include a first magnetic conduction element. The second magnetic conduction element may be arranged between the first magnetic element and the second magnetic element. The first magnetic conduction element may at least partly surround the first magnetic element and the second magnetic element. In some embodiments, the magnetization direction of the first magnetic element and the magnetization direction of the second magnetic element may both perpendicular to the connection surface of the first magnetic element and the first magnetic conduction element, and the magnetization direction of the first magnetic element and the magnetization direction of the second magnetic element may be opposite. In some embodiments, the second magnetic element may be configured to surround the first magnetic element, and the first magnetic element may surround the second magnetic element. In some embodiments, the upper surface of the second magnetic element may be connected with the lower surface of the first magnetic element, and the lower surface of the second magnetic element may be connected with the upper surface of the second magnetic element. In some embodiments, if the first magnetic element and the second magnetic element may be stacked along the vibration direction of the voice coil in the magnetic gap, the upper surface of the second magnetic conduction element may be connected with the lower surface of the first magnetic element, and the lower surface of the second magnetic conduction element may be connected with the upper surface of the second magnetic element. In some embodiments, if the first magnetic element and the second magnetic element may be stacked along the direction perpendicular to the vibration direction of the voice coil in the magnetic gap, the outer wall of the second magnetic conduction element may be connected with the inner surfaces of the first magnetic element and the second magnetic element. As described in the present disclosure, the inner surface (or inner wall or inner ring or inner area) of the magnetic element may refer to the surface approximately parallel to the vibration direction of the voice coil in the magnetic gap and away from the voice coil. The outer surface (or outer wall or outer ring or outer area) of the magnetic element may refer to the surface approximately parallel to the vibration direction of the voice coil in the magnetic gap and close to the voice coil. The upper surface (i.e., the top surface) of the magnetic element may refer to the surface approximately perpendicular to the vibration direction of the voice coil in the magnetic gap and close to the vibration diaphragm. The lower surface (i.e., the bottom surface) of the magnetic element may refer to the surface approximately perpendicular to the vibration direction of the voice coil in the magnetic gap and away from the vibration diaphragm. For more descriptions of the first magnetic circuit assembly and the second magnetic circuit assembly, please see FIGS. 10, 12, 44, 46, 48, 50 and/or 52.

In some embodiments, the first magnetic circuit assembly may include the first magnetic element, and the second magnetic circuit assembly may include the first magnetic conduction element. The first magnetic conduction element may at least partly surround the first magnetic element. The magnetization direction of the first magnetic element may be pointed from the central area (or inside area) of the first magnetic element to the outside area of the first magnetic element or from the outside area of the first magnetic element to the central area (or inside area) of the first magnetic element. In some embodiments, the first magnetic element may be in an annular shape. In some embodiments, the first magnetic element may be in a cylindrical shape. For more descriptions of the first magnetic circuit assembly and the second magnetic circuit assembly, please refer to FIGS. 24, 26, 28, 30, 32, 61, and/or 62.

In some embodiments, the first magnetic circuit assembly may include the first magnetic element, and the second magnetic circuit assembly may include the second magnetic element. The second magnetic assembly may at least partly surround the first magnetic element. The magnetization direction of the first magnetic element may be pointed from the central area (or inside area) of the first magnetic element to the outside area of the first magnetic element or from the outside area of the first magnetic element to the central area (or inside area) of the first magnetic element. In some embodiments, the magnetization direction of the second magnetic element may be pointed to the inner ring of the second magnetic element from the or the outer ring of the second magnetic element, or may be pointed to the outer ring of the second magnetic element to the inner ring of the second magnetic element. For more descriptions of the first magnetic circuit assembly and the second magnetic circuit assembly, please refer to FIGS. 14, 16, 18, 20, 22, and/or 63.

A magnetic element described in the present disclosure refers to an element that may generate a magnetic field, such as a magnet, etc. The magnetic element may have a magnetization direction. The magnetization direction refers to the direction of the magnetic field direction within the magnetic element, that is, the direction of the magnetic induction line inside the magnetic element or the direction from an S pole to an N pole of the magnetic element. The above magnetic element may include one or more magnets, for example, two magnets. In some embodiments, the magnet may include a metal alloy magnet, a ferrite, etc. The metal alloy magnet may include NdFeB (neodymium iron boron), samarium cobalt, AlNiCo, FeCrCo, aluminum iron boron, iron carbon aluminum, or similar, or a variety of combinations thereof. The ferrite may include barium ferrite, steel ferrite, magnesium manganese ferrite, lithium manganese ferrite, or similar, or a variety of combinations thereof. It should be noted that a magnetic conduction element mentioned herein may further be called a magnetic field concentrator or an iron core. The magnetic conduction element may adjust the distribution of a magnetic field generated by the magnetic element. The magnetic conduction element may include an element processed from a soft magnetic material. In some embodiments, the soft magnetic material may include a metal material, metal alloy, a metal oxide material, an amorphous metal material, etc., such as iron, iron-aluminum alloy, iron-aluminum alloy, nickel-iron alloy, iron cobalt alloy, low-carbon steel, silicon steel sheet, ferrite, etc. In some embodiments, the magnetic conduction element may be processed using a casting manner, a plastic processing manner, a cutting processing manner, a powder metallurgy manner, etc., or a combination thereof. The casting manner may include using sand casting, investment casting, pressure casting, centrifugal casting, etc. The plastic processing manner may include using rolling, casting, forging, stamping, extrusion, drawing, etc. The cutting process manner may include using turning, milling, planing, grinding etc. In some embodiments, the processing manner of the magnetic conduction element may include using 3D printing, CNC machine tools, etc. The connection manner between the magnetic conduction element magnetic conduction element the magnetic element may include bonding, clamping, welding, riveting, bolting, etc., or a combination thereof. In some embodiments, the magnetic element, and the magnetic conduction element may be set to an axisymmetric structure. The axisymmetric structure may be an annular structure, a cylindrical structure, or other axisymmetric structures.

In some embodiments, when the voice coil 404 is energized, the voice coil 404 may be located in the magnetic field formed by the first magnetic circuit assembly 401 and the second magnetic circuit assembly 402, and may be affected by an ampere power. The ampere power may drive the voice coil 404 to vibrate, and in turn drive the vibration assembly 403 to vibrate. The vibration assembly 403 may transmit the vibration to the hearing nerve through tissues and bones, so that people may hear the sound. The vibration assembly 403 may directly touch the skin, or may touch the skin through a vibration transmission layer composed of one or more specific materials. For more descriptions of the vibration assembly 403, refer to the detailed description of FIG. 2-3C.

Figure 5:
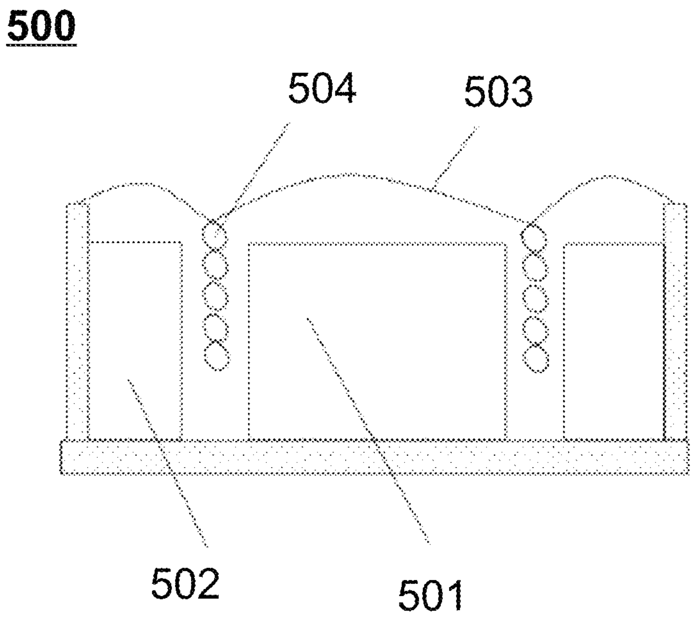
FIG. 5 is a schematic diagram illustrating the lengthwise section of an air conduction acoustic device according to some embodiments of the present disclosure.

FIG. 5 is a schematic diagram illustrating the lengthwise section of an air conduction acoustic device according to some embodiments of the present disclosure. As shown in FIG. 5, an air conduction acoustic device may include a first magnetic circuit assembly 501, a vibration diaphragm 503, and a voice coil 504. The vibration diaphragm 503 may at least partly surround the first magnetic circuit assembly 501, and a magnetic gap may be formed between the first magnetic circuit assembly 501 and the vibration diaphragm 503. The voice coil 504 may be configured in the magnetic gap. The vibration diaphragm 503 may be connected with the voice coil 504. The vibration diaphragm 503 may be connected on a shell (or a supporter) of the air conduction acoustic device through one or more edges. The first magnetic circuit assembly 501 and the vibration diaphragm 503 may include magnetic elements and/or magnetic conduction elements. In the present disclosure, through the combination of magnetic elements and magnetic conduction elements, as well as position changes, and setting the magnetization direction of each magnetic element, the magnetic field strength in the magnetic gap and strength distribution may be changed. Similar to how bone conduction speakers produce sound, the voice coil 504 may vibrate in the magnetic gap after being affected by the ampere power. The vibration of the audio 504 may drive the vibration of the vibration diaphragm 503, and further promote the vibration of the air, so that people may hear the sound.

The above descriptions of the structure of the bone conduction acoustic device and the air conduction acoustic device are only specific examples, and should not be regarded as the only feasible implementation solution. Obviously, for those skilled in the art, after understanding the basic principles of the bone conduction speakers, under the premise of not departing from the principles, various modifications and changes may be made to the forms and details of specific implementing methods and operations of the bone conduction speaker, but these modifications and changes are still within the scope of the above descriptions. For example, the bone conduction acoustic device may include a shell and a connector. The connector may connect the vibration plate and the shell. For another example, the air conduction speaker may include a non-metallic shell, and the voice coil may be connected with the non-metallic shell by an edge.

Figure 6:
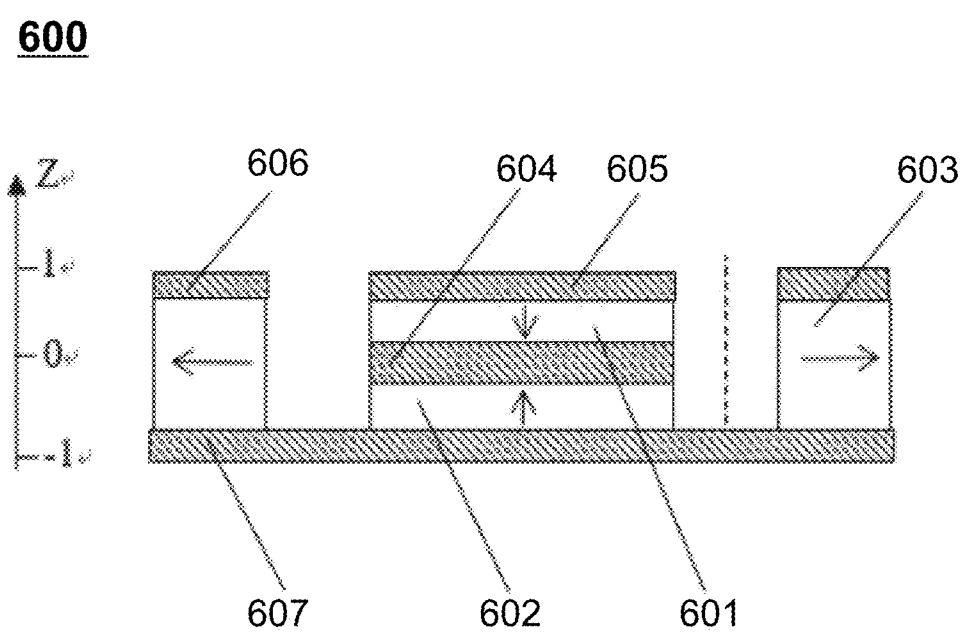
FIG. 6 is a schematic diagram illustrating the lengthwise section of magnetic circuit assembly according to some embodiments of the present disclosure.
Figure 7:
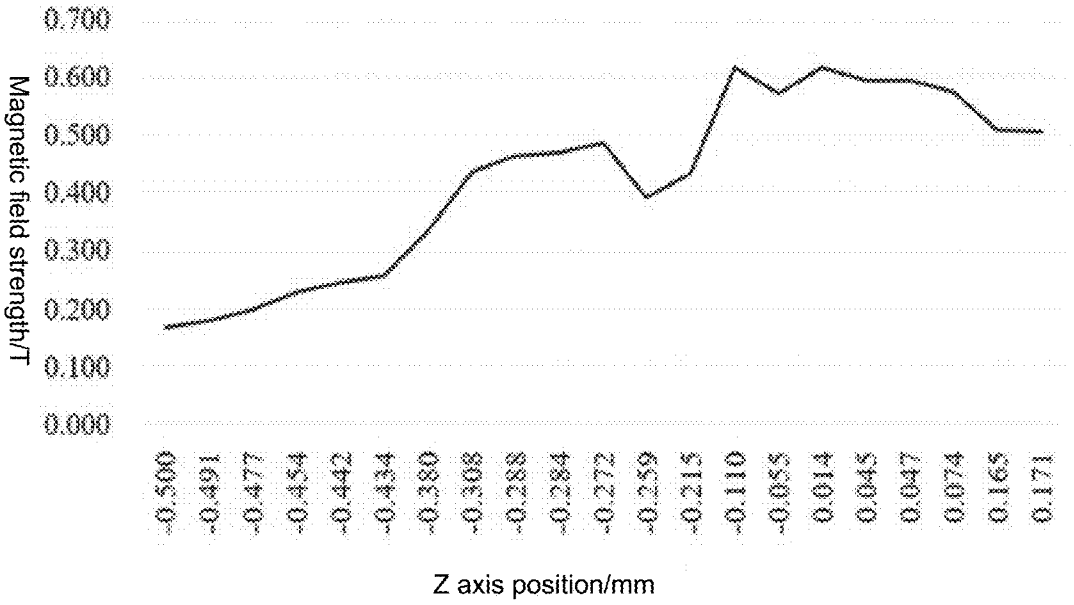
FIG. 7 is a schematic diagram illustrating the change of a magnetic field strength of the magnetic circuit assembly in FIG. 6.

FIG. 6 is a schematic diagram illustrating the lengthwise section of a magnetic circuit assembly according to some embodiments of the present disclosure. FIG. 7 is a schematic diagram illustrating the change of a magnetic field strength of the magnetic circuit assembly in FIG. 6.

As shown in FIG. 6, a magnetic circuit assembly 600 may include a first magnetic element 601, a second magnetic element 602, a third magnetic element 603, and a first magnetic conduction element 604.

In some embodiments, the first magnetic conduction element 604 may be configured between the first magnetic element 601 and the second magnetic element 602, and the third magnetic element 603 may at least partly surround the first magnetic element 601 and the second magnetic element 602. A magnetic gap may be formed between the first magnetic element 601, the second magnetic element 602, and the third magnetic element 603. In some embodiments, the magnetization directions of the first magnetic element 601 and the second magnetic element 602 may both perpendicular to the connection surface between the first magnetic conduction element 604 and the first magnetic element 601 and/or the second magnetic element 602 (i.e., the vertical direction in the figure, the direction of the arrow on each magnetic element in the figure indicates the magnetization direction of that magnetic element), and the magnetization directions of the first magnetic element 601 and the second magnetic element 602 may be opposite.

In some embodiments, the placements of the first magnetic element 601 and the second magnetic element 602 may be such that the same magnetic poles of the first magnetic element 601 and the second magnetic element 602 close to the first magnetic conduction element 604, and different magnetic poles of the first magnetic element 601 and the second magnetic element 602 are away from the first magnetic conduction element 604. For example, compared with the S pole of the first magnetic element 601, the N pole of the first magnetic element 601 may be closer to the first magnetic conduction element 604, and compared with the S pole of the second magnetic element 602, the N pole of the second magnetic element 602 may be closer to the first magnetic conduction element 604. That is, inside the first magnetic element 601 and the second magnetic element 602, the magnetic induction line or the direction of the magnetic field (that is, the direction from the S pole to the N pole) may both pointed to the first magnetic conduction element 604. As another example, compared with the N pole of the first magnetic element 601, the S pole of the first magnetic element 601 may be closer to the first magnetic conduction element 604, and compared with the N pole of the second magnetic element 602, the S pole of the second magnetic element 602 may be closer to the first magnetic conduction element 604. That is, inside the first magnetic element 601 and the second magnetic element 602, the magnetic induction line or the direction of the magnetic field (that is, the direction from the S pole to the N pole) may both depart from the first magnetic conduction element 604.

By setting the magnetization directions of the first magnetic element 601 and the second magnetic element 602 to be vertical and opposite, the first magnetic element 601 and the second magnetic element 602 may be oppositely magnetized, so that the directions of the magnetic induction lines generated from the first magnetic element 601 and the second magnetic element 602 in the magnetic gap may be roughly the same. For example, the magnetic induction lines may all point from the first magnetic conduction element 604 to the third magnetic element 603; or all point from the third magnetic element 603 to the first magnetic conduction element 604, thereby increasing the magnetic field strength in the magnetic gap. In addition, by setting the magnetization directions of the first magnetic element 601 and the second magnetic element 602 to be vertical and opposite, the magnetic fields of the first magnetic element 601 and the second magnetic element 602 generated in the magnetic gap may be suppressed, so that the magnetic induction lines corresponding to the magnetic field may extend horizontally in the magnetic gap. For example, when the magnetic induction lines or the magnetic field direction (i.e., the direction from the S pole to the N pole) inside the first magnetic element 601 and the second magnetic element 602 are all point to the first magnetic conduction element 604, the magnetic induction lines may extend from the end of the first magnetic conduction element 604 to the magnetic gap along a horizontal or near-horizontal direction; when the magnetic induction lines or the magnetic field direction (i.e., the direction from the S pole to the N pole) inside the first magnetic element 601 and the second magnetic element 602 are all away from the first magnetic conduction element 604, the magnetic induction lines may extend from the magnetic gap to the end of the first magnetic conduction element 604 in a horizontal or near-horizontal direction.

In some embodiments, the magnetization direction of the third magnetic element 603 may be perpendicular to the magnetization direction of the first magnetic element 601 or the second magnetic element 602. By setting the magnetization directions perpendicular to each other, the magnetic induction lines in the magnetic gap may be further guided to extend along the horizontal or near-horizontal direction. For example, when the magnetic induction lines or the magnetic field direction (i.e., the direction from the S pole to the N pole) inside the first magnetic element 601 and the second magnetic element 602 are all point to the first magnetic conduction element 604, the magnetic induction lines may extend from the end of the first magnetic conduction element 604 to the magnetic gap along a horizontal or near-horizontal direction and pass through the third magnetic element 603; when the magnetic induction lines or the magnetic field direction (i.e., the direction from the S pole to the N pole) inside the first magnetic element 601 and the second magnetic element 602 are all away from the first magnetic conduction element 604, the magnetic induction lines may pass through the third magnetic element 603 and extend from the magnetic gap to the end of the first magnetic conduction element 604 in a horizontal or near-horizontal direction. In this way, the magnetic field direction at the voice coil position in the magnetic gap may mainly be distributed in the horizontal or near horizontal direction, which improves the uniformity and strength of the magnetic field, and may effectively improve the sound effect generated by the vibration of the voice coil.

It should be noted that in some other embodiments, the magnetization direction of each magnetic element may also be in other directions. A combination of magnetic elements with different magnetization directions may also improve the magnetic field strength and/or make the strength distribution of the magnetic field more uniform.

It should be noted that the vertical direction may be understood as the vibration direction of the voice coil, that is, the direction perpendicular to the upper surface of the first magnetic element 601. In some embodiments, the magnetization direction of the third magnetic element 603 and the magnetization direction of the first magnetic element 601 or the magnetization direction of the second magnetic element 602 may be set to be not perpendicular to each other, and there may be a preset angle between the magnetization direction of the third magnetic element 603 and the magnetization direction of the first magnetic element 601 or the magnetization direction of the second magnetic element 602. The preset angle may be set within a certain angle range. In some embodiments, the angle between the magnetization direction of the third magnetic element 603 and the magnetization direction of the first magnetic element 601 or the magnetization direction of the second magnetic element 602 may be between 60 degrees and 120 degrees. In some embodiments, the angle may be between 50 degrees and 130 degrees. In some embodiments, the angle may be between 0 degree and 30 degrees. For example, the angle between the magnetization direction of the third magnetic element 603 and the magnetization direction of the first magnetic element 601 or the magnetization direction of the second magnetic element 602 may be 0°, 60°, 80°, 90°, 100°, 100°, 180°, etc.

In some embodiments, the magnetization direction of the first magnetic element 601 and the magnetization direction of the second magnetic element 602 may further have a preset angle. In some embodiments, the angle may be between 90 degrees and 180 degrees. In some embodiments, the angle may be between 150 degrees and 180 degrees. For example, the angle between the magnetization direction of the second magnetic element 602 and the magnetization direction of the first magnetic element 601 may be, for example, 170°, 180°, etc. The connection manners between the magnetic conduction elements and the magnetic elements may include bonding, clamping, welding, riveting, bolting, etc. As described in the present disclosure, the angle between the two magnetic directions may refer to the angle that needs to be rotated from one of the two magnetic directions to another one of the two magnetization directions. The angle of clockwise rotation may be a positive number, and the angle of counterclockwise rotation may be a negative number.

In some embodiments, as shown in FIG. 6, the magnetic circuit assembly may further include a second magnetic conduction element 605, a third magnetic conduction element 606, and a fourth magnetic conduction element 607. The bottom surface of the second magnetic conduction element 605 may be connected with the top surface of the first magnetic element 601, and the bottom surface of the third magnetic conduction element 606 may be connected with the top surface of the third magnetic element 603. The second magnetic conduction element 605 and the third magnetic conduction element 606 may be spaced apart in the magnetic gap. The top surface of the fourth magnetic conduction element 607 may be connected with the bottom surface of the second magnetic element 602 and the bottom surface of the third magnetic element 603.

In some embodiments, the first magnetic element 601, the second magnetic element 602, the first magnetic conduction element 604, the second magnetic conduction element 605 and the fourth magnetic conduction element 607 may all be cylinders, cuboids, or triangular prisms, etc. The third magnetic element 603 and the third magnetic conduction element 606 may be annuluses (continuous annuluses, non-continuous annuluses, rectangular annuluses, triangular annuluses, etc.). In some embodiments, the first magnetic element 601, the second magnetic element 602, the first magnetic conduction element 604 and the second magnetic conduction element 605 may be the same in the shape and size of cross-sections perpendicular to the vertical direction, the magnetic element 603 and the third magnetic conduction element 606 may be the same in the shape and size of cross-sections perpendicular to the vertical direction. In some embodiments, the sum of the thicknesses of the first magnetic element 601, the second magnetic element 602, the first magnetic conduction element 604 and the second magnetic conduction element 605 may be equal to the sum of the thicknesses of the third magnetic element 603 and the third magnetic conduction element 606. In some embodiments, the fourth magnetic conduction element 607 and the third magnetic conduction element 606 may have the same thickness.

In some embodiments, the first magnetic element 601, the second magnetic element 602, the third magnetic element 603, the first magnetic conduction element 604, the second magnetic conduction element 605, the third magnetic conduction element 606, and the fourth magnetic conduction element 607 may form a magnetic circuit. In some embodiments, the magnetic circuit assembly 600 may generate a total magnetic field or a full magnetic field. The first magnetic element 601 may generate a first magnetic field. The full magnetic field may be a magnetic field generated under the cooperation of all parts (e.g., the first magnetic element 601, the second magnetic element 602, the third magnetic element 603, the first magnetic conduction element 604, the second magnetic conduction element 605, the third magnetic conduction element 606 and the fourth magnetic conduction element 607). The magnetic field strength (also called magnetic induction intensity or magnetic flux density) of the full magnetic field in the magnetic gap may be greater than the magnetic field strength of the first magnetic field in the magnetic gap. In some embodiments, the second magnetic element 602 may generate a second magnetic field, and the third magnetic element 603 may generate a third magnetic field. The second magnetic field and/or the third magnetic field may improve the magnetic field strength of the full magnetic field in the magnetic gap. The second magnetic field and/or the third magnetic field improving the magnetic field strength of the full magnetic field refers to that when there is the second magnetic field and/or the third magnetic field (that is, when there is the second magnetic element 602 and/or the third magnetic element 603), the magnetic field strength of the full magnetic field in the magnetic gap may be greater than the magnetic field strength of the full magnetic field in the magnetic gap when there is no second magnetic field and/or third magnetic field (that is, there is no second magnetic element 602 and/or third magnetic element 603). For example, the magnetic field strength of the full magnetic field when there is the second magnetic field 602 and/or the third magnetic field 603 in the magnetic gap may be greater than the magnetic field strength of the full magnetic field in the magnetic gap when there is no second magnetic field 602 and/or third magnetic field 603 (that is, when there is only the first magnetic element 601). As another example, the magnetic field strength of the full magnetic field when there is the third magnetic field 603 in the magnetic gap may be greater than the magnetic field strength of the full magnetic field in the magnetic gap when there is no third magnetic field 603 (that is, when there is only the first magnetic element 601 and the second magnetic element 602). In other embodiments of the present disclosure, unless specifically explained, the magnetic circuit assembly represents the structure contains all magnetic elements and magnetic conduction elements, and the full magnetic field represents the magnetic field generated by the magnetic circuit assembly as a whole, the first magnetic field, the second magnetic field, the third magnetic field, . . . , and the Nth magnetic field respectively represents the magnetic field generated by the corresponding magnetic element. In different embodiments, the magnetic element that generates the first magnetic field (or the second magnetic field, the third magnetic field, . . . , and the Nth magnetic field) may be the same or different.

FIG. 7 is a schematic diagram illustrating the change of a magnetic field strength of the magnetic circuit assembly in FIG. 6. In the magnetic gap, the strength of the magnet field at different points in the Z axis direction may be measured along the direction of the Z axis shown in FIG. 6. To facilitate illustration, the Z axis in the present disclosure may be configured in the magnetic gap and extend along the vertical direction to represent the distribution of the magnetic field strength in the vertical direction. Those skilled in the art may set the position of the zero point of the Z axis according to the actual measurement needs. For example, the zero point position of the Z axis may be set at the center of the first magnetic element 601, the first magnetic conduction element 604, and the second magnetic element 602 in the vertical direction; as another example, the zero point position of the Z axis may be set at the midpoint of the thickness direction of the third magnetic element 603; as another example, the zero point position of the Z axis may be set at the center of the first magnetic conduction element 604 in the vertical direction. As shown in FIG. 7, due to the opposition of the first magnetic element 601 and the second magnetic element 602, the magnetic field strength may be highest near the zero point of the Z axis (e.g., −0.110 mm), the maximum value of the magnetic field strength may be about 0.61 T, and the distribution of the magnetic field strength may be relatively uniform near the zero point (for example, in the range of −0.110 mm to 0.171 mm).

Figure 8:
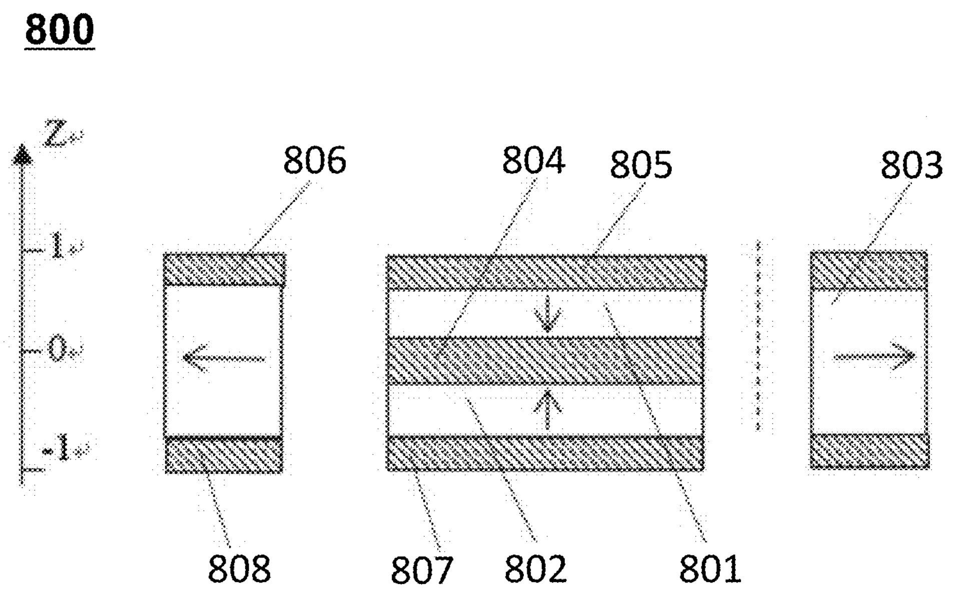
FIG. 8 is a schematic diagram illustrating the lengthwise section of magnetic circuit assembly according to some embodiments of the present disclosure.

FIG. 8 is a schematic diagram illustrating the lengthwise section of a magnetic circuit assembly according to some embodiments of the present disclosure. As shown in FIG. 8, in some embodiments, a magnetic circuit assembly 800 may include a first magnetic element 801, a second magnetic element 802, a third magnetic element 803, a first magnetic conduction element 804, a second magnetic conduction element 805, a third magnetic conduction element 806, a fourth magnetic conduction element 807, and a fifth magnetic conduction element 808. The difference between this embodiment and the embodiment shown in FIG. 6 may be that compared with the fourth magnetic conduction element 607 in the embodiments shown in FIG. 6, the fourth magnetic conduction element 807 and the fifth magnetic conduction element 808 may be spaced apart at a magnetic gap, the top surface of the fourth magnetic conduction element 807 may be connected with the bottom surface of the second magnetic element 802, and the top surface of the fifth magnetic conduction element 808 may be connected with the bottom surface of the third magnetic element 803.

In some embodiments, the fourth magnetic conduction element 807 may be a cylinder, a cuboid, or a triangular prism, etc. The fifth magnetic conduction element 808 may be an annulus (continuous annulus, non-continuous annulus, rectangular annulus, triangular annulus, etc.) In some embodiments, the shapes and sizes of the cross-sections of the fourth magnetic conduction element 807, the first magnetic element 801, the second magnetic element 802, the first magnetic conduction element 804, the second magnetic conduction element 805 on the vertical Z axis may be the same. The fourth magnetic conduction element 807 and the fifth magnetic conduction element 808 may have the same thickness. In some embodiments, the fifth magnetic conduction element 808 and the third magnetic conduction element 806 may have the same thickness and the same shape and size of the cross-sections perpendicular to the Z axis.

Figure 9:
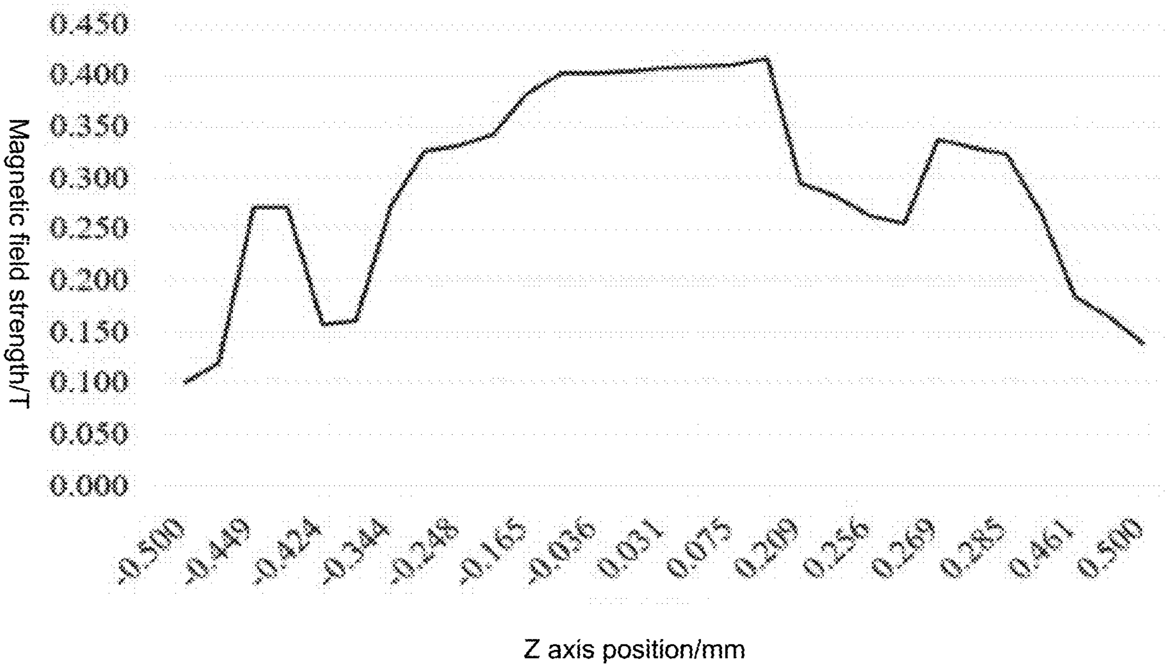
FIG. 9 is a schematic diagram illustrating the change of the magnetic field strength of the magnetic circuit assembly in FIG. 8.

FIG. 9 is a schematic diagram illustrating the change of the magnetic field strength of the magnetic circuit assembly in FIG. 8. In the magnetic gap, the strength of the magnet field at different points in the Z axis direction may be measured along the direction of the Z axis shown in FIG. 8. As shown in FIG. 9, as the distribution of magnetic conduction elements on both sides of the first magnetic element 801 and the second magnetic element 802 may be more symmetrical than in FIG. 6, the distribution of the magnetic field strength generated in the magnetic gap may be more symmetrical on the two sides of the zero point (e.g., 0.031 mm on both sides), and the change may be more uniformly near the zero point (e.g., −0.344 mm to 0.075 mm). However, as the fourth magnetic conduction element 807 and the fifth magnetic conduction element 808 are not continuous, the maximum value of the magnetic field strength may be 0.4 T, which is lower compared to the magnetic circuit assembly 600 including the continuous fourth magnetic conduction element 607.

It should be noted that in the embodiments shown in FIG. 6 and FIG. 8, based on the setting of each magnetic element, those skilled in the art may further determine the number, position, and form of the magnetic conduction elements according to their needs, and the present disclosure makes no limitations on this. For example, the second magnetic conduction element 605 and the third magnetic conduction element 603 shown in FIG. 6 may further be connected with each other.

Figure 10:
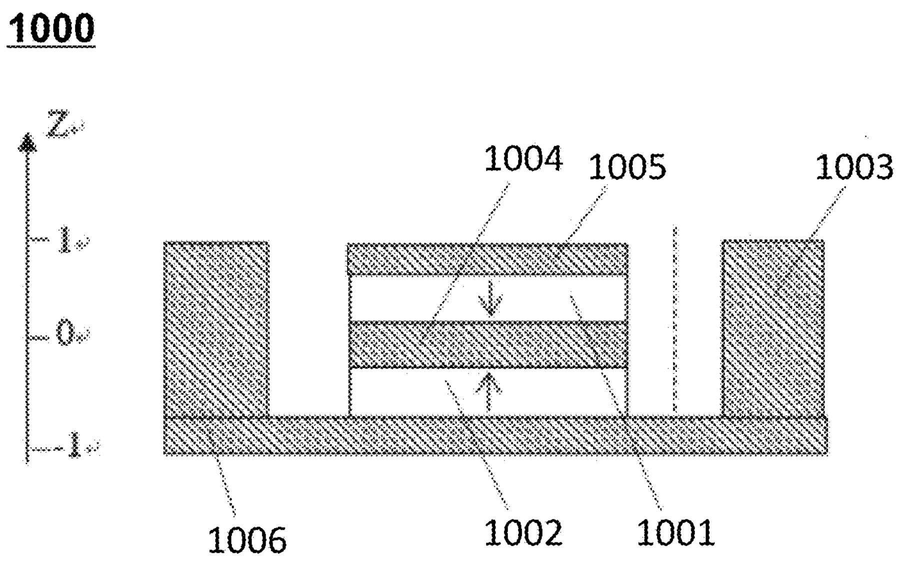
FIG. 10 is a schematic diagram illustrating the lengthwise section of a magnetic circuit assembly according to some embodiments of the present disclosure.

FIG. 10 is a schematic diagram illustrating the lengthwise section of a magnetic circuit assembly according to some embodiments of the present disclosure. As shown in FIG. 10, a magnetic circuit assembly 1000 may include a first magnetic element 1001, a second magnetic element 1002, a first magnetic conduction element 1003, and a second magnetic conduction element 1004.

In some embodiments, the second magnetic conduction element 1004 may be set between the first magnetic element 1001 and the second magnetic element 1002. The first magnetic conduction element 1003 may be configured to at least partly surround the first magnetic element 1001 and the second magnetic element 1002, a magnetic gap may be formed between the first magnetic element 1001, the second magnetic element 1002, and the first magnetic conduction element 1003. The magnetization directions of the first magnetic element 1001 and the second magnetic element 1002 may be perpendicular to the connection surface between the second magnetic conduction element 1004 and the first magnetic element 1001 and/or the second magnetic element 1002 (that is, the vertical direction in the figure, the arrow direction on each magnetic element represents the magnetization direction of the magnetic element), and the magnetization directions of the first magnetic element 1001 and the second magnetic element 1002 may be opposite.

In some embodiments, the placements of the first magnetic element 1001 and the second magnetic element 1002 may be such that the same magnetic poles of the first magnetic element 1001 and the second magnetic element 1002 may be close to the second magnetic conduction element 1004; and different magnetic poles may be away from the second magnetic conduction element 1004. For example, an N pole of the first magnetic element 1001 and the second magnetic element 1002 may be closer to the second magnetic conduction element 1004 compared with an S pole of the first magnetic element 1001 and the second magnetic element 1002, respectively. That is, inside the first magnetic assembly 1001 and the second magnetic element 1002, the magnetic induction lines or the direction of the magnetic field (that is, the direction from the S pole to the N pole) may point to the second magnetic conduction element 1004. As another example, the S pole of the first magnetic element 1001 and the S pole of the second magnetic element 1002 may be closer to the second magnetic conduction element 1004 compared with the N pole of the first magnetic element 1001 and the N pole of the second magnetic element 1002, respectively. That is, inside the first magnetic assembly 1001 and the second magnetic element 1002, the magnetic induction lines or the direction of the magnetic field (that is, the direction from the S pole to the N pole) may depart from the second magnetic conduction element 1004.

By setting the magnetization directions of the first magnetic element 1001 and the second magnetic element 1002 to be vertical and opposite, the first magnetic element 1001 and the second magnetic element 1002 may be oppositely magnetized, so that the directions of the magnetic induction lines generated from the first magnetic element 1001 and the second magnetic element 1002 in the magnetic gap may be roughly the same. For example, the magnetic induction lines may all point from the second magnetic conduction element 1004 to the first magnetic conduction element 1003; or all point from the first magnetic element 1003 to the second magnetic conduction element 1004, thereby increasing the magnetic field strength in the magnetic gap. In addition, by setting the magnetization directions of the first magnetic element 1001 and the second magnetic element 1002 to be vertical and opposite, the magnetic fields of the first magnetic element 1001 and the second magnetic element 1002 generated in the magnetic gap may be suppressed, so that the magnetic induction lines corresponding to the magnetic fields may extend horizontally in the magnetic gap. For example, when the magnetic induction lines or the magnetic field direction (i.e., the direction from the S pole to the N pole) inside the first magnetic element 1001 and the second magnetic element 1002 are all point to the second magnetic conduction element 1004, the magnetic induction lines may extend from the end of the second magnetic conduction element 1004 to the magnetic gap along a horizontal or near horizontal direction and pass through the first magnetic conduction element 1003. In this way, the magnetic field direction at the position=of a voice coil in the magnetic gap may mainly be distributed in the horizontal or near horizontal direction, which improves the uniformity and strength of the magnetic field, and may effectively improve the sound effects generated by the vibration of voice coil.

In some other embodiments, the magnetization direction of each magnetic element may also be in other directions. A combination of magnetic elements with different magnetization directions may also improve the magnetic field strength and/or make the strength distribution of the magnetic field more uniform. In addition, the magnetization direction of the first magnetic element 1001 and the magnetization direction of the second magnetic element 1002 may further have a preset angle, wherein the preset angle may be for example, 60°, 80, 90°, 100°, etc. The connection manner between the magnetic conduction elements and magnetic elements may include bonding, clamping, welding, riveting, and bolting, or the like, or a combination thereof. In some embodiments, the magnetization direction of the first magnetic element 601 and the magnetization direction of the second magnetic element 602 may also have a preset angle, for example, 170°, 190°, etc. Relevant descriptions of the magnetization direction of the first magnetic element 1001 and the second magnetic element 1002 may refer to the magnetization direction of the first magnetic element 601 and the second magnetic element 602 in FIG. 6.

In some embodiments, as shown in FIG. 10, the magnetic circuit assembly may further include a third magnetic conduction element 1005 and a fourth magnetic conduction element 1006, and the bottom surface of the third magnetic conduction element 1005 may be connected with the top surface of the first magnetic element 1001, the top surface of the fourth magnetic conduction element 1006 may be connected with the bottom surface of the second magnetic element 1002 and the bottom surface of the second magnetic conduction element 1004.

In some embodiments, the first magnetic element 1001, the second magnetic element 1002, the second magnetic conduction element 1004, and the third magnetic conduction element 1005 may be in a cylindrical shape, in a cubic shape, or in a triangular shape. The first magnetic conduction element 1003 may be annular (continuous annular, non-continuous annular, rectangular annular, triangular annular, etc.). In some embodiments, the first magnetic element 1001, the second magnetic element 1002, the second magnetic conduction element 1004, and the third magnetic conduction element 1005 may be the same in the shape and size of the cross-section perpendicular to the Z axis. In some embodiments, the sum of the thicknesses of the first magnetic element 1001, the second magnetic element 1002, the second magnetic conduction element 1004, and the third magnetic conduction element 1005 may be equal to the thickness of the first magnetic conduction element 1003.

Figure 11:
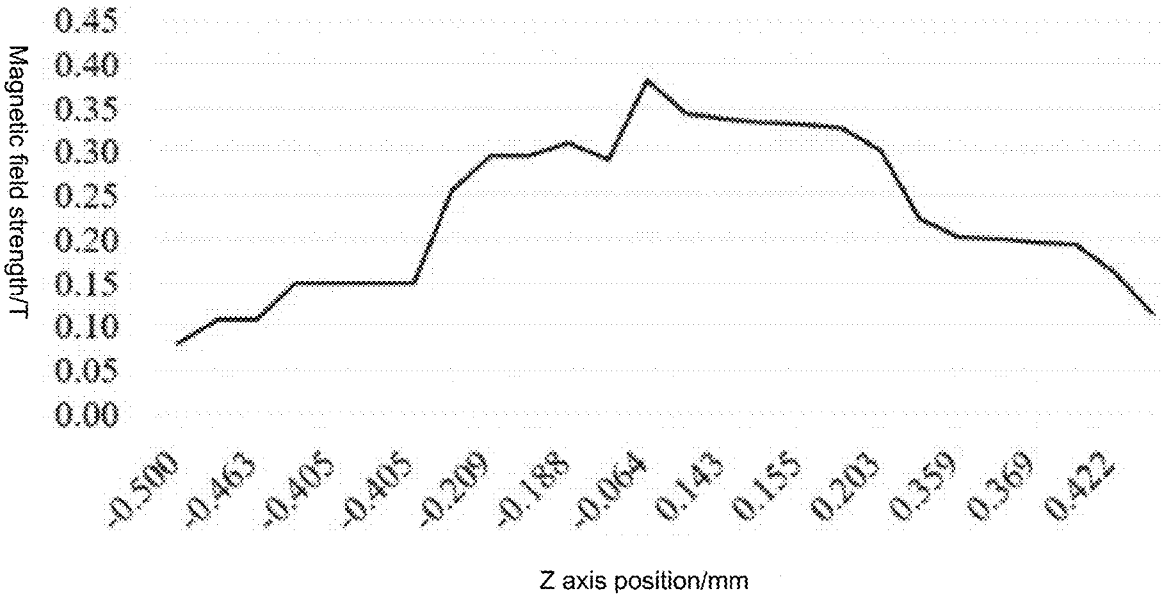
FIG. 11 is a schematic diagram illustrating the change of the magnetic field strength of the magnetic circuit assembly in FIG. 10.

FIG. 11 is a schematic diagram illustrating the change of the magnetic field strength of the magnetic circuit assembly in FIG. 10. In a magnetic gap, the strength of the magnet field at different points in the Z axis direction may be measured along the direction of the Z axis shown in FIG. 10. As shown in FIG. 11, compared with the magnetic assembly of FIG. 6, the magnetic assembly in FIG. 10 lacks the third magnetic element 603 used to further improve the magnetic field, the magnetic field strength may be weakened near zero point (e.g., –0.500-0.188 mm), and the maximum value that may be achieved is about 0.38 T, but the strength distribution of the magnetic field strength near zero point may still be uniform.

Figure 12:
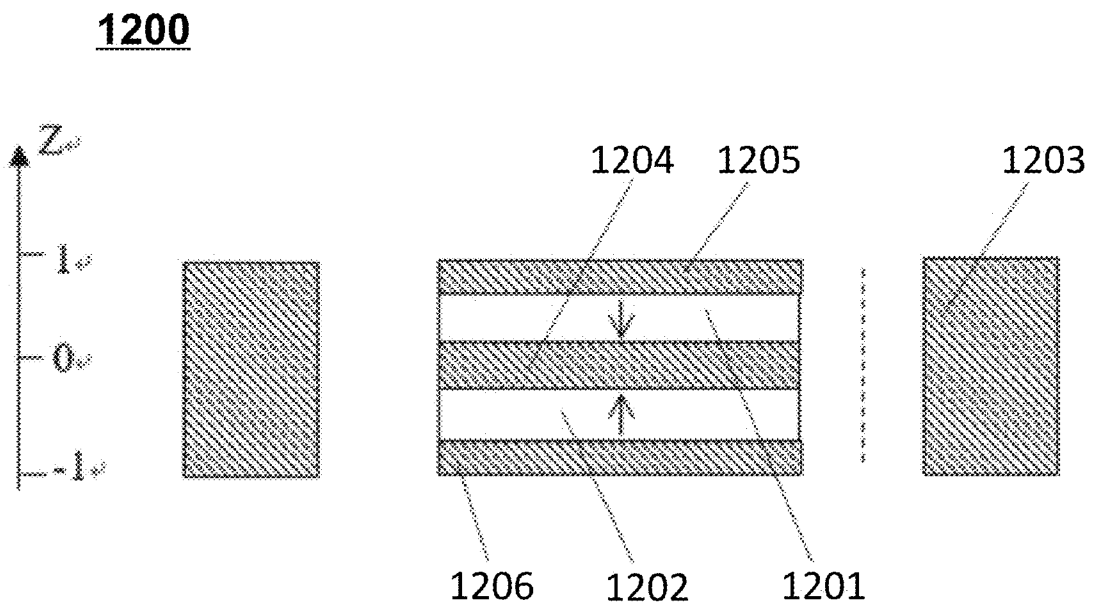
FIG. 12 is a schematic diagram illustrating the lengthwise section of a magnetic circuit assembly according to some embodiments of the present disclosure.

FIG. 12 is a schematic diagram illustrating the lengthwise section of a magnetic circuit assembly according to some embodiments of the present disclosure. As shown in FIG. 12, a magnetic circuit assembly 1200 may include a first magnetic element 1201, a second magnetic element 1202, a first magnetic conduction element 1203, a second magnetic conduction element 1204, a third magnetic conduction element 1205, and a fourth magnetic conduction element 1206. Compared with the embodiments shown in FIG. 10, the difference of this embodiment may be that the fourth magnetic conduction element 1206 in the embodiment shown in FIG. 12 is not connected with the first magnetic conduction element 1203, and the top surface of the fourth magnetic conduction element 1026 may be connected with the bottom surface of the second magnetic element 1202. The fourth magnetic conduction element 1206 and the second magnetic conduction element 1204 may be spaced apart in the magnetic gap. Related descriptions of the magnetization directions of the first magnetic element 1201 and the second magnetic element 1202 may refer to the magnetization directions of the first magnetic element 601 and the second magnetic element 602 in FIG. 6.

In some embodiments, the first magnetic element 1201, the second magnetic element 1202, the second magnetic conduction element 1204, the third magnetic conduction element 1205 and the fourth magnetic conduction element 1206 may be cylinders, cuboids, or triangular prisms, etc. The first magnetic conduction element 1203 may be an annulus (annulus, rectangular annulus, triangular annulus, etc.).

In some embodiments, the sum of the thicknesses of the first magnetic element 1201, the second magnetic element 1202, the second magnetic conduction element 1204, the third magnetic conduction element 1205 and the fourth magnetic conduction element 1206 may be equal to the thickness of the first magnetic conduction element 1203.

It should be noted that in the embodiments shown in FIG. 10 and FIG. 12, based on configuring the first magnetic element, the second magnetic element, and the second magnetic conduction element, those skilled in the art may further change the number, positions, and forms of the magnetic elements according to the requirements, and the present disclosure makes no limitations on this. For example, the second magnetic conduction element 1004 and the third magnetic conduction element 1005 of the magnetic circuit assembly of the embodiment shown in FIG. 10 may further be connected with each other.

Figure 13:
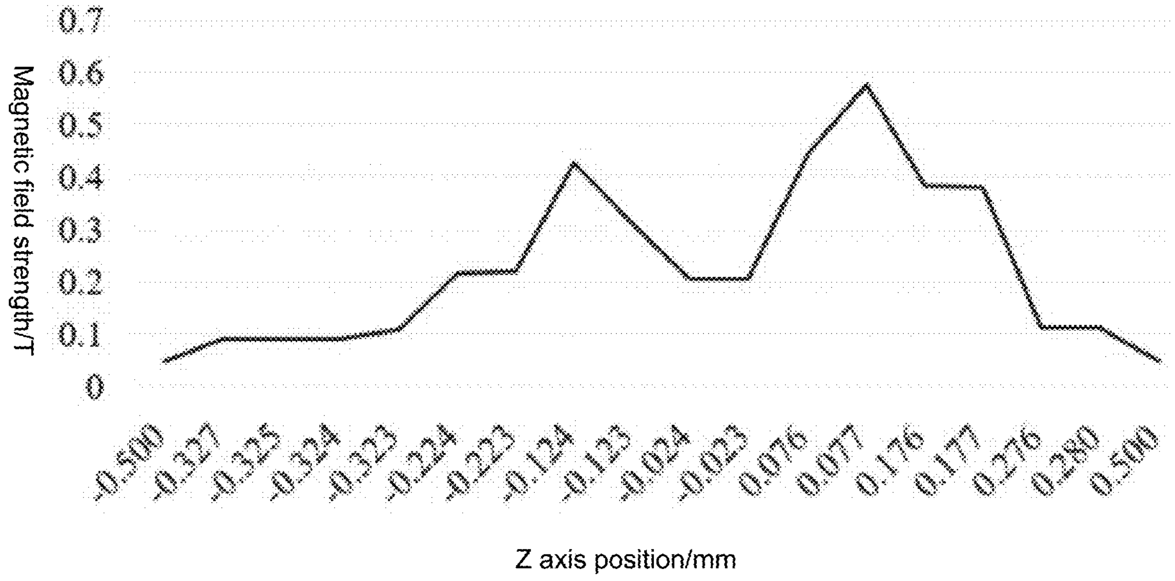
FIG. 13 is a schematic diagram illustrating the change of the magnetic field strength of the magnetic circuit assembly in FIG. 12.

FIG. 13 is a schematic diagram illustrating the change of the magnetic field strength of the magnetic circuit assembly in FIG. 12. In the magnetic gap, the strength of the magnet field at different points in the Z axis direction may be measured along the direction of the Z axis shown in FIG. 12. As shown in FIG. 13, as the fourth magnetic conduction element 1206 and the first magnetic conduction element 1203 may be not connected, the maximum value of the magnetic field strength may be improved compared to the magnetic assembly 1000 including the continuous fourth magnetic conduction element 1006 in FIG. 10. The maximum value of the magnetic field strength near the zero point (e.g., 0.176 mm) may be 0.58 T, and the strength distribution of the magnetic field strength near the zero point may be uniform.

Figure 14:
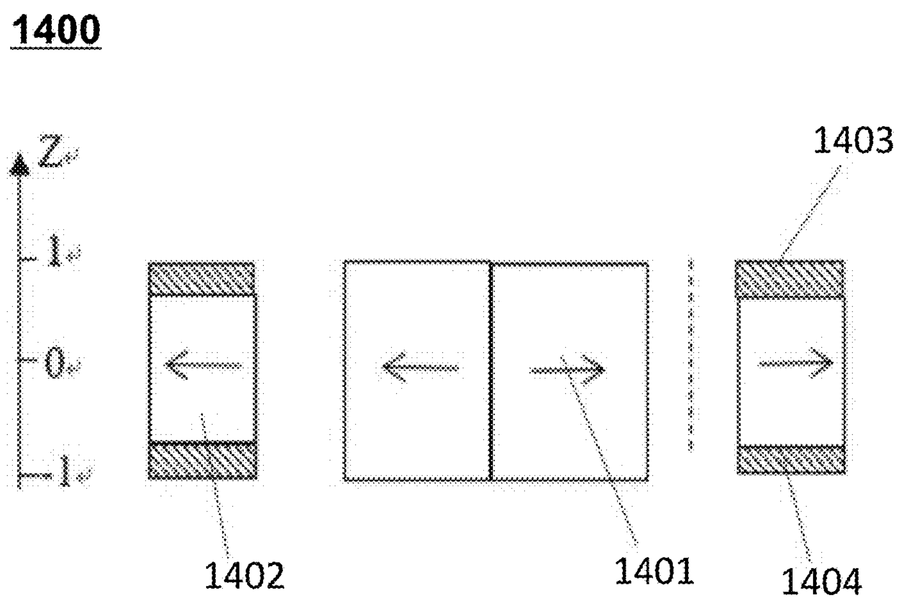
FIG. 14 is a schematic diagram illustrating the lengthwise section of a magnetic circuit assembly according to some embodiments of the present disclosure.

FIG. 14 is a schematic diagram illustrating the lengthwise section of a magnetic circuit assembly according to some embodiments of the present disclosure As shown in FIG. 14, a magnetic circuit assembly 1400 may include a first magnetic element 1401 and a second magnetic element 1402, and at least part of the second magnetic element 1402 may surround the first magnetic element 1401 (that is, the inner surface or the inner wall of the second magnetic element 1402 may surround the outer wall or the outer surface of the first magnetic element 1401), and the magnetic gap may be formed between the first magnetic element 1401 and the second magnetic element 1402. A voice coil may be set in the magnetic gap.

In some embodiments, the magnetization directions of the first magnetic element 1401 and the second magnetic element 1402 may both be parallel to the top surface of the first magnetic element 1401 (i.e., the horizontal direction in the figure) or perpendicular to the surface of the inner and outer surfaces. For example, the magnetization direction of the first magnetic element 1401 may be outward along the center (that is, point from the center area to the outside area), and the magnetization direction of the second magnetic element 1402 may be along the inside (the side close to the first magnetic element 1401) to the outside (the side away from the first magnetic element 1401). As another example, the magnetization direction of the first magnetic element 1401 may be the direction pointed from the outside to the center, the magnetization direction of the second magnetic element 1402 may be along the direction from the outside (the side away from the first magnetic element 1401) to the inside (the side close to the first magnetic element 1401).

In some embodiments, the placements of the first magnetic assembly 1401 and the second magnetic element 1402 may be such that different magnetic poles of the first magnetic element 1401 and the second magnetic element 1402 may be close to or away from each other. For example, the N pole of the first magnetic element 1401 may be located in the central area of the first magnetic element 1401, and the S pole of the first magnetic element 1401 may be located in the outside area, that is, inside the first magnetic element 1401, on the same plane parallel to the upper surface or the lower surface of the first magnetic element 1401, the direction of the magnetic induction lines or the magnetic field (that is, from the S pole to the N pole) are both from the center to the outside; the N pole of the second magnetic element 1402 may be located in the outside area of the second magnetic element 1402, and the S pole of the second magnetic element 1402 may be located in the inside area, that is, inside the second magnetic element 1402, on the same plane parallel to the upper surface or the lower surface of the second magnetic element 1402, the direction of the magnetic induction lines or the magnetic field (that is, from the S pole to the N pole) may be from the inside to the outside. As another example, the S pole of the first magnetic element 1401 may be located in the central area of the first magnetic element 1401, and the N pole of the first magnetic element 1401 may be located in the outside area of the first magnetic element 1401, that is, inside the first magnetic element 1401, on the same plane parallel to the upper surface or the lower surface of the first magnetic element 1401, the direction of the magnetic induction lines or the magnetic field (that is, from the S pole to the N pole) may be from the outside to the inside. The S pole of the second magnetic element 1402 may be located in the outside area of the second magnetic element 1402, and the N pole of the second magnetic element 1402 may be located in the inside area, that is, inside the second magnetic element 1402, on the same plane parallel to the upper surface or the lower surface of the second magnetic element 1402, the direction of the magnetic induction line or the magnetic field (that is, from the S pole to the N pole) may be from outside to inside.

In some alternative embodiments, the first magnetic element 1401 may include two magnets, the placements of the two magnets may be adjacent, and the same magnetic poles of the two magnets may be close to each other, and the opposite magnetic poles of the two magnets may be away from each other. For example, the N poles of the two magnets may be close to each other (as shown in the figure, the magnetizing directions of the magnets on the left and right sides of the first magnetic element 1401 may be opposite). As another example, the S poles of the two magnets may be close to each other. In some embodiments, the second magnetic element 1402 may further include two magnets, and the two magnets may be respectively close to the first magnetic element 1401, and the magnetic induction lines or magnetic field directions of the two magnets may be the opposite. For example, the magnetic lines or magnetic field directions inside the two magnets of the second magnetic element 1402 may depart from the first magnetic element 1401.

By setting the magnetization direction of the first magnetic element 1401 to the horizontal direction, the magnetic field generated by the first magnetic element 1401 may be better extended along the horizontal or near horizontal direction in the magnetic gap. The magnetization direction of the second magnetic element 1402 may be the same as the first magnetic element 1401, which may further guide the magnetic induction lines in the magnetic gap to distribute in the horizontal or near horizontal direction in the magnetic gap. For example, when the magnetic induction lines or magnetic field directions of the first magnetic element 1401 and the second magnetic element 1402 are pointed from the first magnetic element 1401 to the second magnetic element 1402 (that is, point from the S pole to the N pole), the magnetic induction lines may extend from the outside of the first magnetic element 1401 along the horizontal or near horizontal direction in the magnetic gap and pass through the second magnetic element 1402, and the second magnetic element 1402 may emit the magnetic induction lines from its outside, which may extend along the horizontal or near horizontal direction in the magnetic gap and penetrate to the inside of the second magnetic element 1402. As another example, when the magnetic induction lines or magnetic field directions of the first magnetic element 1401 and the second magnetic element 1402 are pointed from the second magnetic element 1402 to the first magnetic element 1401 (that is, point from the S pole to the N pole), the magnetic induction lines may extend from the inside of the first magnetic element 1401 along the horizontal or near horizontal direction in the magnetic gap and penetrate into the outside of the first magnetic element 1401, and the second magnetic element 1402 may emit the magnetic induction lines from its inside, which may extend along the horizontal or near horizontal direction in the magnetic gap and penetrate to the outside of the second magnetic element 1402. In this way, the magnetic field direction at the position of the voice coil in the magnetic gap may mainly be distributed along the horizontal or near horizontal direction, which improves the uniformity and strength of the magnetic field, and may effectively improve the sound effects generated by the vibration of the voice coil.

In some other embodiments, the magnetization direction of each magnetic element may further be in other directions. The combinations of magnetic elements in different magnetization directions may further improve the magnetic field strength and/or the uniformity of the magnetic field. It should be noted that in this embodiment, the horizontal direction may be understood as the direction perpendicular to the vibration direction of the voice coil, that is, the direction parallel to the plane of the top surface of the first magnetic element. In addition, the magnetization directions of the first magnetic element 1401 and the second magnetic element 1402 may be parallel to each other, or there may be a certain angle deviation, for example, the angle between the magnetic directions of the first magnetic element 1401 and the second magnetic element 1402 may be between 170° and 190°.

In some embodiments, the magnetic circuit assembly may further include a first magnetic conduction element 1403 and a second magnetic conduction element 1404. The bottom surface of first magnetic conduction element 1403 may be connected with the second magnetic conduction element 1404, the top surface of the second magnetic conduction element 1404 may be connected with the bottom surface of the second magnetic element 1402. The connection manner between the magnetic conduction elements and magnetic elements may include bonding, clamping, welding, riveting, and bolting, or the like, or a combination thereof.

In some embodiments, the first magnetic element 1401 may be a cylinder, a cuboid or a triangular prism, etc., the second magnetic element 1402, the first magnetic conduction element 1403, and the second magnetic conduction element 1404 may be annuluses (continuous annuluses, non-continuous annuluses, rectangular annuluses, triangular annuluses, etc.). In some embodiments, the first magnetic element 1401 may be spliced from two semi-cylinders, two cuboids or two other shapes of magnets, the magnetization directions of the two magnets constituting the first magnetic element 1401 may be opposite. In some embodiments, the sizes and the shapes of the cross sections, perpendicular to the Z axis, of the second magnetic element 1402, the first magnetic conduction element 1403, and the second magnetic conduction element 1404 may be the same. In some embodiments, the total thickness of the second magnetic element 1402, the first magnetic conduction element 1403, and the second magnetic conduction element 1404 may be equal to the thickness of the first magnetic element 1401.

Figure 15:
FIG. 15 is a schematic diagram illustrating the change of the magnetic field strength of the magnetic circuit assembly in FIG. 14 of the present disclosure.

FIG. 15 is a schematic diagram illustrating the change of the magnetic field strength of the magnetic circuit assembly in FIG. 14 of the present disclosure. In a magnetic gap, the magnetic field strength at different points in the Z axis direction may be measured along the direction of the Z axis shown in FIG. 14. As shown in FIG. 15, the strength of the magnetic field may be basically symmetrical at the zero point position of the Z axis, and the strength of the magnetic field mat be uniformly distributed along the Z axis. The difference between the maximum value and the minimum value of the magnetic field may be small, and the maximum value of the magnetic field strength may be near zero point (for example, −0.002 mm or 0.002 mm), and may be about 0.48 T.

Figure 16:
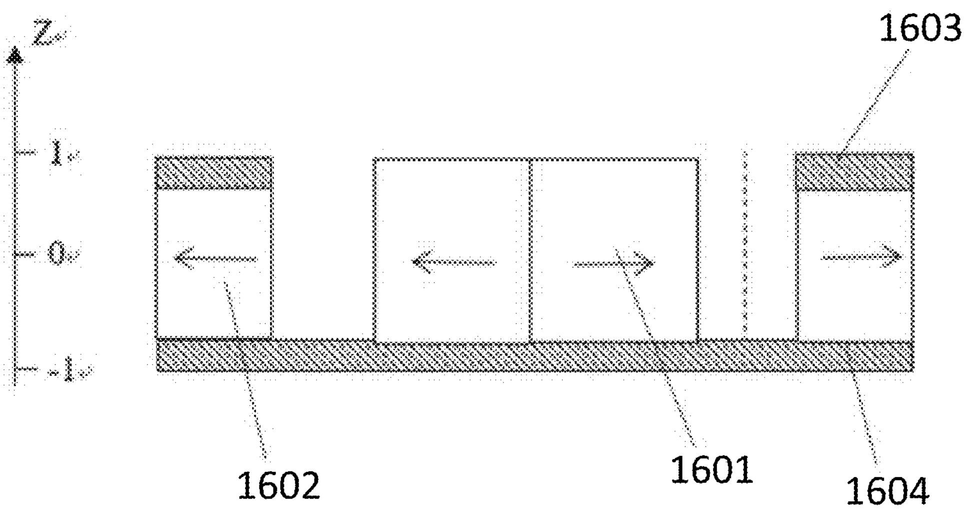
FIG. 16 is a schematic diagram illustrating the lengthwise section of a magnetic circuit assembly according to some embodiments of the present disclosure.

FIG. 16 is a schematic diagram illustrating the lengthwise section of a magnetic circuit assembly according to some embodiments of the present disclosure. As shown in FIG. 16, a magnetic circuit assembly 1600 may include a first magnetic element 1601, a second magnetic element 1602, a first magnetic conduction element 1603, and a second magnetic conduction element 1604. Compared with the embodiment shown in FIG. 14, in the magnetic circuit assembly 1600, the top surface of the second magnetic conduction element 1604 may be connected with the bottom surface of the first magnetic element 1601 and the second magnetic element 1602. In some embodiments, the second magnetic conduction element 1604 may be cylindrical. In some embodiments, the sum of the thicknesses of the second magnetic element 1602 and the first magnetic conduction element 1603 may be equal to the thickness of the first magnetic element 1601.

Figure 17:
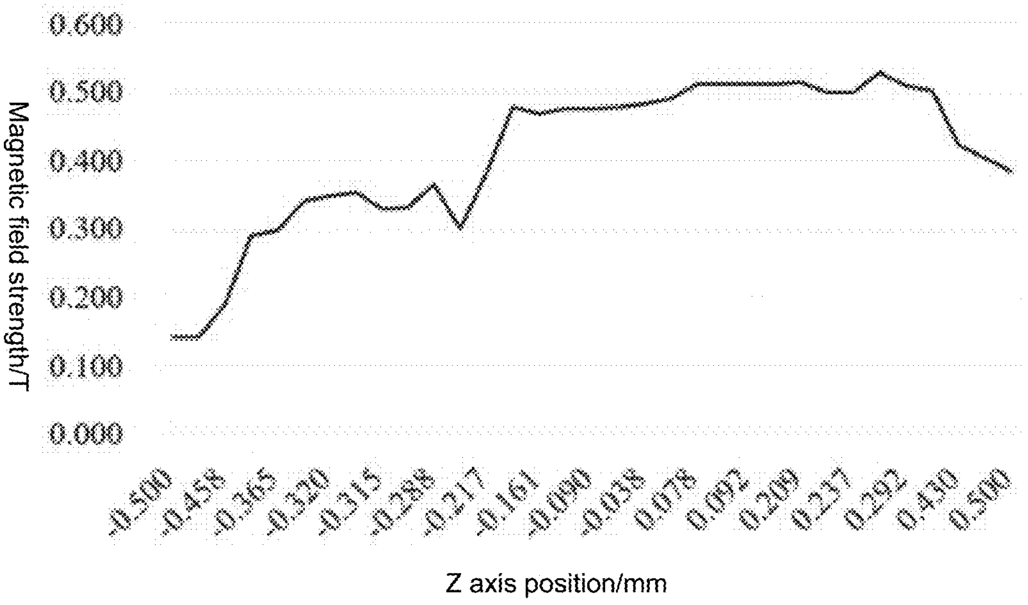
FIG. 17 is a schematic diagram illustrating the change of the magnetic field strength of the magnetic circuit assembly in FIG. 16 of the present disclosure.

FIG. 17 is a schematic diagram illustrating the change of the magnetic field strength of the magnetic circuit assembly in FIG. 16 according to the present disclosure. In the magnetic gap, the magnetic field strength at different points in the Z axis direction may be measured along the direction of the Z axis shown in FIG. 16. As shown in FIG. 17, a relatively uniform magnetic field may be generated near the zero point of the Z axis, and as the second magnetic conduction element 1604 is connected the first magnetic element 1601 and the second magnetic element 1602, compared to the magnetic circuit assembly in FIG. 14, the magnetic field strength near the zero point (e.g., 0.292 mm) may be improved to about 0.53 T.

Figure 18:
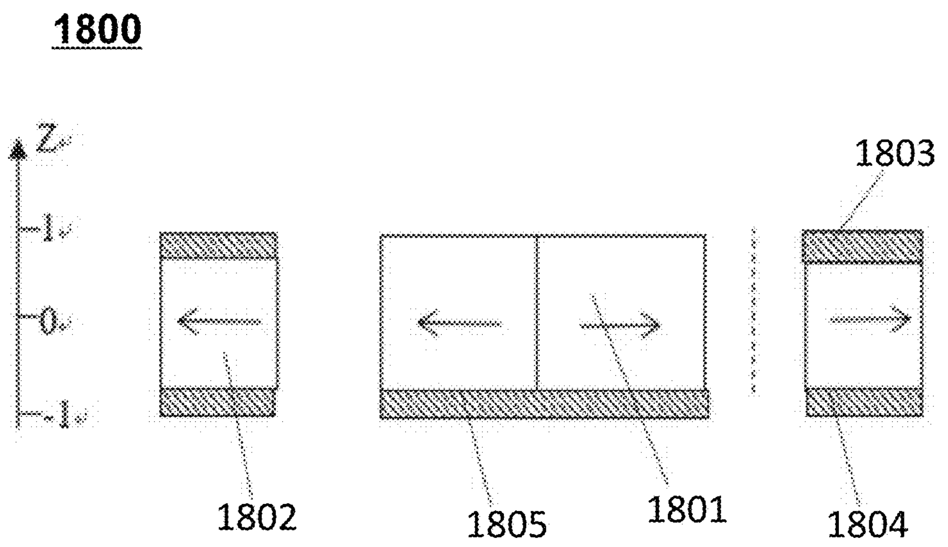
FIG. 18 is a schematic diagram illustrating the lengthwise section of a magnetic circuit assembly according to some embodiments of the present disclosure.

FIG. 18 is a schematic diagram illustrating the lengthwise section of a magnetic circuit assembly according to some embodiments of the present disclosure. As shown in FIG. 18, a magnetic circuit assembly 1800 may include a first magnetic element 1801, a second magnetic element 1802, a first magnetic conduction element 1803, a second magnetic conduction element 1804, and a third magnetic conduction element 1805. Compared with the embodiment shown in FIG. 14, the magnetic circuit assembly 1800 may further include the third magnetic conduction element 1805. The top surface of the third magnetic conduction element 1805 may be connected with the bottom surface of the first magnetic element 1801. The third magnetic conduction element 1802 and the second magnetic conduction element 1804 may be spaced apart on both sides of a magnetic gap.

In some embodiments, the first magnetic element 1801 and the third magnetic conduction element 1805 may be cylinders, cuboids, or triangular prisms, etc. In some embodiments, the sum of the thicknesses of the second magnetic element 1802, the first magnetic conduction element 1803, and the second magnetic conduction element 1804 may be equal to the sum of the thickness of the first magnetic element 1801 and the third magnetic conduction element 1805. The second magnetic conduction element 1804 and the third magnetic conduction element 1805 may be equal in thickness.

Figure 19:
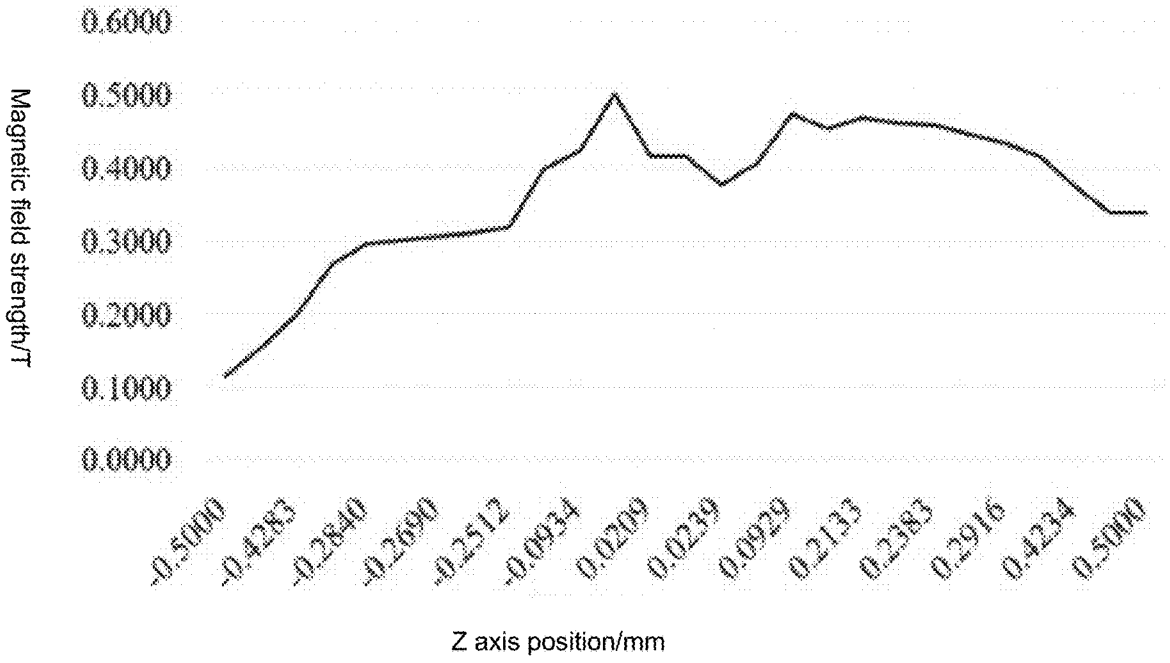
FIG. 19 is a schematic diagram illustrating the change of the magnetic field strength of the magnetic circuit assembly in FIG. 18 according to the present disclosure.

FIG. 19 is a schematic diagram illustrating the change of the magnetic field strength of the magnetic circuit assembly in FIG. 18 according to the present disclosure. In the magnetic gap, the magnetic field strength at different points in the Z axis direction may be measured along the direction of the Z axis shown in FIG. 18. As shown in FIG. 19, the maximum value of the magnetic field strength may be near the zero point of the Z axis (e.g., 0.0209 mm), which is about 0.5 T, and the magnetic field strength may be uniformly distributed on the both sides, especially on the upper side of the zero point of the Z axis. Compared with the magnetic circuit assembly 1400 without the third magnetic conduction element in FIG. 14, the maximum magnetic field strength in the magnetic gap may be improved.

Figure 20:
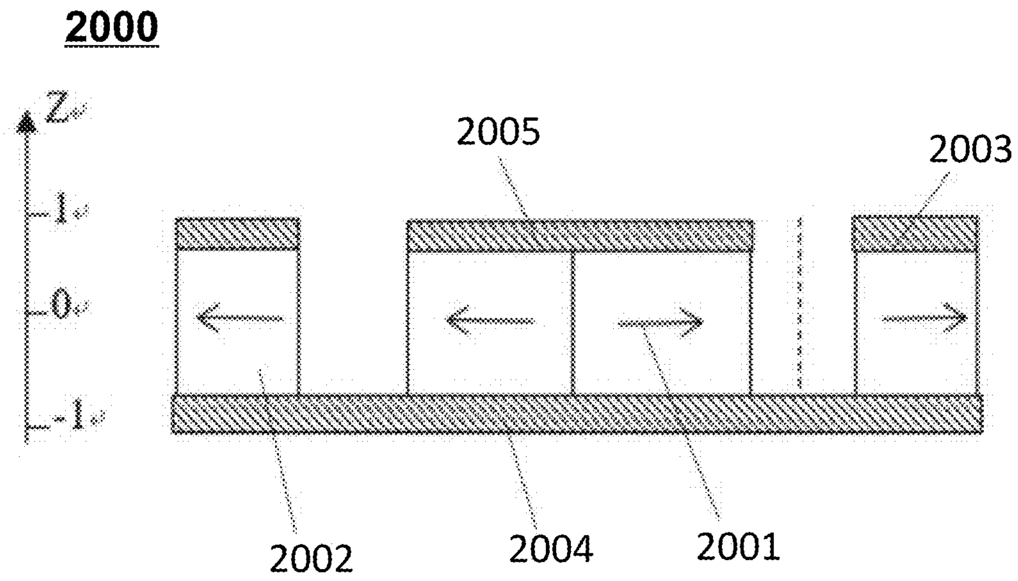
FIG. 20 is a schematic diagram illustrating the lengthwise section of a magnetic circuit assembly according to some embodiments of the present disclosure.

FIG. 20 is a schematic diagram illustrating the lengthwise section of a magnetic circuit assembly according to some embodiments of the present disclosure. As shown in FIG. 20, a magnetic circuit assembly 2000 may include a first magnetic element 2001, a second magnetic element 2002, a first magnetic conduction element 2003, a second magnetic conduction element 2004 and a third magnetic conduction element 2005. Compared with the embodiment shown in FIG. 16, the magnetic circuit assembly 2000 may further include the third magnetic conduction element 2005, and the bottom surface of the third magnetic conduction element 2005 may be connected with the top surface of the first magnetic element 2001.

In some embodiments, the third magnetic conduction element 2005 and the first magnetic element 2001 may be cylinders, cuboids or triangular prisms. The sizes and the shapes of the cross sections, perpendicular to the Z axis, of the third magnetic conduction element 2005 and the first magnetic element 2001 may be the same. In some embodiments, the sum of the thicknesses of the first magnetic element 2001 and the third magnetic conduction element 2005 may be the same as the sum of the thicknesses of the second magnetic element 2002 and the second magnetic conduction element 2003.

Figure 21:
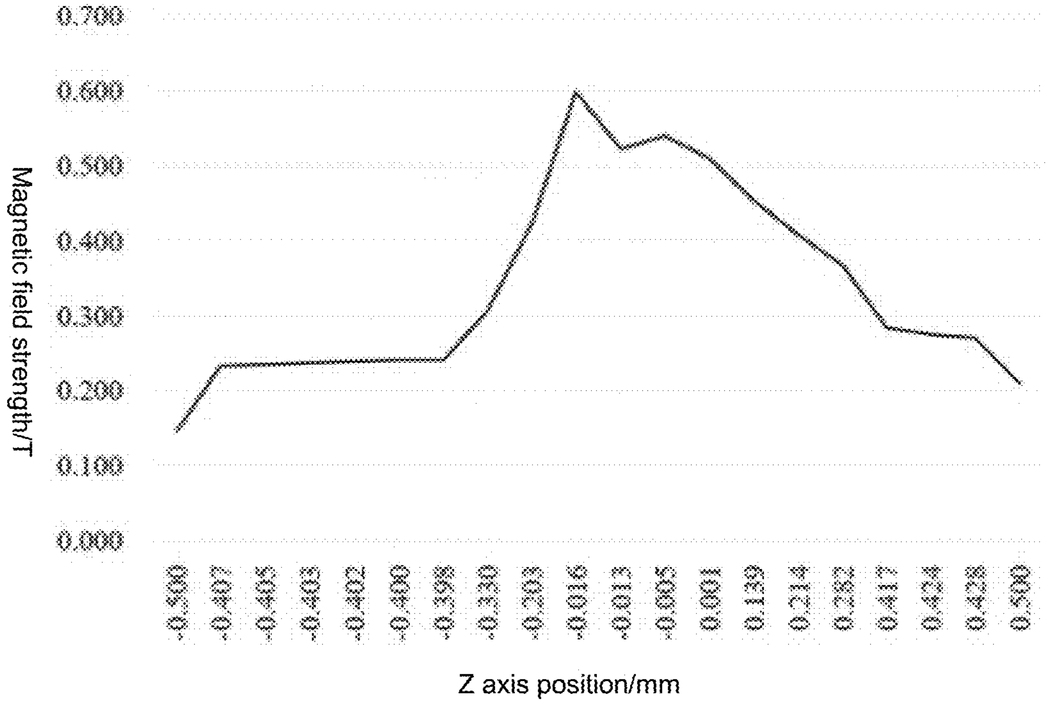
FIG. 21 is a schematic diagram illustrating the change of the magnetic field strength of the magnetic circuit assembly in FIG. 20 according to the present disclosure.

FIG. 21 is a schematic diagram illustrating the change of the magnetic field strength of the magnetic circuit assembly in FIG. 20 according to the present disclosure. In a magnetic gap, the magnetic field strength at different points in the Z axis direction may be measured along the direction of the Z axis shown in FIG. 20. As shown in FIG. 21, compared with the magnetic circuit assembly of the embodiment shown in FIG. 16, the magnetic circuit assembly of this embodiment has added a magnetic conduction element, and the maximum value of the magnetic field strength (e.g., −0.016 mm) has reached 0.6 T.

Figure 22:
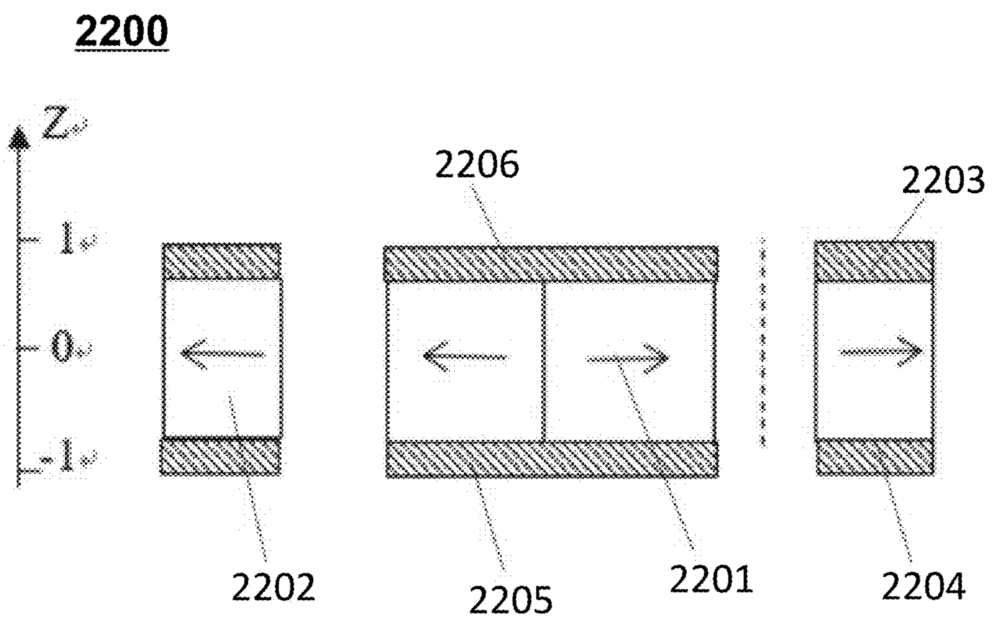
FIG. 22 is a schematic diagram illustrating the lengthwise section of a magnetic circuit assembly according to some embodiments of the present disclosure.

FIG. 22 is a schematic diagram illustrating the lengthwise section of a magnetic circuit assembly according to some embodiments of the present disclosure. As shown in FIG. 22, a magnetic circuit assembly 2200 may include a first magnetic element 2201, a second magnetic element 2202, a first magnetic conduction element 2203, a second magnetic conduction element 2204, a third magnetic conduction element 2205, and a fourth magnetic conduction element 2206. Compared with the embodiment shown in FIG. 18, the magnetic circuit assembly 2200 may further include the fourth magnetic conduction element 2206, and the bottom surface of the fourth magnetic conduction element 2206 may be connected with the surface of the first magnetic element 2201. The fourth magnetic conduction element 2206 and the first magnetic element 2203 may be spaced apart on both sides of a magnetic gap. In some embodiments, the first magnetic element 2201, the third magnetic conduction element 2205, and the fourth magnetic conduction element 2206 may be cylinders, cuboids, or triangular prisms, etc. In some embodiments, the sum of the thicknesses of the second magnetic element 2202, the first magnetic conduction element 2203, and the second magnetic conduction element 2204 may be equal to the sum of the thicknesses of the first magnetic assembly 2201, the third magnetic conduction element 2205, and the fourth magnetic conduction element 2206. The first magnetic conduction element 2203 and the fourth magnetic conduction element 2206 may have the same thickness.

Figure 23:
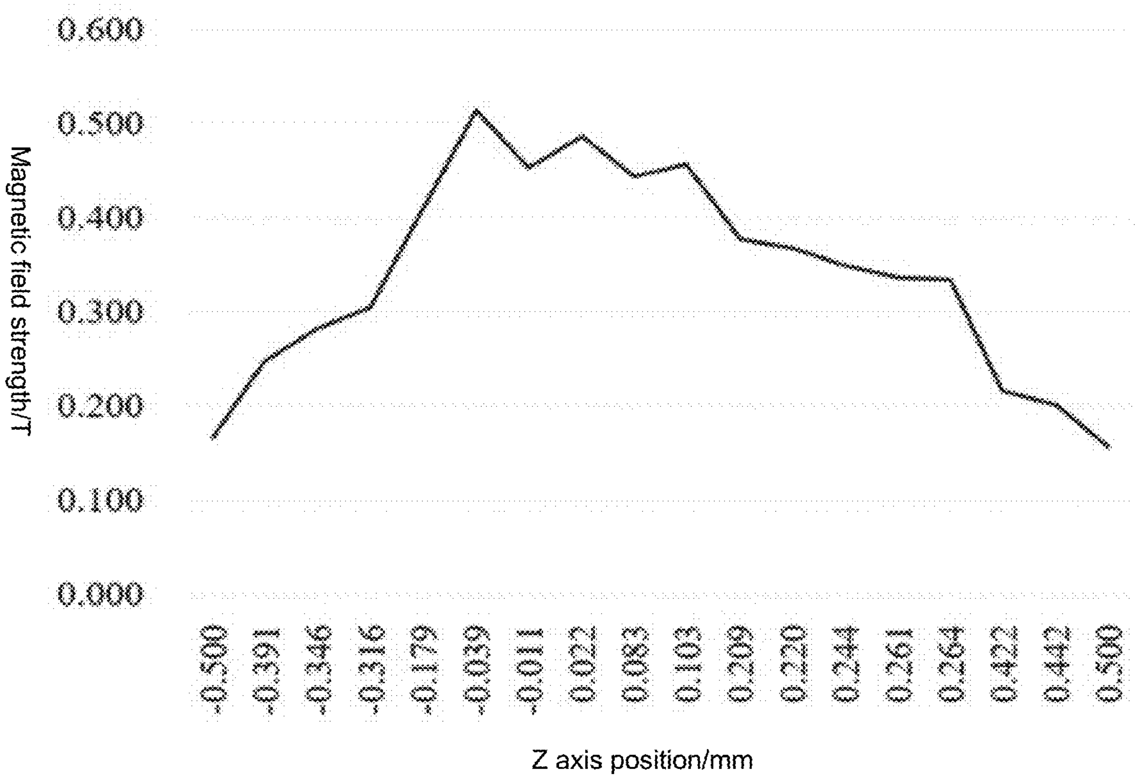
FIG. 23 is a schematic diagram illustrating the change of the magnetic field strength of the magnetic circuit assembly in FIG. 22 according to the present disclosure.

FIG. 23 is a schematic diagram illustrating the change of magnetic field strength of the magnetic circuit assembly in FIG. 22 according to the present disclosure. In a magnetic gap, the magnetic field strength at different points in the Z axis direction may be measured along the direction of the Z axis shown in FIG. 22. As shown in FIG. 23, the maximum value of the magnetic field strength (e.g., the maximum value at −0.039 mm) may be about 0.53 T. As the magnetic circuit assembly of FIG. 23 is more uniformly distributed along the direction of the Z axis than the magnetic assembly of FIG. 18, the distribution of the magnetic field strength may be uniformly distributed near the zero point of the Z axis.

It should be noted that in the embodiments shown in FIG. 14, FIG. 16, FIG. 18, FIG. 20, and FIG. 22, on the basis of configuring the first magnetic element, and the second magnetic element, those skilled in the art may further determine the number, positions, and forms of the magnetic elements according to the requirements, and the present disclosure makes no limitations on this. For example, the magnetic circuit assembly of the embodiments shown in FIG. 14 may further include a third magnetic conduction element (not shown in the figure) and a fourth magnetic conduction element (not shown in the figure), the bottom surface of the third magnetic conduction element may be connected with the top surface of the first magnetic element 1401, and the top surface of the fourth magnetic conduction element may be connected with the bottom surface of the first magnetic element 1401.

Figure 24:
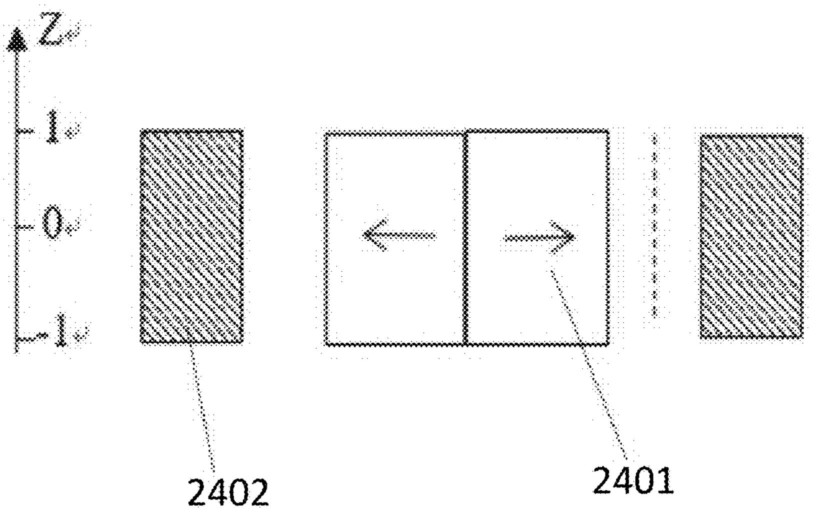
FIG. 24 is a schematic diagram illustrating the lengthwise section of a magnetic circuit assembly according to some embodiments of the present disclosure.

FIG. 24 is a schematic diagram illustrating the lengthwise section of a magnetic circuit assembly according to some embodiments of the present disclosure. As shown in FIG. 24, a magnetic circuit assembly 2400 may include a first magnetic element 2401 and a first magnetic conduction element 2402. At least part of the first magnetic conduction element 2402 may surround the first magnetic element 2401. A magnetic gap may be formed between the inner ring of the first magnetic conduction element 2402 and the first magnetic element 2401. The voice coil 124 of the speaker assembly 12 may be arranged in the magnetic gap.

In some embodiments, the magnetization direction of the first magnetic element 2401 may be parallel to the top surface of the first magnetic element 2401 (that is, the horizontal direction in the figure). For example, the magnetization direction of the first magnetic element 2401 may be along the direction from the center to the outward.

In some alternative embodiments, the first magnetic element 2401 may include two magnets, the placements of the two magnets may be adjacent, and the same magnetic poles of the two magnets may be close to each other, and the opposite magnetic poles may be away from each other. For example, the N poles of the two magnets may be close to each other (as shown in the figure, the magnetizing directions of the magnets on the left and right sides of the first magnetic element 1401 may be opposite, the magnetization directions of the two magnets may be pointed to the first magnetic conduction element 2402). More descriptions on the first magnetic element 2401 and the magnetization direction, may be referred to in the detailed descriptions of the first magnetic element 1401 in FIG. 14.

It should be noted that in this embodiment, the horizontal direction may be understood as the direction perpendicular to the direction of the vibration of a voice coil, that is, the direction parallel to the plane of the top surface of the first magnetic element 2401.

Through setting the magnetization direction of the first magnetic element 2401 to the horizontal direction, the magnetic field generated by the first magnetic element 2401 may be better extended in the horizontal or near horizontal direction in the magnetic gap. In this way, the magnetic field direction at the position where the voice coil is located in the magnetic gap may mainly be distributed in the horizontal or near horizontal direction, thereby improving the uniformity of the magnetic field, and may effectively improve the sound effects generated by the vibration of the voice coil. The connection manner between the magnetic conduction elements and magnetic elements may include bonding, clamping, welding, riveting, and bolting, or the like, or a combination thereof.

In some embodiments, the first magnetic element 2401 may be a cylinder, a cuboid, or a triangular prism, etc., and the first magnetic element 2402 may be an annulus (continuous annulus, non-continuous annulus, rectangular annulus, triangular annulus, etc.). In some embodiments, the first magnetic element 2401 may be spliced from two semi-cylinders, two cuboids or two other shapes of magnets, and the magnetization directions of the two magnets forming the first magnetic element 2401 may be opposite. In some embodiments, the first magnetic element 2401 and the first magnetic conduction element 2402 may have the same thickness.

Figure 25:
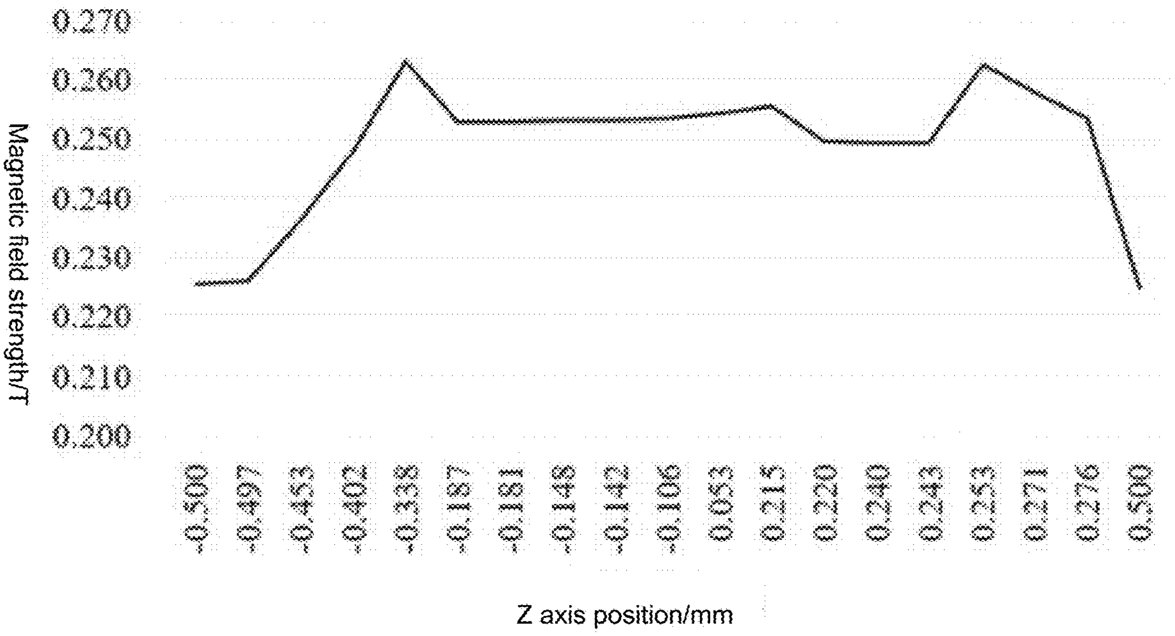
FIG. 25 is a schematic diagram illustrating the change of the magnetic field strength of the magnetic circuit assembly in FIG. 24 according to the present disclosure.

FIG. 25 is a schematic diagram illustrating the change of magnetic field strength of the magnetic circuit assembly in FIG. 24 according to the present disclosure. In a magnetic gap, the magnetic field strength at different points in the Z axis direction may be measured along the direction of the Z axis shown in FIG. 24. As shown in FIG. 25, the magnetic field strength may be smaller than the magnetic field strength of the magnetic assembly 1400 in FIG. 14 as no more magnetic elements are configured, and the maximum value of the magnetic field strength (e.g., the maximum value at −0.338 mm) may be about 0.26 T. However, as the magnetic field strength may be uniformly distributed, the difference between the maximum value and the minimum value of the magnetic field strength may be relatively small.

Figure 26:
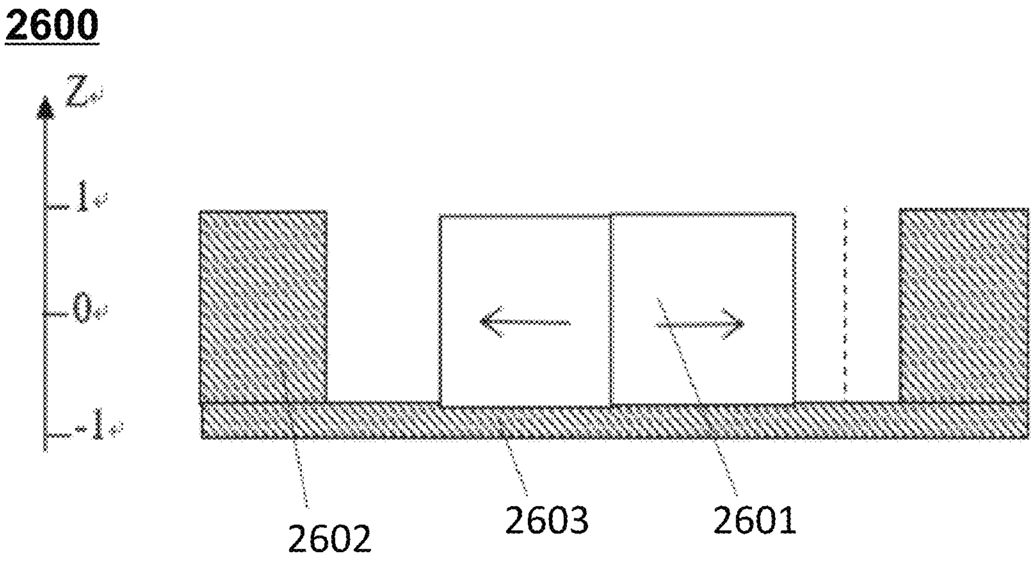
FIG. 26 is a schematic diagram illustrating the lengthwise section of a magnetic circuit assembly according to some embodiments of the present disclosure.

FIG. 26 is a schematic diagram illustrating the lengthwise section of a magnetic circuit assembly according to some embodiments of the present disclosure. As shown in FIG. 26, a magnetic circuit assembly 2600 may include a first magnetic element 2601, a first magnetic conduction element 2602, and a second magnetic conduction element 2603. Compared with the embodiment shown in FIG. 24, the magnetic circuit assembly 2600 further includes a second magnetic conduction element 2603, and the top surface of the second magnetic conduction element 2603 may be connected with the bottom surfaces of the first magnetic conduction element 2602 and the first magnetic element 2601.

Figure 27:
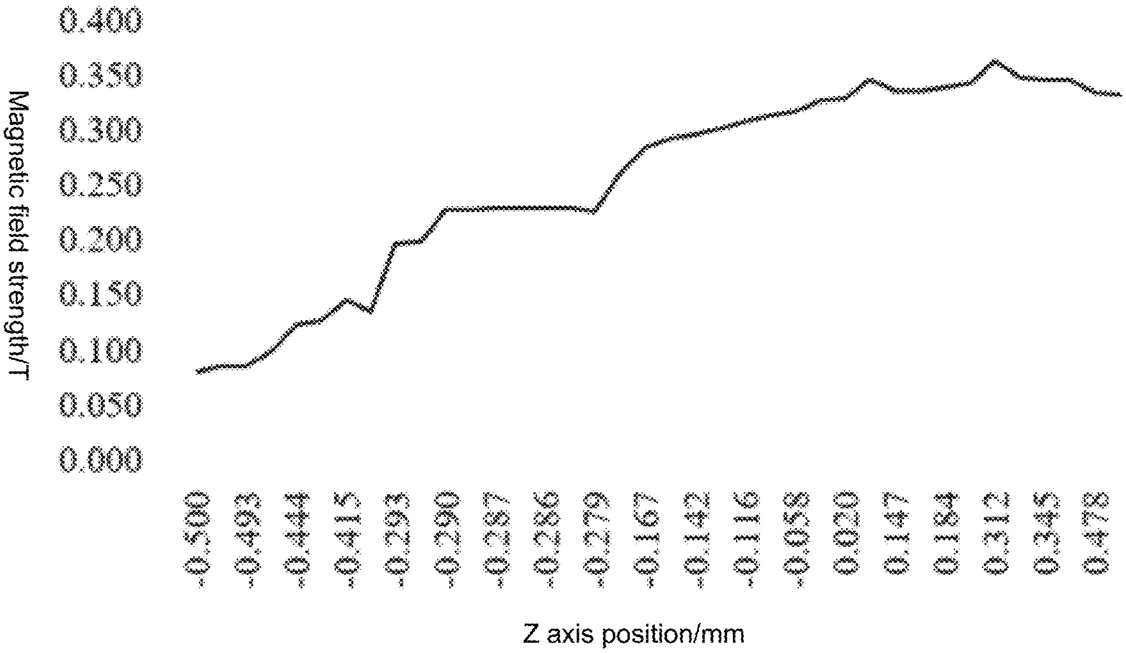
FIG. 27 is a schematic diagram illustrating the change of the magnetic field strength of the magnetic circuit assembly in FIG. 26 according to the present disclosure.

FIG. 27 is a schematic diagram illustrating the change of magnetic field strength of the magnetic circuit assembly in FIG. 26 according to the present disclosure. In a magnetic gap, the magnetic field strength at different points in the Z axis direction may be measured along the direction of the Z axis shown in FIG. 26. As shown in FIG. 27, the magnetic field strength may be distributed uniformly near the zero point of the Z axis (e.g., 0.312 mm). As the second magnetic conduction element 2603 is connected with the first magnetic element 2601 and the first magnetic conduction element 2602, the magnetic field strength near the zero point (e.g., 0.312 mm) of the Z axis may be improved compared with that of the magnetic circuit assembly in FIG. 24, and may be about 0.35 T.

Figure 28:
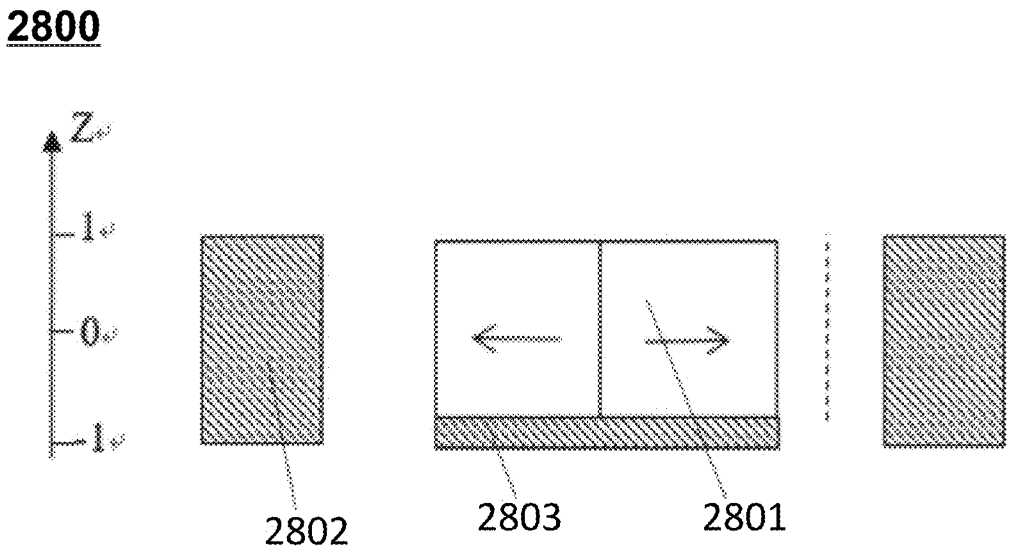
FIG. 28 is a schematic diagram illustrating the lengthwise section of a magnetic circuit assembly according to some embodiments of the present disclosure.

FIG. 28 is a schematic diagram illustrating the lengthwise section of a magnetic circuit assembly according to some embodiments of the present disclosure. As shown in FIG. 28, a magnetic circuit assembly 2800 may include a first magnetic element 2801, a first magnetic conduction element 2802, and a second magnetic conduction element 2803. Compared with the embodiment shown in FIG. 24, the magnetic circuit assembly 2800 may further include a second magnetic conduction element 2803, and the top surface of the second magnetic conduction element 2803 may be connected with the bottom surface of the first magnetic element 2801. The difference between the embodiments shown in FIG. 26 and this embodiment may be that the top surface of the second magnetic conduction element 2803 is only connected with the bottom surface of the first magnetic element 2801, and is not connected with the bottom surface of the first magnetic conduction element 2802.

In some embodiments, the first magnetic element 2801 and the first magnetic conduction element 2802 may be cylinders, cuboids or triangular prisms, etc. The sizes and the shapes of the cross sections, perpendicular to the Z axis, of the first magnetic element 2801 and the first magnetic conduction element 2802 may be the same. In some embodiments, the sum of the thicknesses of the first magnetic element 2801 and the second magnetic conduction element 2803 may be equal to the thickness of the first magnetic conduction element 2802.

Figure 29:
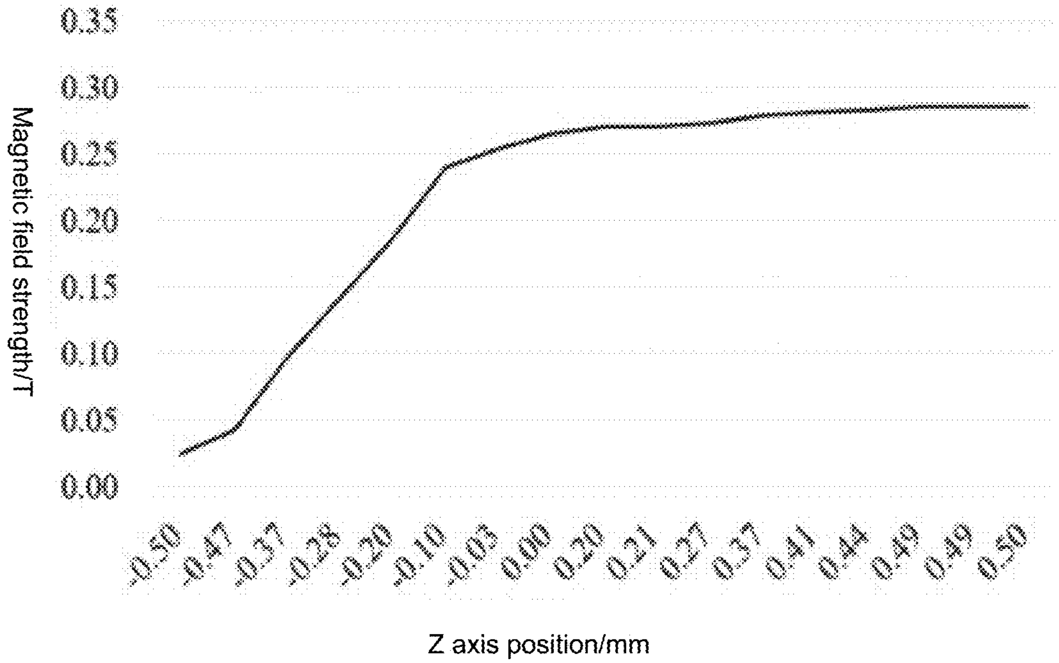
FIG. 29 is a schematic diagram illustrating the change of the magnetic field strength of the magnetic circuit assembly in FIG. 28 according to the present disclosure.

FIG. 29 is a schematic diagram illustrating the change of magnetic field strength of the magnetic circuit assembly in FIG. 28 according to the present disclosure. In a magnetic gap, the magnetic field strength at different points in the Z axis direction may be measured along the direction of the Z axis shown in FIG. 28. As shown in FIG. 29, the magnetic field strength may be uniformly distributed near the zero point position (e.g., within −0.03 mm-0.5 mm). As the second magnetic conduction element 2803 is added, compared with the magnetic circuit assembly in FIG. 24, the magnetic field strength near the zero point of the Z axis (e.g., 0.49 mm) may be improved to about 0.32 T. Further, as the top surface of the second magnetic conduction element 2803 is not connected with the bottom surface of the first magnetic conduction element 2802, compared with the magnetic circuit assembly in FIG. 26, the magnetic field strength near the zero point (e.g., 0.49 mm) may be reduced.

Figure 30:
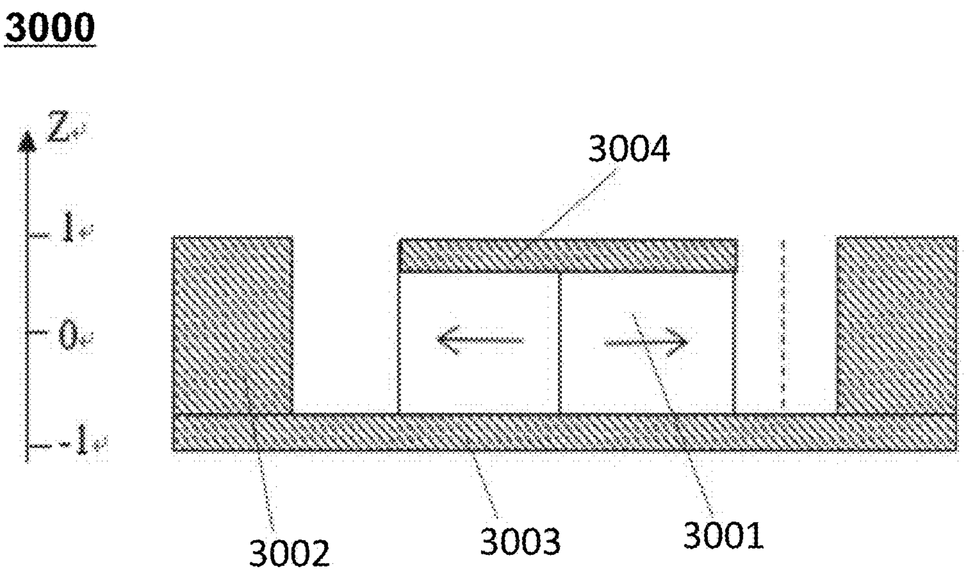
FIG. 30 is a schematic diagram illustrating the lengthwise section of a magnetic circuit assembly according to some embodiments of the present disclosure.

FIG. 30 is a schematic diagram illustrating the lengthwise section of a magnetic circuit assembly according to some embodiments of the present disclosure. As shown in FIG. 30, a magnetic circuit assembly 3000 may include a first magnetic element 3001, a first magnetic conduction element 3002, a second magnetic conduction element 3003, and a third magnetic conduction element 3004. Compared with the embodiment shown in FIG. 26, the magnetic circuit assembly 3000 further includes the third magnetic conduction element 3004, the bottom surface of the third magnetic conduction element 3004 may be connected with the top surface of the first magnetic element 3001.

In some embodiments, the first magnetic element 3001 and the third magnetic conduction element 3004 may be cylinders or cuboids. The sizes and the shapes of the cross sections, perpendicular to the Z axis, of the first magnetic element 3001 and the third magnetic conduction element 3004 may be the same. In some embodiments, the sum of the thicknesses of the first magnetic element 3001 and the third magnetic conduction element 3004 may be equal to the thickness of the first magnetic conduction element 3002.

Figure 31:
FIG. 31 is a schematic diagram illustrating the change of the magnetic field strength of the magnetic circuit assembly in FIG. 30 according to the present disclosure.

FIG. 31 is a schematic diagram illustrating the change of magnetic field strength of the magnetic circuit assembly in FIG. 30 according to the present disclosure. In a magnetic gap, the magnetic field strength at different points in the Z axis direction may be measured along the direction of the Z axis shown in FIG. 30. As shown in FIG. 31, the magnetic field strength in the magnetic gap may be distributed uniformly near the zero point of the Z axis (e.g., within −0.095-0.106 mm). Further, as the bottom surface of the third magnetic conduction element 3004 is connected with the top surface of the first magnetic element 3001, compared with the magnetic circuit assembly in FIG. 26, the magnetic field strength near the zero point of the Z axis (e.g., 0.081 mm) may be reduced to about 0.28 T.

Figure 32:
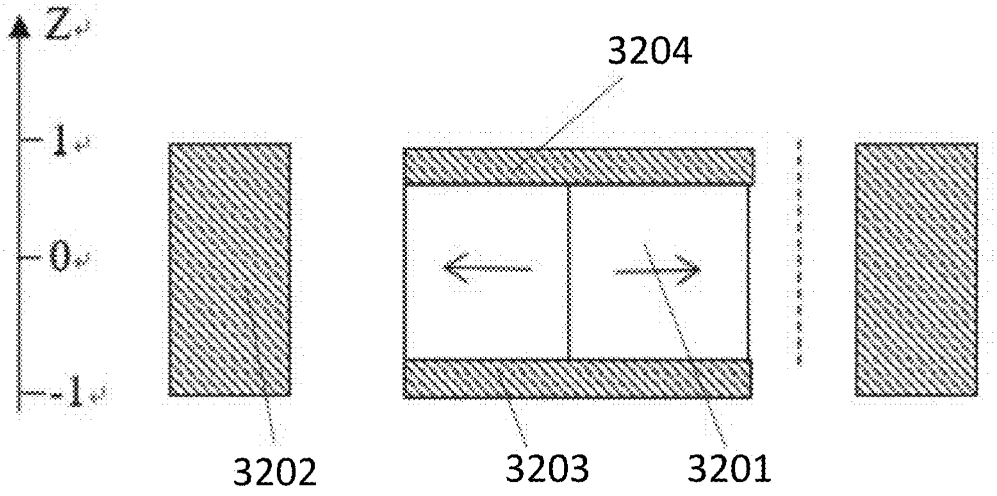
FIG. 32 is a schematic diagram illustrating the lengthwise section of a magnetic circuit assembly according to some embodiments of the present disclosure.

FIG. 32 is a schematic diagram illustrating the lengthwise section of magnetic circuit assemblies according to some embodiments of the present disclosure. As shown in FIG. 32, a magnetic circuit assembly 3200 may include a first magnetic element 3201, a first magnetic conduction element 3202, a second magnetic conduction element 3203, and a third magnetic conduction element 3204. Compared with the embodiment shown in FIG. 28, the magnetic circuit assembly 3200 further includes a third magnetic conduction element 3204, and the bottom surface of the third magnetic conduction element 3204 may be connected with the first magnetic conduction element 3202.

In some embodiments, the first magnetic element 3201, the second magnetic conduction element 3203, and the third magnetic conduction element 3204 may be cylinders, cuboids, or triangular prisms, etc. The shapes and sizes of the cross sections, perpendicular to the Z axis, of the first magnetic element, the second magnetic conduction element and the third magnetic conduction element may be the same. In some embodiments, the sum of the thicknesses of the first magnetic element 3201, the second magnetic conduction element 3203, and the third magnetic conduction element 3204 may be equal to the thickness of the first magnetic conduction element 3202.

Figure 33:
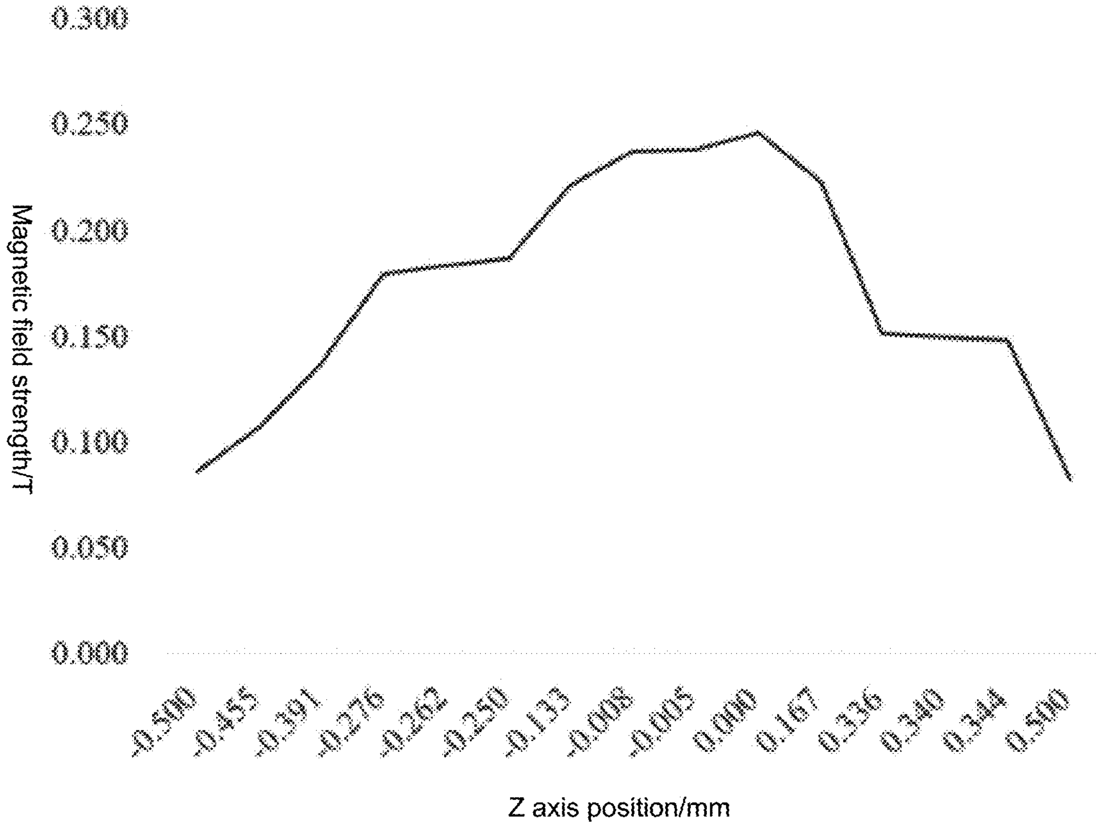
FIG. 33 is a schematic diagram illustrating the change of the magnetic field strength of the magnetic circuit assembly in FIG. 32 according to the present disclosure.

FIG. 33 is a schematic diagram illustrating the change of magnetic field strength of the magnetic circuit assembly in FIG. 32 according to the present disclosure. In a magnetic gap, the magnetic field strength at different points in the Z axis direction may be measured along the direction of the Z axis shown in FIG. 32. As shown in FIG. 33, the magnetic field strength in the magnetic gap may be uniformly distributed near the zero point of the Z axis, and as the bottom surface of the third magnetic conduction element 3204 is connected with the top surface of the first magnetic element 3201, compared with the magnetic circuit assembly in FIG. 28, the magnetic field strength near zero point of the Z axis (e.g., 0.000 mm) may be reduced to about 0.26 T.

It should be noted that in the embodiments shown in FIG. 24, FIG. 26, FIG. 28, FIG. 30, FIG. 32, on the basis of configuring the first magnetic element and the second magnetic element, those skilled in the art may further determine the number, positions, and forms of the magnetic elements according to the requirements, and the present disclosure makes no limitations on this. For example, the third magnetic conduction element 3204 and the first magnetic conduction element 3202 of the magnetic circuit assembly shown in FIG. 32 may be connected with each other.

Figure 34:
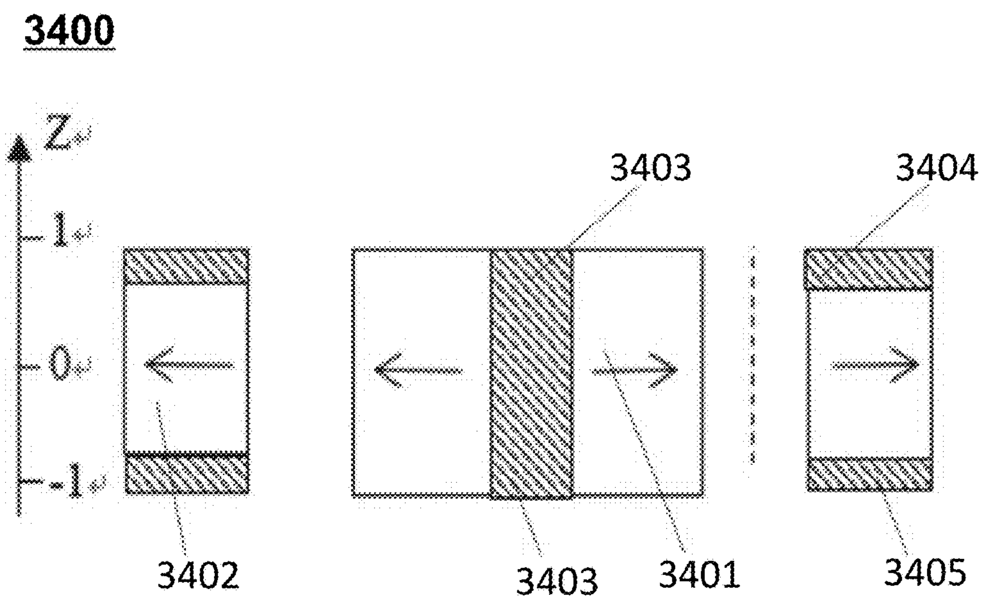
FIG. 34 is a schematic diagram illustrating the lengthwise section of a magnetic circuit assembly according to some embodiments of the present disclosure.

FIG. 34 is a schematic diagram illustrating the lengthwise section of a magnetic circuit assembly according to some embodiments of the present disclosure. As shown in FIG. 34, a magnetic circuit assembly 3400 may include a first magnetic element 3401, a second magnetic element 3402 and a first magnetic conduction element 3403. At least part of the first magnetic element 3401 may surround the first magnetic conduction element 3403 (that is, the inner surface or inner wall of the first magnetic element 3401 surrounds the outer surface or outer wall of the first magnetic conduction element 3403). At least part of the second magnetic element 3402 may surround the first magnetic element 3401 (that is, the inner surface or inner wall of the second magnetic element 3402 surrounds the outer surface or outer wall of the first magnetic element 3401). A magnetic gap may be formed between the first magnetic element 3401 and the inner ring of the second magnetic element 3402, and a voice coil may be configured in the magnetic gap.

The magnetization directions of the first magnetic element 3401 and the second magnetic element 3402 may be parallel to the top surfaces of the first magnetic element 3401 and/or the second magnetic element 3402 (that is, the horizontal direction in the figure) or may be perpendicular to the inner and outer surfaces. The magnetization directions of the first magnetic element 3401 and the second magnetic element 3402 may be parallel to each other.

In some embodiments, the magnetization direction of the first magnetic element 3401 may be from the center to the outside. The magnetization direction of the second magnetic element 3402 may be from the inside (the side close to the first magnetic element 3401) to the outside (the side away from the first magnetic element 3401) of the second magnetic element 3402. As another example, the magnetization direction of the first magnetic element 3401 may be from the outside to the center. The magnetization direction of the second magnetic element 3402 may be from the outside (the side away from the first magnetic element 3401) to the inside (the side close to the first magnetic element 3401) of the second magnetic element 3402.

In some embodiments, the placements of the first magnetic element 3401 and the second magnetic element 3402 may be such that different poles of the first magnetic element 3401 and the second magnetic element 3402 may be close to or away from each other. For example, the N pole of the first magnetic element 3401 may be located in the central area of the first magnetic element 3401, the S pole of the first magnetic element 3401 may be located in the outer area of the first magnetic element 3401, that is, inside the first magnetic element 3401, on the same plane parallel to the upper surface or the lower surface of the first magnetic element 3401, the direction of the magnetic induction lines or the magnetic field (that is, from the S pole to the N pole) may both point from the center to the outside; the N pole of the second magnetic element 3402 may be located in the outside area of the second magnetic element 3402, the S pole of the second magnetic element 3402 may be located in the inside area of the second magnetic element 3402, that is, inside the second magnetic element 3402, on the same plane parallel to the upper surface or the lower surface of the second magnetic element 3402, the direction of the magnetic induction lines or the magnetic field (that is, from the S pole to the N pole) may both point from the inside to the outside. As another example, the S pole of the first magnetic element 3401 may be located in the central area of the first magnetic element 3401, the N pole of the first magnetic element 3401 may be located in the outside area of the first magnetic element 3401. That is, inside the first magnetic element 3401, on the same plane parallel to the upper surface or the lower surface of the first magnetic element 3401, the direction of the magnetic induction lines or the magnetic field (that is, from the S pole to the N pole) may both from the outside to the inside. The S pole of the second magnetic element 3402 may be located in the outside area of the second magnetic element 3402, its N pole of the second magnetic element 3402 may be located in the inside area of the second magnetic element 3402. That is, inside the second magnetic element 3402, on the same plane parallel to the upper surface or the lower surface of the second magnetic element 3402, the direction of the magnetic induction line or the magnetic field (that is, from the S pole to the N pole) may both point from the outside to the inside.

In some alternative embodiments, the first magnetic element 3401 may include two or more magnets, and the magnetization directions of the two or more magnets may all be pointed to the second magnetic element 3402 (as shown in the figure, the magnetization directions of the magnets on the left and right side of the first magnetic element 3401 may be opposite, and respectively point to the second magnetic element 3402).

In some embodiments, the second magnetic element 3402 may further include two or more magnets, and the magnetization directions of the two or more magnets may point from the inside to the outside of the second magnetic element 3402. In some other embodiments, the magnetization direction of each magnetic element may further be in other directions. The combination of magnetic elements with different magnetic directions may further improve the magnetic field strength and/or make the distribution of the magnetic field strength more uniform.

It should be noted that in this embodiment, the horizontal direction may be understood as the direction perpendicular to the direction of the voice coil vibration, that is, the direction parallel to the plane of the top surface of the first magnetic element 3401. In addition, the magnetization directions of the first magnetic element 3401 and the second magnetic element 3402 may be parallel or may have a preset angle. The preset angle may be configured, for example, 60°, 80, 90°, 100°, etc. The connection methods between the magnetic conduction elements and the magnetic elements may include one or combinations of bonding, clamping, welding, riveting, and bolting, etc. For more descriptions of the magnetization directions of the first magnetic element 3401 and the second magnetic element 3402, please refer to the descriptions on magnetization directions of the first magnetic element 601 and the second magnetic element 602 in FIG. 6.

In some embodiments, the magnetic circuit assembly may further include a second magnetic conduction element 3404 and a third magnetic conduction element 3405. The bottom surface of the second magnetic conduction element 3404 may be connected with the top surface of the second magnetic element 3402, and the top surface of the third magnetic conduction element 3405 may be connected with the bottom surface of the second magnetic element 3402. In some embodiments, the first magnetic conduction element 3403 may be a cylinder, a cuboid, or a triangular prism, etc. The first magnetic element 3401, the second magnetic element 3402, the second magnetic conduction element 3404, and the third magnetic conduction element 3405 may be annuls (continuous annuls, non-continuous annuls, rectangular annuls, triangular annuls, etc.). The shapes and sizes of the cross sections of the second magnetic element 3402, the second magnetic conduction element 3404, and the third magnetic conduction element 3405 perpendicular to the Z axis may be the same. In some embodiments, the first magnetic element 3401 and the first magnetic conduction element 3403 may be the same in thickness. The sum of the thicknesses of the second magnetic element 3402, the second magnetic conduction element 3404, and the third magnetic conduction element 3405 may be equal to the thickness of the first magnetic element 3401, and the thickness of the first magnetic conduction element 3403.

Figure 35:
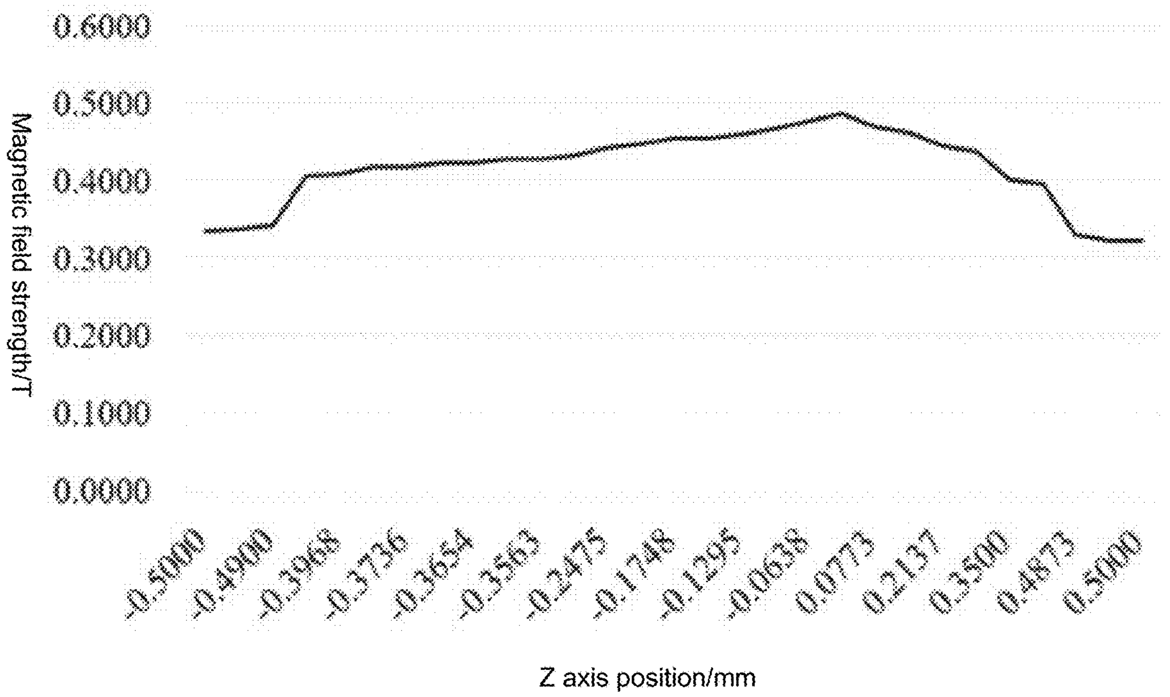
FIG. 35 is a schematic diagram illustrating the change of the magnetic field strength of the magnetic circuit assembly in FIG. 34 according to the present disclosure.

FIG. 35 is a schematic diagram illustrating the change of the magnetic field strength of the magnetic circuit assembly in FIG. 34 according to the present disclosure. In a magnetic gap, the magnetic field strength at different points in the Z axis direction may be measured along the direction of the Z axis shown in FIG. 34. As shown in FIG. 35, as the first magnetic element 3405 reduces a magnetic leakage of the magnetic circuit assembly, compared with the magnetic circuit assembly in FIG. 14, the magnetic field strength may be uniformly distributed along the Z axis.

Figure 36:
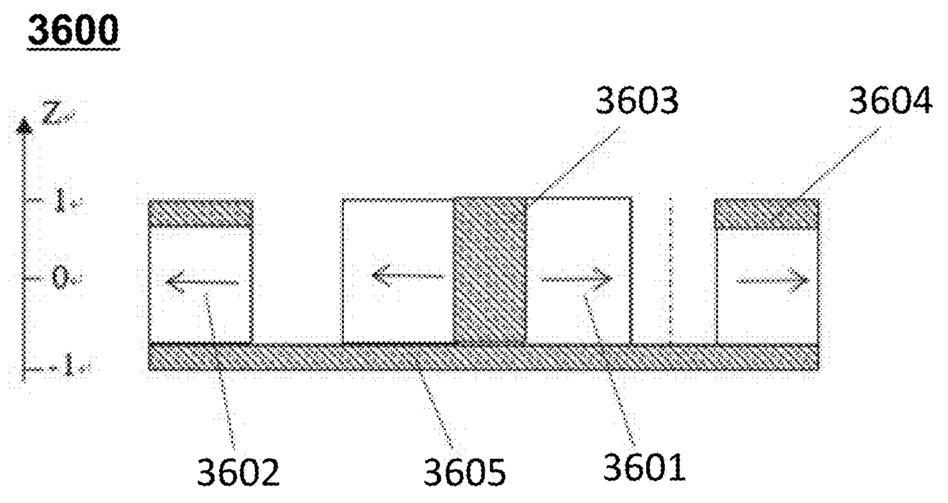
FIG. 36 is a schematic diagram illustrating the lengthwise section of a magnetic circuit assembly according to some embodiments of the present disclosure.

FIG. 36 is a schematic diagram illustrating the lengthwise section of a magnetic circuit assembly according to some embodiments of the present disclosure. As shown in FIG. 36, a magnetic circuit assembly 3600 may include a first magnetic element 3601, a second magnetic element 3602, a first magnetic conduction element 3603, a second magnetic conduction element 3604, and a third magnetic conduction element 3605. Compared with the embodiment shown in FIG. 34, in the magnetic circuit assembly 3600, the top surface of the third magnetic conduction element 3605 may be connected with the bottom surfaces of the first magnetic element 3601, the second magnetic element 3602, and the first magnetic conduction element 3603.

In some embodiments, the sum of the thicknesses of the second magnetic element 3602 and the second magnetic conduction element 3604 may be equal to the thickness of the first magnetic element 3601, and may be equal to the first magnetic conduction element 3603.

Figure 37:
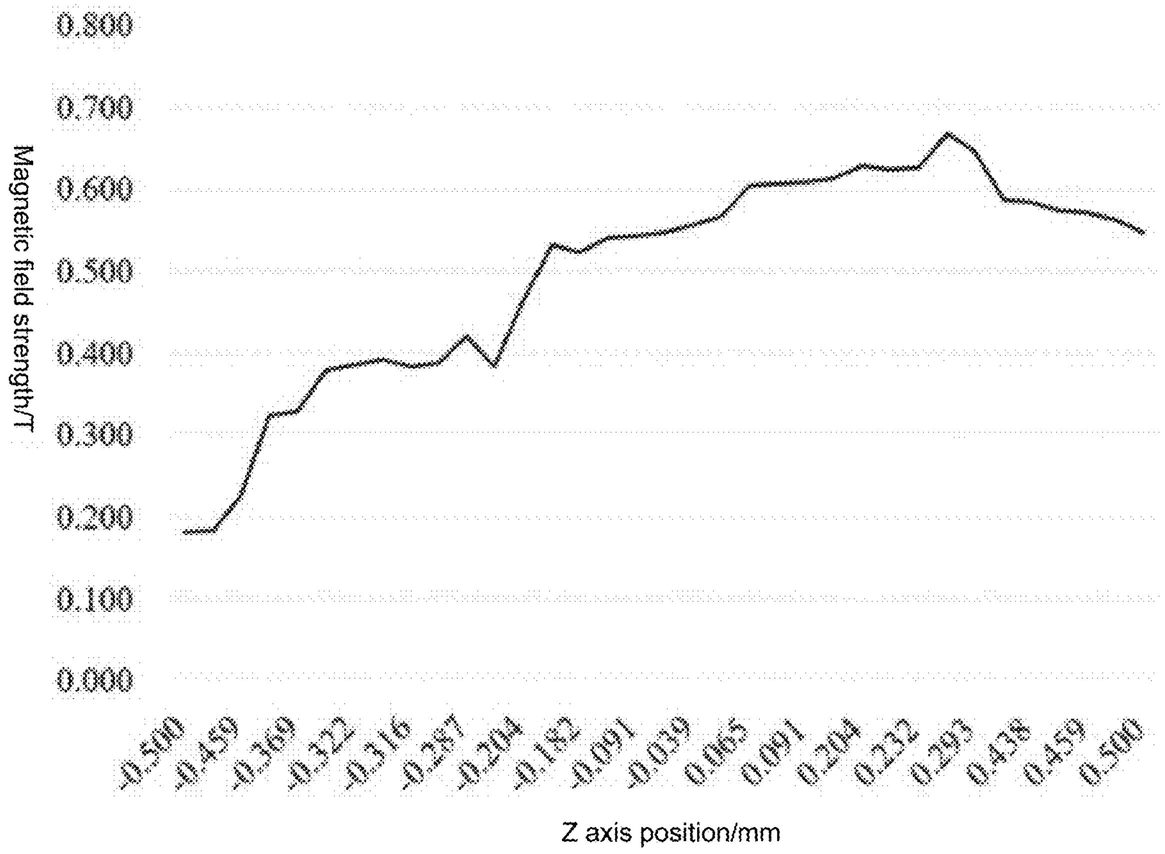
FIG. 37 is a schematic diagram illustrating the change of the magnetic field strength of the magnetic circuit assembly in FIG. 36 according to the present disclosure.

FIG. 37 is a schematic diagram illustrating the change of the magnetic field strength of the magnetic circuit assembly in FIG. 36 according to the present disclosure. In a magnetic gap, the magnetic field strength at different points in the Z axis direction may be measured along the direction of the Z axis shown in FIG. 36. As shown in FIG. 37, the magnetic field strength may be uniformly distributed near the zero point of the Z axis (within −0.091-0.232 mm). As the top surface of the third magnetic conduction element 3605 is connected with the bottom surfaces of the first magnetic element 3601, the second magnetic element 3602, and the first magnetic conduction element 3603, compared with the magnetic circuit assembly of FIG. 34, the magnetic field strength near the zero point of the Z axis (e.g., 0.232 mm) may be improved to about 0.68 T.

Figure 38:
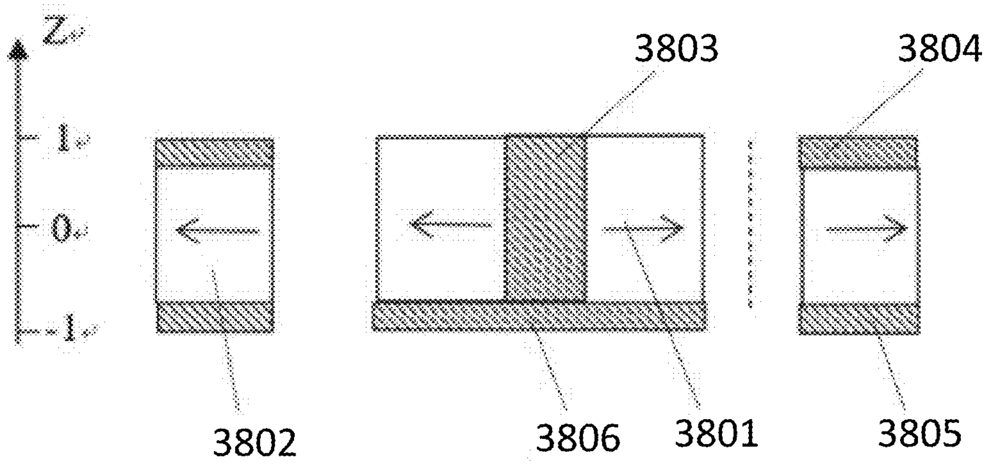
FIG. 38 is a schematic diagram illustrating the lengthwise section of a magnetic circuit assembly according to some embodiments of the present disclosure.

FIG. 38 is a schematic diagram illustrating the lengthwise section of a magnetic circuit assembly according to some embodiments of the present disclosure. As shown in FIG. 38, a magnetic circuit assembly 3800 may include a first magnetic element 3801, a second magnetic element 3802, a first magnetic conduction element 3803, a second magnetic conduction element 3804, a third magnetic conduction element 3805, and a fourth magnetic conduction element 3806. Compared with the embodiment shown in FIG. 34, the magnetic circuit assembly further includes the fourth magnetic conduction element 3806, and the top surface of the fourth magnetic conduction element 3806 may be connected with the bottom surfaces of the first magnetic conduction element 3803 and the first magnetic element 3801. The third magnetic conduction element 3805 and the fourth magnetic conduction element 3806 may be spaced apart in a magnetic gap.

In some embodiments, the shapes and sizes of the outer contours of the cross sections of the fourth magnetic conduction element 3806 and the outer ring of the first magnetic element 3801 perpendicular to the Z axis may be the same. In some embodiments, the third magnetic conduction element 3805 and the fourth magnetic conduction element 3806 may be the same in thickness. The first magnetic conduction element 3803, the first magnetic element 3801 and the second magnetic element 3802 may be the same in thickness.

Figure 39:
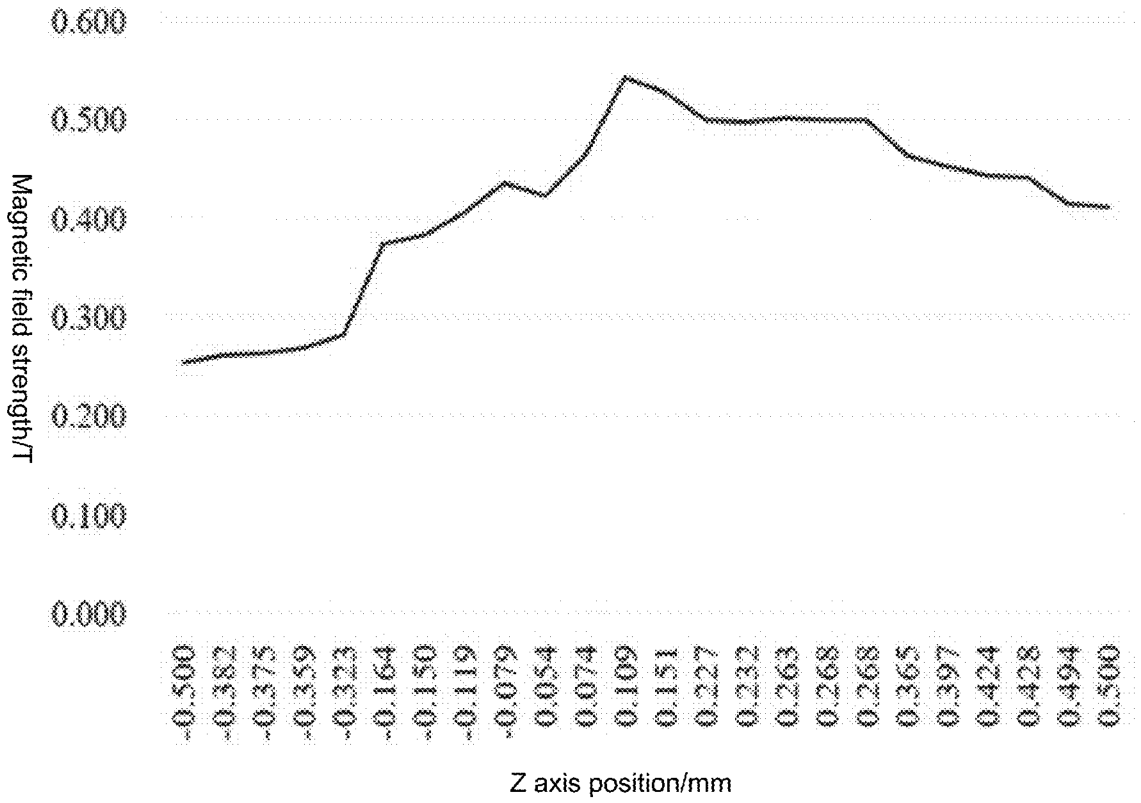
FIG. 39 is a schematic diagram illustrating the change of the magnetic field strength of the magnetic circuit assembly in FIG. 38 according to the present disclosure.

FIG. 39 is a schematic diagram illustrating the change of the magnetic field strength of the magnetic circuit assembly in FIG. 38 according to the present disclosure. In a magnetic gap, the magnetic field strength at different points in the Z axis direction may be measured along the direction of the Z axis shown in FIG. 38. As shown in FIG. 39, the magnetic field strength may be uniformly distributed near the zero point of the Z axis (e.g., within −0.227-0.5 mm). As the fourth magnetic conduction element 3806 is added, compared to the magnetic circuit assembly in FIG. 34, the magnetic field strength near the zero point of the Z axis (e.g., 0.109 mm) may be improved to about 0.54 T.

Figure 40:
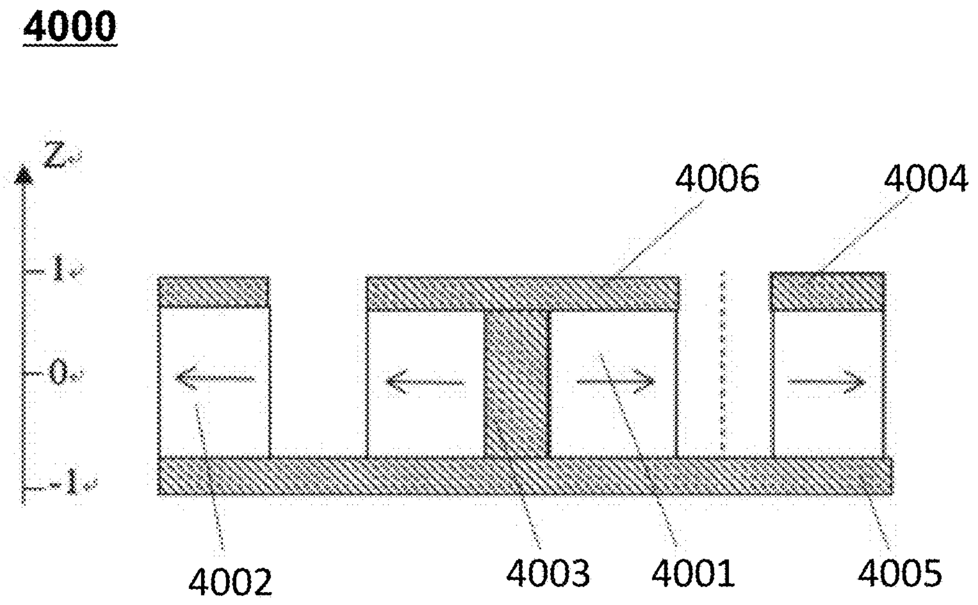
FIG. 40 is a schematic diagram illustrating the lengthwise section of a magnetic circuit assembly according to some embodiments of the present disclosure.

FIG. 40 is a schematic diagram illustrating the lengthwise section of a magnetic circuit assembly according to some embodiments of the present disclosure. As shown in FIG. 40, a magnetic circuit assembly 4000 may include a first magnetic element 4001, a second magnetic element 4002, a first magnetic conduction element 4003, a second magnetic conduction element 4004, a third magnetic conduction element 4005, and a fourth magnetic conduction element 4006. Compared with the embodiment shown in FIG. 36, the magnetic circuit assembly 4000 further includes the fourth magnetic conduction element 4006, and the bottom surface of the fourth magnetic conduction element 4006 may be connected with the first magnetic conduction element 4003 and the first magnetic element 4001.

In some embodiments, the first magnetic conduction element 4003, the third magnetic conduction element 4005, and the fourth magnetic conduction element 4006 may be cylinders, cuboids, or triangular prisms, etc. The second magnetic conduction element 4004 may be an annual (continuous annual, non-continuous annual, rectangular annual, triangular annual, etc.). The first magnetic element 4001, the second magnetic element 4002, the first magnetic conduction element 4003 may be the same in thickness, the second magnetic conduction element 4004 and the fourth magnetic conduction element 4006 may be the same in thickness.

Figure 41:
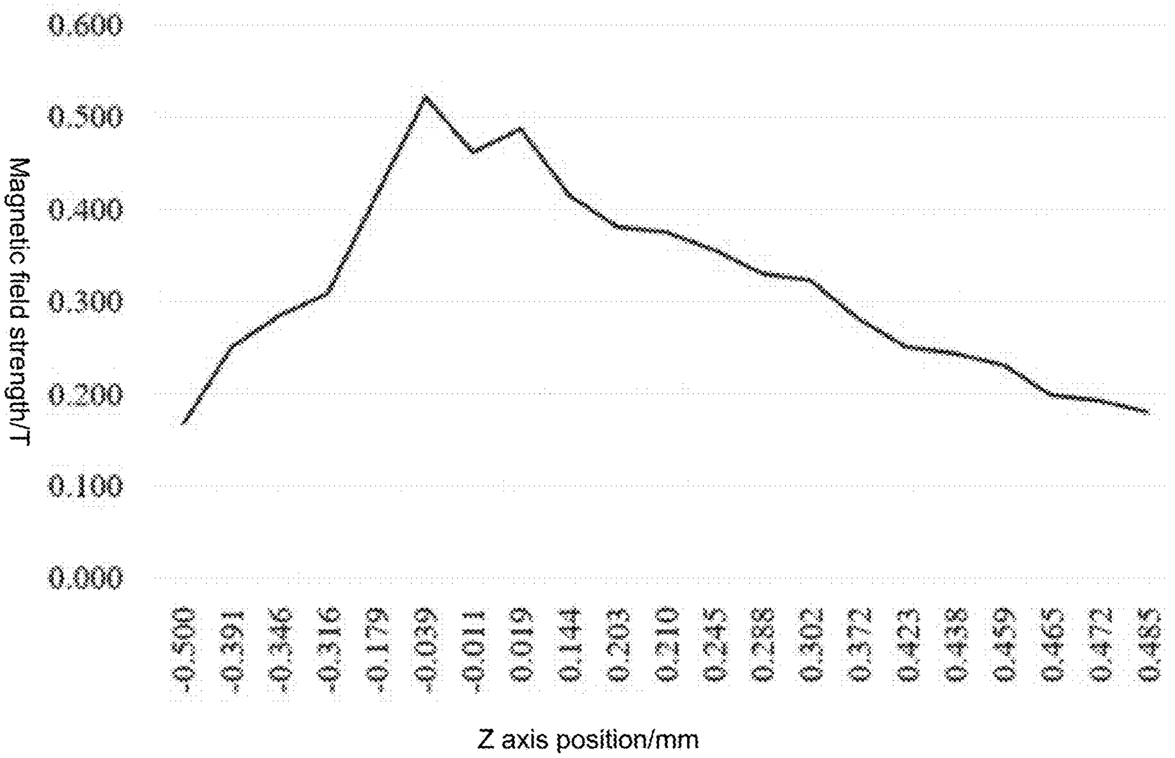
FIG. 41 is a schematic diagram illustrating the change of the magnetic field strength of the magnetic circuit assembly in FIG. 40 according to the present disclosure.

FIG. 41 is a schematic diagram illustrating the change of the magnetic field strength of the magnetic circuit assembly in FIG. 40 according to the present disclosure. In a magnetic gap, the magnetic field strength at different points in the Z axis direction may be measured along the direction of the Z axis shown in FIG. 40. As shown in FIG. 41, the magnetic field strength may be symmetrically distributed near the zero point of the Z axis. As the fourth magnetic conduction element 3806 is added, compared to the magnetic circuit assembly in FIG. 36, the magnetic field strength near the zero point of the Z axis (e.g., 0.312 mm) may be reduced to about 0.54 T.

Figure 42:
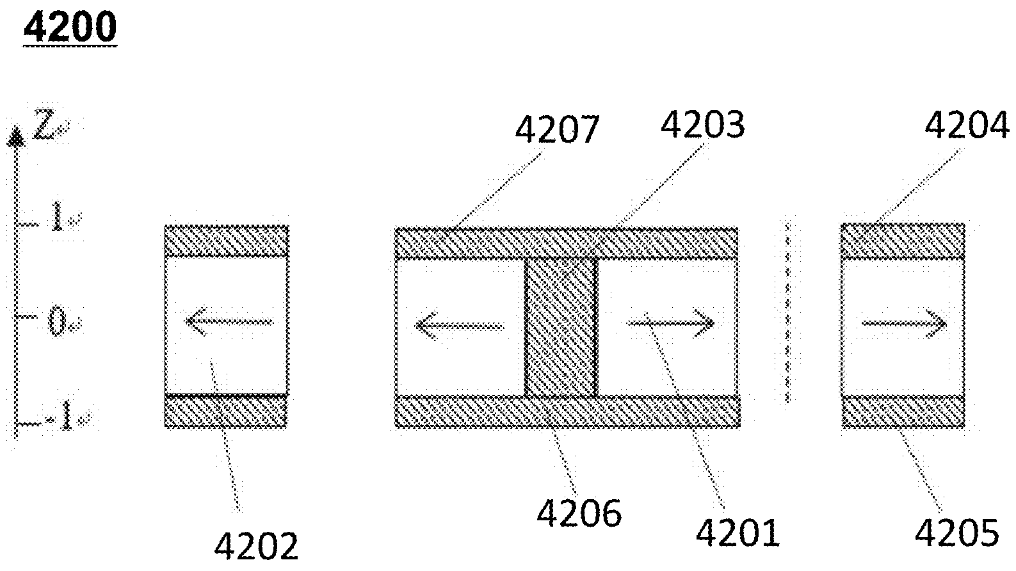
FIG. 42 is a schematic diagram illustrating the lengthwise section of a magnetic circuit assembly according to some embodiments of the present disclosure.

FIG. 42 is a schematic diagram illustrating the lengthwise section of a magnetic circuit assembly according to some embodiments of the present disclosure. As shown in FIG. 42, a magnetic circuit assembly 4200 may include a first magnetic element 4201, a second magnetic element 4202, a first magnetic conduction element 4203, a second magnetic conduction element 4204, a third magnetic conduction element 4205, a fourth magnetic conduction element 4206 and a fifth magnetic conduction element 4207. Compared with the embodiment shown in FIG. 38, the magnetic circuit assembly 4200 may further include the fifth magnetic conduction element 4207. The bottom surface of the fifth magnetic conduction element 4207 may be connected with the top surfaces of the first magnetic conduction element 4203 and the first magnetic element 4201. The fifth magnetic conduction element 4207 and the second magnetic conduction element 4204 may be spaced apart in a magnetic gap.

In some embodiments, the fourth magnetic conduction element 4206 and the fifth magnetic conduction element 4207 may be the same in thickness and the shape and size of the cross-section on the vertical Z axis. The fifth magnetic conduction element 4207 and the second magnetic conduction element 4204 may be the same in thickness.

Figure 43:
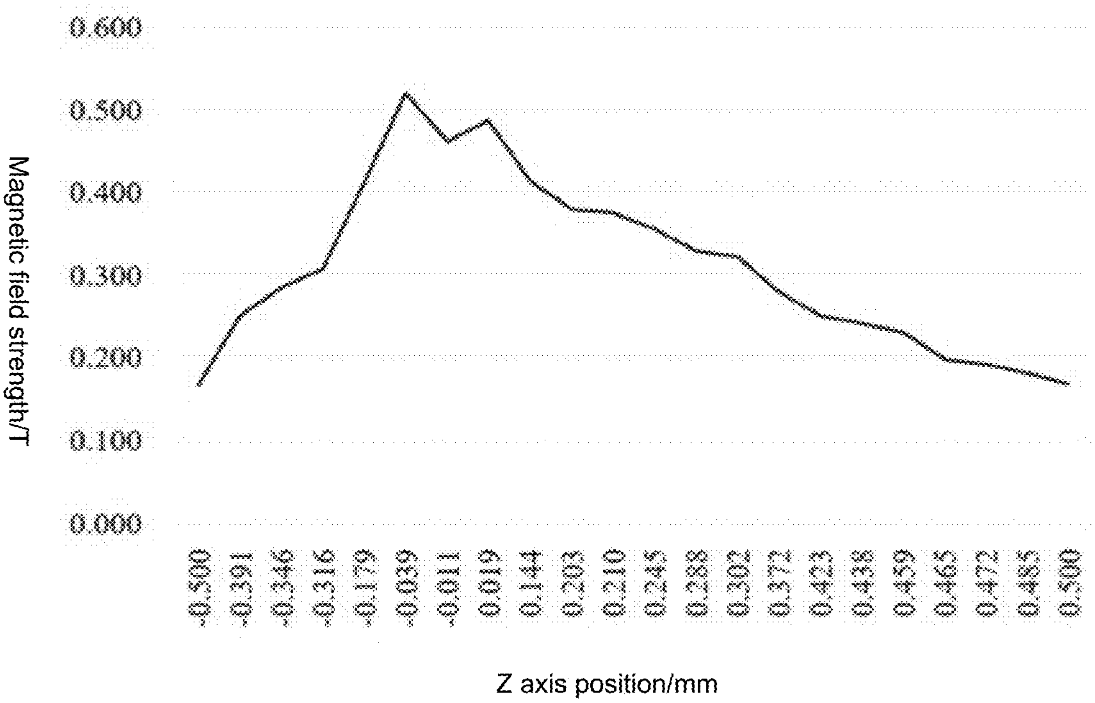
FIG. 43 is a schematic diagram illustrating the change of the magnetic field strength of the magnetic circuit assembly in FIG. 42 according to the present disclosure.

FIG. 43 is a schematic diagram illustrating the change of the magnetic field strength of the magnetic circuit assembly in FIG. 42 according to the present disclosure. In a magnetic gap, the magnetic field strength at different points in the Z axis direction may be measured along the direction of the Z axis shown in FIG. 42. As shown in FIG. 43, the distributions of the magnetic strengths may be highly symmetrical beside the zero point of the Z axis. As a fifth magnetic conduction element 4207 is added, compared with the magnetic circuit assembly in FIG. 38, the magnetic field strengths near the zero point of the Z axis (e.g., 0.151 mm) may be close to each other.

It should be noted that in the embodiments shown in FIG. 34, FIG. 36, FIG. 38, FIG. 40, FIG. 42, on the basis of configuring the first magnetic element, the second magnetic element, and the first magnetic conduction element, those skilled in the art may further determine the number, positions and forms of the magnetic conduction elements according to requirements, and the present disclosure makes no limitations on this. For example, the fourth magnetic conduction element 4006 of the magnetic circuit assembly of the embodiment shown in FIG. 40 may be connected with the second magnetic conduction element 4004.

Figure 44:
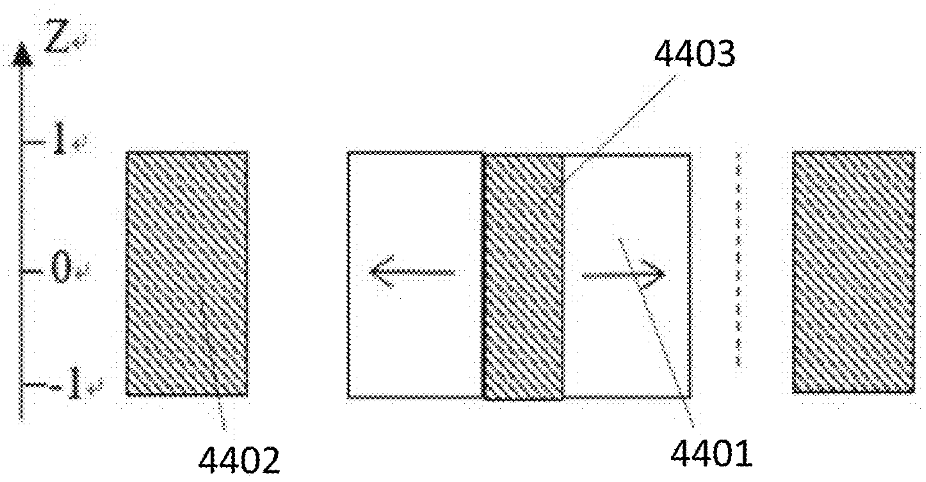
FIG. 44 is a schematic diagram illustrating the lengthwise section of a magnetic circuit assembly according to some embodiments of the present disclosure.

FIG. 44 is a schematic diagram illustrating the lengthwise section of a magnetic circuit assembly according to some embodiments of the present disclosure. As shown in FIG. 44, a magnetic circuit assembly 4400 may include a first magnetic element 4401, a first magnetic conduction element 4402, and a second magnetic conduction element 4403. At least part of the first magnetic element 4401 surrounds the second magnetic conduction element 4403, the first magnetic conduction element 4402 surrounds the first magnetic element 4401, the first magnetic element 4401 and the first magnetic element 4402 may form a magnetic gap. A voice coil may be configured in the magnetic gap.

In some embodiments, the magnetization direction of the first magnetic element 4401 may be parallel to the top surface of the first magnetic element 4401 (that is, the horizontal direction in the figure). In some embodiments, the magnetization direction of the first magnetic element 4401 may point from the first magnetic element 4401 to the first magnetic element 4402. In some embodiments, the magnetization direction of the first magnetic assembly 4401 may point from the first magnetic element 4401 to the second magnetic conduction element 4403. More descriptions of the first magnetic element 4401 and its magnetization direction may be referred to in the detailed description of the first magnetic element 1401 in FIG. 14.

It should be noted that in this embodiment, the horizontal direction may be understood as the direction perpendicular to the vibration direction of a voice coil, that is, the direction parallel to the plane of the top surface of the first magnetic element 4401. The connection method between the magnetic conduction elements and the magnetic elements may include one or combinations of bonding, clamping, welding, riveting, and bolting, etc.

In some embodiments, the shape of the second magnetic conduction element 4403 may be a cylinder or a cuboid, etc. In some embodiments, the first magnetic element 4401, the first magnetic conduction element 4402, and the second magnetic conduction element 4403 may be the same in thickness.

Figure 45:
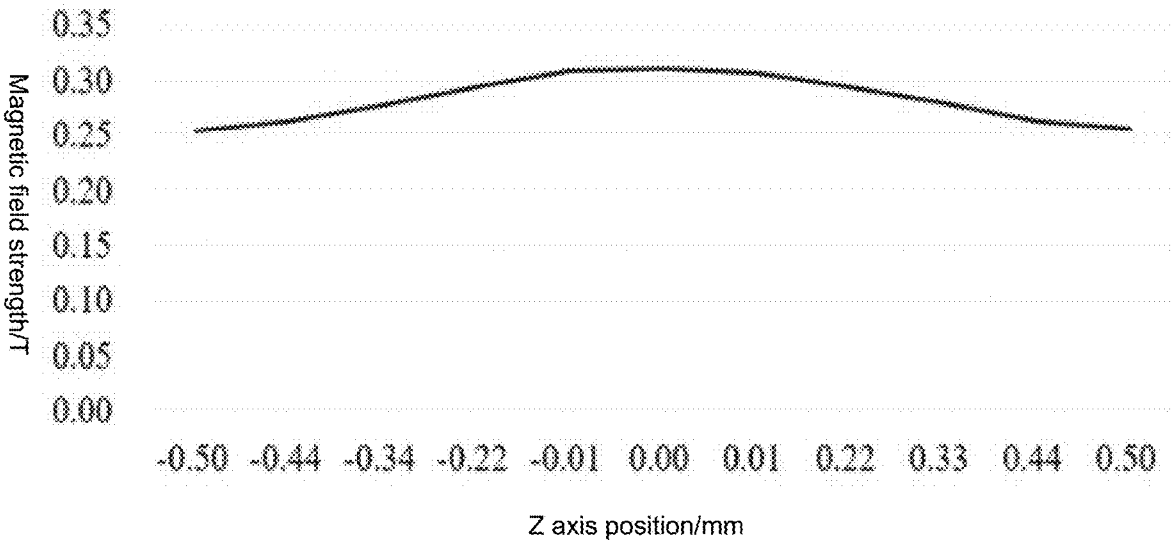
FIG. 45 is a schematic diagram illustrating the change of the magnetic field strength of the magnetic circuit assembly in FIG. 44 according to the present disclosure.

FIG. 45 is a schematic diagram illustrating the change of the magnetic field strength of the magnetic circuit assembly in FIG. 44 according to the present disclosure. In a magnetic gap shown in FIG. 44, the magnetic field strength at different points in the Z axis direction may be measured along the direction of the Z axis shown in FIG. 44. As shown in FIG. 45, the maximum value of the magnetic field strength (e.g., the maximum value at the zero position) may be about 0.3 T, the magnetic field strength may be very uniformly distributed along the Z axis, and the magnetic field strength at the zero point height of the Z axis may be height symmetry.

Figure 46:
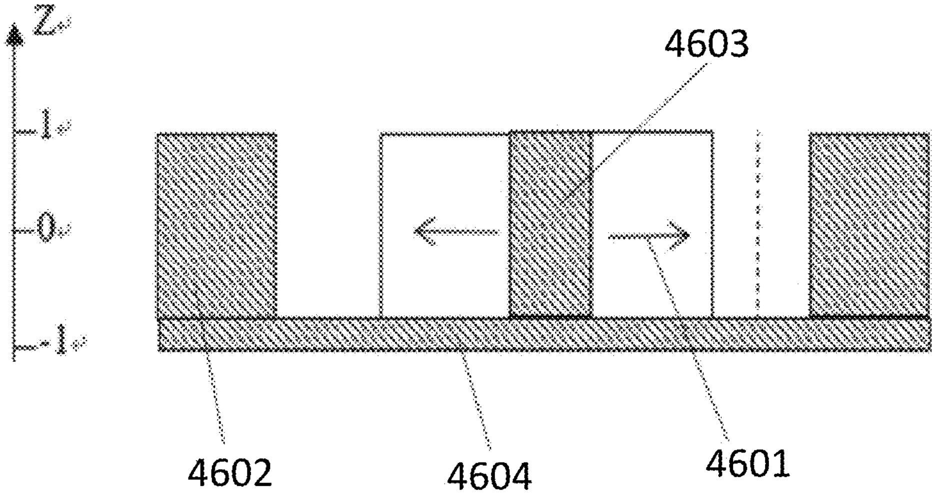
FIG. 46 is a schematic diagram illustrating the lengthwise section of a magnetic circuit assembly according to some embodiments of the present disclosure.

FIG. 46 is a schematic diagram illustrating the lengthwise section of a magnetic circuit assembly according to some embodiments of the present disclosure. As shown in FIG. 46, a magnetic circuit assembly 4600 may include a first magnetic element 4601, a first magnetic conduction element 4602, a second magnetic conduction element 4603, and a third magnetic conduction element 4604. Compared with the embodiment shown in FIG. 44, the magnetic circuit assembly 4600 further includes the third magnetic conduction element 4604, and the top surface of the third magnetic conduction element 4604 may be connected with the bottom surfaces of the first magnetic element 4601, the first magnetic conduction element 4602 and the second magnetic conduction element 4603.

Figure 47:
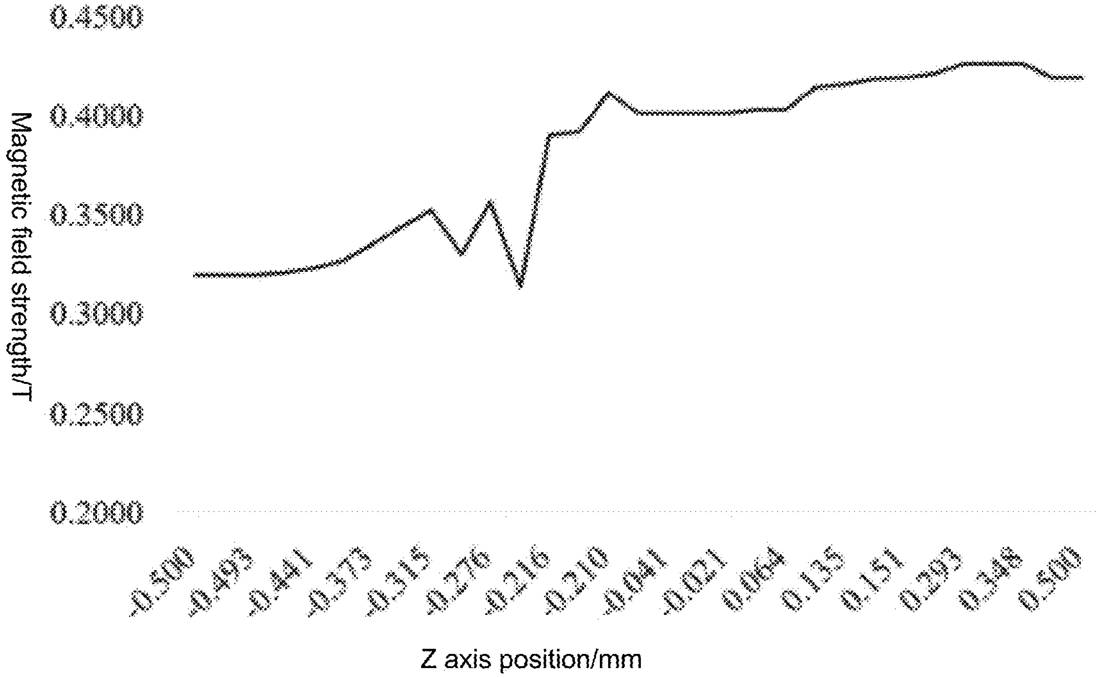
FIG. 47 is a schematic diagram illustrating the change of the magnetic field strength of the magnetic circuit assembly in FIG. 46 according to the present disclosure.

FIG. 47 is a schematic diagram illustrating the change of the magnetic field strength of the magnetic circuit assembly in FIG. 46 according to the present disclosure. In a magnetic gap, the magnetic field strength at different points in the Z axis direction may be measured along the direction of the Z axis shown in FIG. 46. As shown in FIG. 47, the magnetic field strength may be uniformly distributed along the Z axis (e.g., within −0.041-0.500 mm). As a third magnetic conduction element 4604 is added, compared to the magnetic circuit assembly in FIG. 44, a magnetic field strength near the zero point of the Z axis (e.g., 0.348 mm) may be about 0.43 T.

Figure 48:
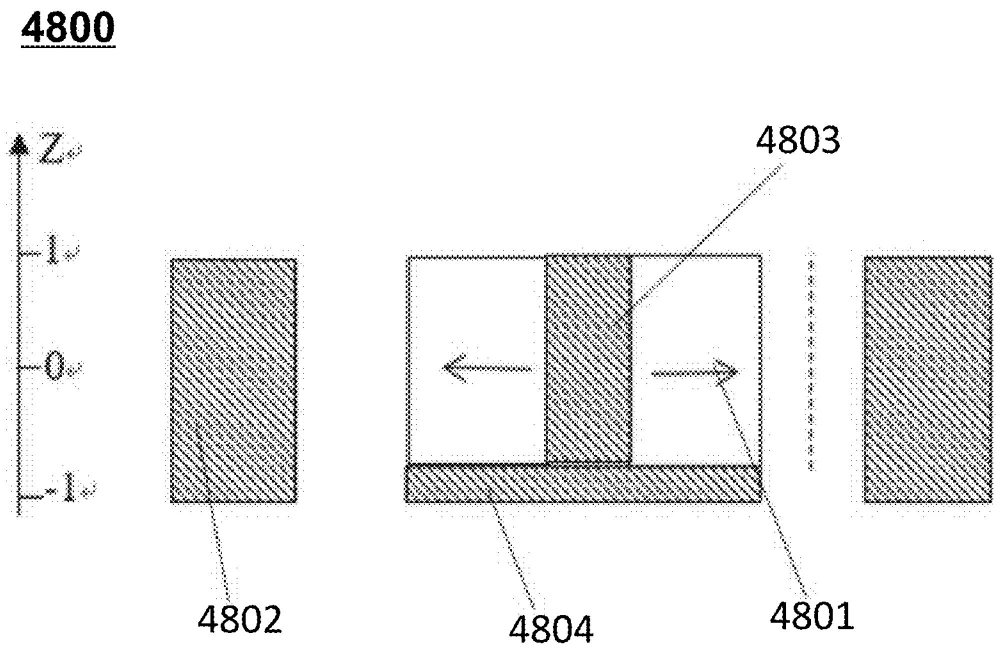
FIG. 48 is a schematic diagram illustrating the lengthwise section of a magnetic circuit assembly according to some embodiments of the present disclosure.

FIG. 48 is a schematic diagram illustrating the lengthwise section of a magnetic circuit assembly according to some embodiments of the present disclosure. As shown in FIG. 48, a magnetic circuit assembly 4800 may include a first magnetic element 4801, a first magnetic conduction element 4802, a second magnetic conduction element 4803, and a third magnetic conduction element 4804. Compared with the embodiment shown in FIG. 44, the magnetic circuit assembly 4800 further includes the third magnetic conduction element 4804, and the top surface of the third magnetic conduction element 4804 may be connected with the bottom surfaces of the first magnetic element 4801 and the second magnetic conduction element 4803. Compared with the embodiment shown in FIG. 46, in the magnetic circuit assembly 4800, the top surface of the third magnetic conduction element 4804 may be connected with the bottom surfaces of the second magnetic conduction element 4803 and the first magnetic element 4801, and may no longer connected with the bottom surface of the first magnetic conduction element 4802.

In some embodiments, the third magnetic conduction element 4804 may be a cylinder, a cuboid, or a triangular prism, etc. The shapes and sizes of the outer contours of the cross sections of the third magnetic conduction element 4804 and the outer ring of the first magnetic element 4801 perpendicular to the Z axis may be the same. In some embodiments, the sum of the thicknesses of the first magnetic element 4801 and the third magnetic conduction element 4804 may be equal to the thickness of the first magnetic conduction element 4802.

Figure 49:
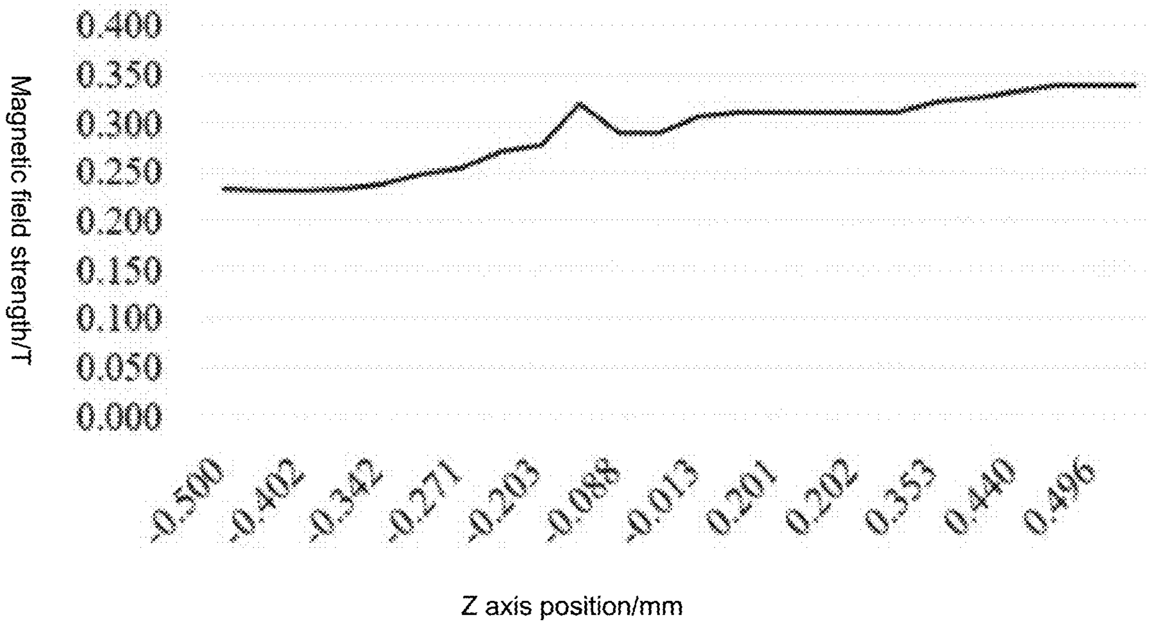
FIG. 49 is a schematic diagram illustrating the change of the magnetic field strength of the magnetic circuit assembly in FIG. 48 according to the present disclosure.

FIG. 49 is a schematic diagram illustrating the change of the magnetic field strength of the magnetic circuit assembly in FIG. 48 according to the present disclosure. In a magnetic gap, the magnetic field strength at different points in the Z axis direction may be measured along the direction of the Z axis shown in FIG. 48. As shown in FIG. 49, the magnetic field strength may be uniformly distributed along the Z axis in general. As the third magnetic conduction element 4804 is added, compared with the magnetic circuit assembly in FIG. 44, the magnetic field strength near the zero point of the Z axis may be increased to about 0.34 T.

Figure 50:
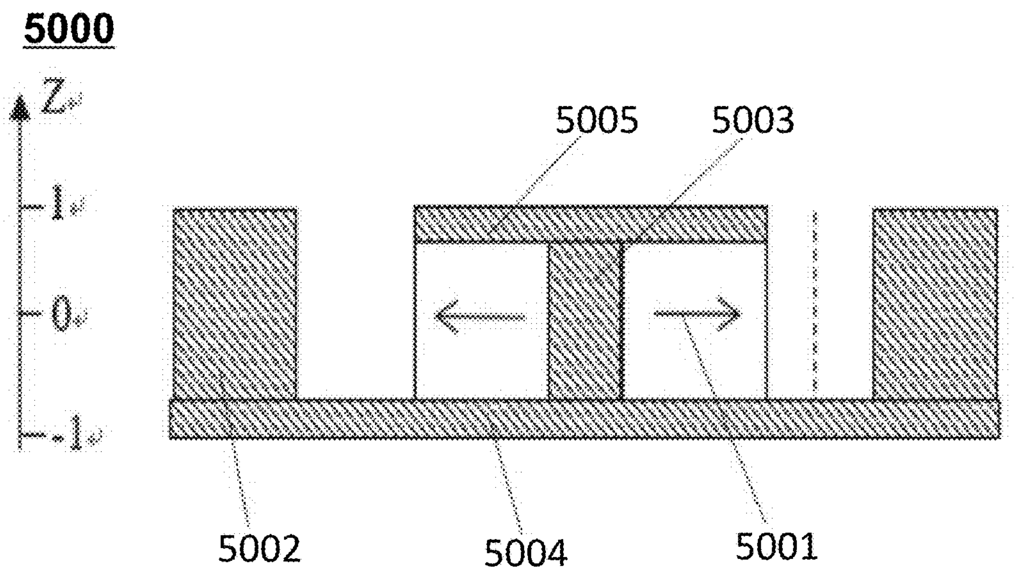
FIG. 50 is a schematic diagram illustrating the lengthwise section of a magnetic circuit assembly according to some embodiments of the present disclosure.

FIG. 50 is a schematic diagram illustrating the lengthwise section of a magnetic circuit assembly according to some embodiments of the present disclosure. As shown in FIG. 50, a magnetic circuit assembly 5000 may include a first magnetic element 5001, a first magnetic conduction element 5002, a second magnetic conduction element 5003, a third magnetic conduction element 5004, and a fourth magnetic conduction element 5005. Compared with the embodiment shown in FIG. 48, the magnetic circuit assembly 5000 may further include the fourth magnetic conduction element 5005, and the bottom surface of the fourth magnetic conduction element 5005 may be connected with the top surfaces of the second magnetic conduction element 5003 and the first magnetic element 5001.

In some embodiments, the fourth magnetic conduction element 5005 may be a cylinder or a cuboid, and the shapes and sizes of the outer contours of the cross sections of the fourth magnetic conduction element 5005 and the outer ring of the first magnetic element 5001 perpendicular to the Z axis may be the same. In some embodiments, the sum of the thickness of the fourth magnetic conduction element 5005 and the first magnetic element 5001 may be equal to the thickness of the first magnetic conduction element 5002 and equal to the thickness of the second magnetic conduction element 5003.

Figure 51:
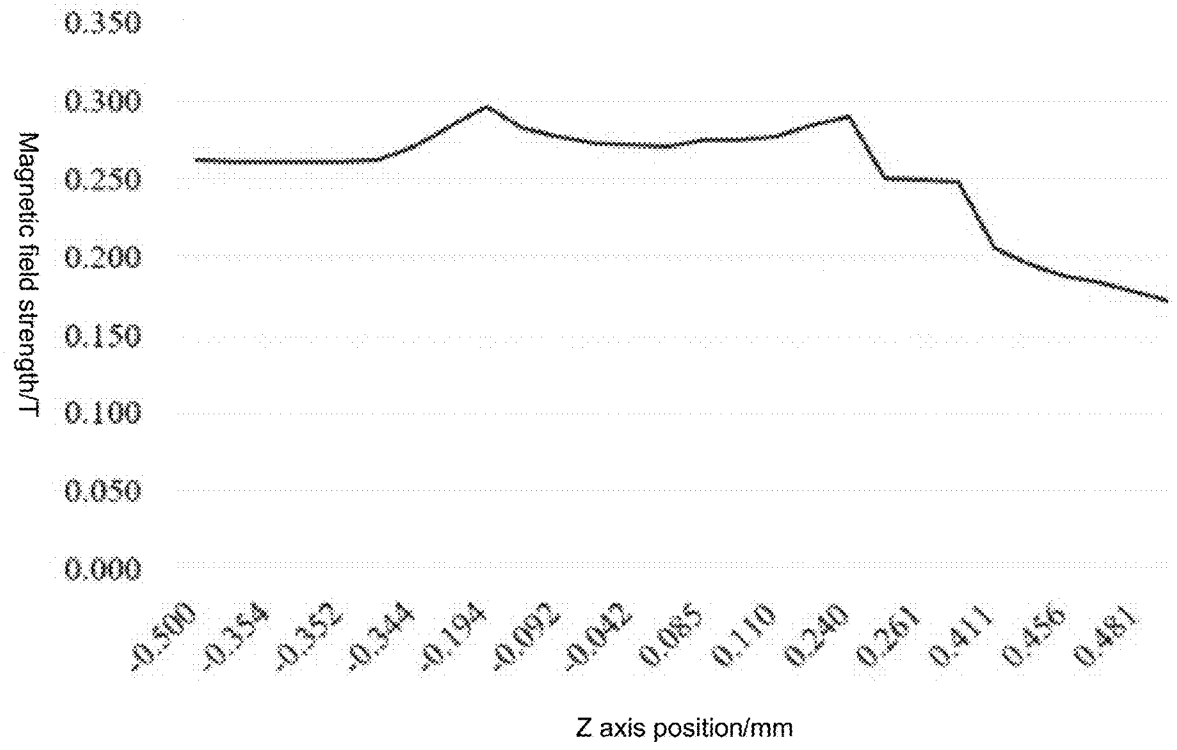
FIG. 51 is a schematic diagram illustrating the change of the magnetic field strength of the magnetic circuit assembly in FIG. 50 according to the present disclosure.

FIG. 51 is a schematic diagram illustrating the change of the magnetic field strength of the magnetic circuit assembly in FIG. 50 according to the present disclosure. In a magnetic gap, the magnetic field strength at different points in the Z axis direction may be measured along the direction of the Z axis shown in FIG. 50. As shown in FIG. 51, the magnetic field strength may be very uniformly distributed along the Z axis. As the fourth magnetic conduction element 5005 is added, compared with the magnetic circuit assembly of FIG. 48, the magnetic field strength near the zero point of the Z axis (e.g., −0194 mm) may be reduced to about 0.3 T.

Figure 52:
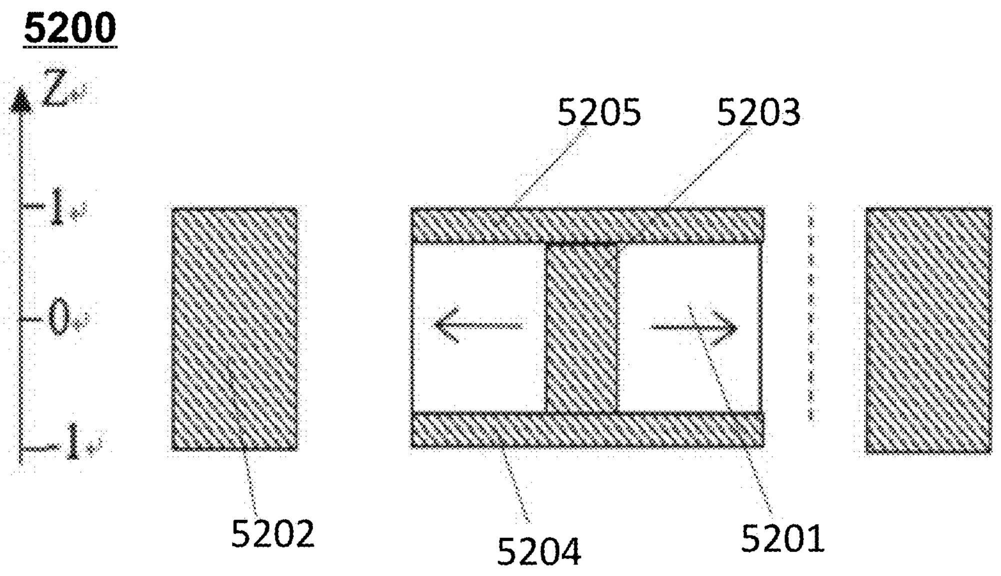
FIG. 52 is a schematic diagram illustrating the lengthwise section of a magnetic circuit assembly according to some embodiments of the present disclosure.

FIG. 52 is a schematic diagram illustrating the lengthwise section of a magnetic circuit assembly according to some embodiments of the present disclosure. As shown in FIG. 52, a magnetic circuit assembly 5200 may include a first magnetic element 5201, a first magnetic conduction element 5202, a second magnetic conduction element 5203, a third magnetic conduction element 5204, and a fourth magnetic conduction element 5205. Compared with the embodiment shown in FIG. 48, the magnetic circuit assembly 5200 further includes the fourth magnetic conduction element 5205, and the bottom surface of the fourth magnetic conduction element 5205 may be connected with the top surfaces of the second magnetic conduction element 5203 and the first magnetic element 5201.

In some embodiments, the fourth magnetic conduction element 5205 may be a cylinder, a cuboid or a triangular prism, etc. The shapes and the sizes of the cross sections of the fourth magnetic conduction element 5205 and the third magnetic conduction element 5204 perpendicular to the Z axis may be the same. In some embodiments, the sum of the thicknesses of the first magnetic element 5201, the third magnetic conduction element 5204, and the fourth magnetic conduction element 5205 may be equal to the thickness of the first magnetic conduction element 5202.

Figure 53:
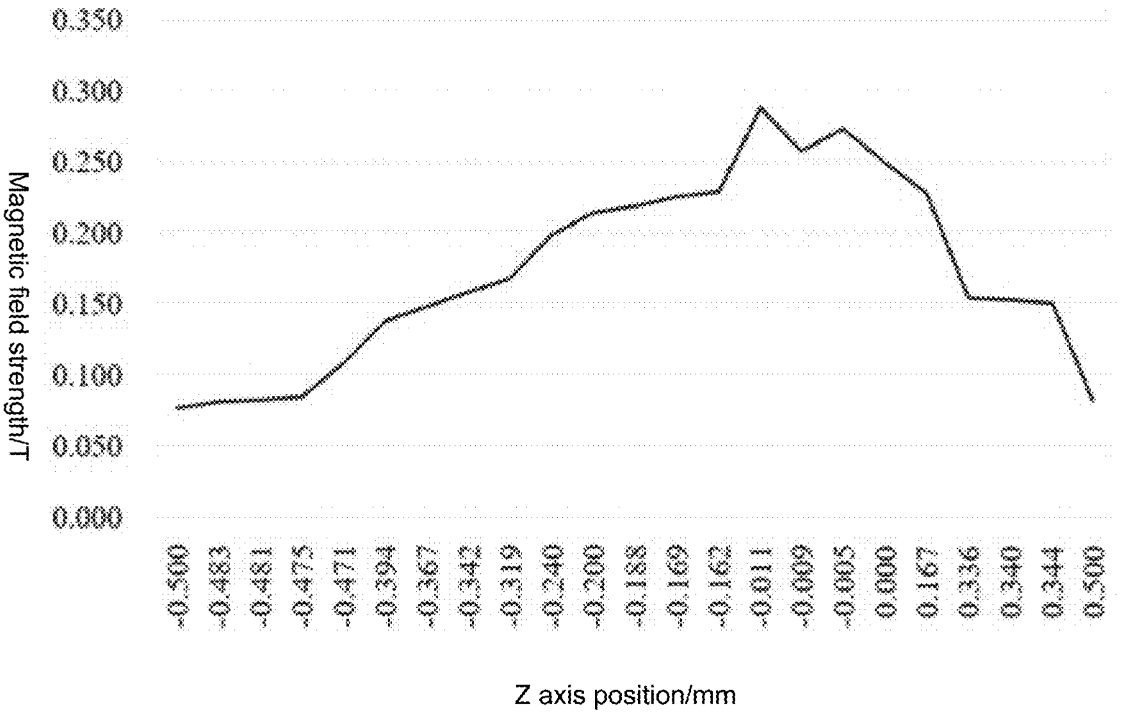
FIG. 53 is a schematic diagram illustrating the change of the magnetic field strength of the magnetic circuit assembly in FIG. 52 according to the present disclosure.

FIG. 53 is a schematic diagram illustrating the change of the magnetic field strength of the magnetic circuit assembly in FIG. 52 according to the present disclosure. In a magnetic gap, the magnetic field strength at different points in the Z axis direction may be measured along the direction of the Z axis shown in FIG. 52. As shown in FIG. 53, compared with the magnetic circuit assembly in FIG. 48, the maximum value of the magnetic field strength (e.g., the maximum value at −0.011 mm position) may be similar, which is about 0.3 T, but the magnetic field strength along the entire Z axis may be uniformly distributed.

It should be noted that in the embodiments shown in FIG. 44, FIG. 46, FIG. 48, FIG. 50, FIG. 52, on the basis of configuring the first magnetic element, the first magnetic conduction element, and second magnetic conduction element, those skilled in the art may further determine the number, positions and forms of the magnetic conduction elements according to requirements, and the present disclosure makes no limitations on this. For example, the fourth magnetic conduction element 5005 of the magnetic circuit assembly of FIG. 50 may be connected with the second magnetic conduction element 5003.

Figure 54:
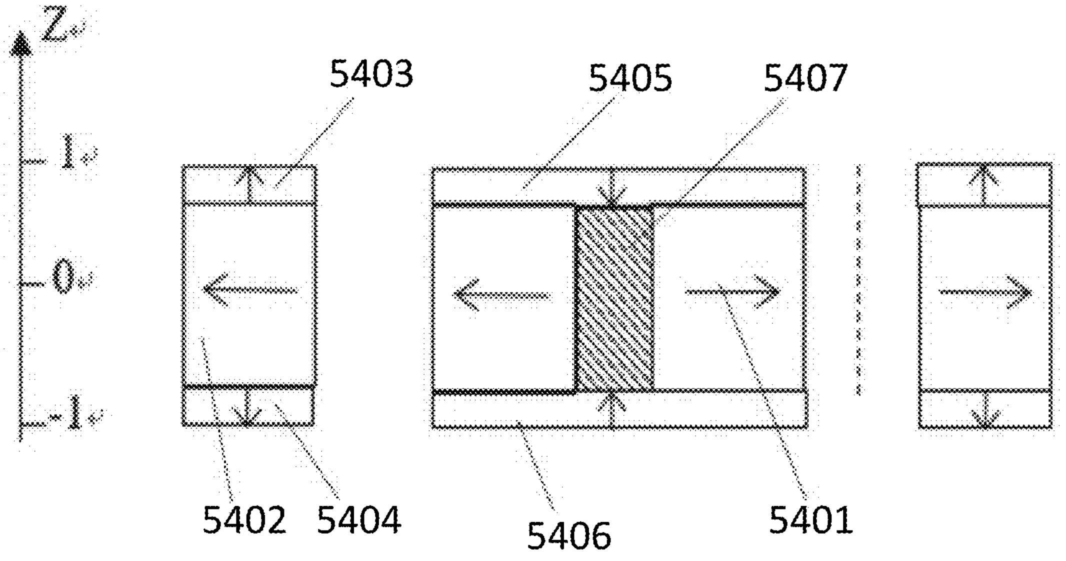
FIG. 54 is a schematic diagram illustrating the lengthwise section of a magnetic circuit assembly according to some embodiments of the present disclosure.

FIG. 54 is a schematic diagram illustrating the lengthwise section of a magnetic circuit assembly according to some embodiments of the present disclosure. As shown in FIG. 54, a magnetic circuit assembly 5400 may include a first magnetic element 5401, a second magnetic element 5402, a third magnetic element 5403, a fourth magnet element 5404, a fifth magnetic element 5405, a sixth magnetic element 5406 and a first magnetic conduction element 5407. At least part of the first magnetic element 5401 may surround the first magnetic conduction element 5407, the second magnetic element 5402 may surround the first magnetic element 5401, a magnetic gap may be formed between the outer ring of the first magnetic element 5401 and the second magnetic element 5402 (for example, the inner ring of the second magnetic element 5402). A voice coil may be configured in the magnetic gap.

In some embodiments, the bottom surface of the third magnetic element 5403 may be connected with the top surface of the second magnetic element 5402, the top surface of the fourth magnetic element 5404 may be connected with the bottom surface of the second magnetic element 5402. The bottom surface of the fifth magnetic element 5405 may be connected with the top surfaces of the first magnetic element 5401 and the first magnetic conduction element 5407. The top surface of the sixth magnetic element 5406 may be connected with the bottom surface of the first magnetic element 5401 and the first magnetic conduction element 5407. The third magnetic element 5403 and the fifth magnetic element 5405 may be spaced apart in the magnetic gap, and the fourth magnet element 5404 and the sixth magnetic element 5406 may be spaced apart in the magnetic gap.

In some embodiments, the magnetization directions of the first magnetic element 5401 and the second magnetic element 5402 may be parallel to the top surface of the first magnetic element 5401 and/or the second magnetic element 5402 (that is, the horizontal direction in the figure), or may be perpendicular to the inner and outer surfaces, and the magnetization directions of the first magnetic element 5401 and the second magnetic element 5402 may be parallel to each other. For example, the magnetization direction of the first magnetic element 5401 may be along the direction from the center to the outside, and the magnetization direction of the second magnetic assembly 5402 may be along the inner side (the side near the first magnetic element 5401) to the outside (the side away from the first magnetic element 5401). As another example, the magnetization direction of the first magnetic element 5401 may be along the direction from the outside to the center, and the magnetization direction of the second magnetic assembly 5402 may be along the outer side (the side away from the first magnetic element 5401) to the inner side (the side near the first magnetic element 5401).

In some embodiments, the magnetization directions of the third magnetic element 5403 and the fourth magnetic element 5404 may be perpendicular to the connection surface of the second magnetic element 5402 and the third magnetic element 5403 and/or the fourth magnet element 5404 (that is, the vertical direction in the figure, the arrow direction on each magnetic element in the figure represents the magnetization direction of the magnetic element), and the magnetization directions of the third magnetic element 5403 and the fourth magnetic element 5404 may be opposite.

In some embodiments, the magnetization directions of the fifth magnetic element 5405 and the sixth magnetic element 5406 may be perpendicular to the connection surface of the first magnetic element 5401 and the fifth magnetic element 5405 or the sixth magnetic element 5406 (that is, the vertical direction in the figure, the arrow direction on each magnetic element in the figure represents the magnetization direction of the magnetic element), and the magnetization directions of the fifth magnetic element 5405 and the sixth magnetic element 5406 may be opposite.

In some embodiments, the placements of the third magnetic element 5403 and the fourth magnetic element 5404 may be such that the same magnetic poles of the third magnetic element 5403 and the fourth magnetic element 5404 may be close to the second magnetic element 5402; and the different magnetic poles of the third magnetic element 5403 and the fourth magnetic element 5404 may be away from the second magnetic element 5402. For example, compared with the S poles of the third magnetic element 5403 and the fourth magnetic element 5404, the N poles of the third magnetic element 5403 and the fourth magnetic element 5404 may be both closer to the second magnetic element 5042. That is, at the third magnetic element 5403 and inside the magnetic element 5403, the direction of the magnetic induction lines or the magnetic field (that is, from the S pole to the N pole) may point to the second magnetic element 5402. For another example, compared with N poles of the third magnetic element 5403 and the fourth magnetic element 5404, the S poles of the third magnetic element 5403 and the fourth magnetic element 5404 may be both closer to the first magnetic conduction element 5407. That is, inside the third magnetic element 5403 and the fourth magnetic element 5404, the direction of the magnetic induction lines or the magnetic field (that is, from the S pole to the N pole) may departs from the second magnetic element 5402.

In some embodiments, the placements of the fifth magnetic element 5405 and the sixth magnetic element 5406 may be such that the same magnetic poles of the fifth magnetic element 5405 and the sixth magnetic element 5406 may be close to the first magnetic conduction element 5407; and the different magnetic poles of the fifth magnetic element 5405 and the sixth magnetic element 5406 may be away from the first magnetic conduction element 5407. For example, compared with the S poles of the fifth magnetic element 5405 and the sixth magnetic element 5406, the N poles of the fifth magnetic element 5405 and the sixth magnetic element 5406 may be both closer to the first magnetic conduction element 5407. That is, inside the fifth magnetic element 5405 and the sixth magnetic element 5406, the direction of the magnetic induction lines or the magnetic field (that is, from the S pole to the N pole) may point to the first magnetic conduction element 5407. For another example, compared with N poles of the fifth magnetic element 5405 and the sixth magnetic element 5406, the S poles of the fifth magnetic element 5405 and the sixth magnetic element 5406 may be both closer to the first magnetic conduction element 5407. That is, inside the fifth magnetic element 5405 and the sixth magnetic element 5406, the direction of the magnetic induction lines or the magnetic field (that is, from the S pole to the N pole) may departs from the first magnetic conduction element 5407.

By magnetizing the fifth magnetic element 5405 and the sixth magnetic element 5406 oppositely in this way, the directions of the magnetic induction lines generated by the fifth magnetic element 5405 and the sixth magnetic element 5406 may be roughly the same in the magnetic gap. For example, the magnetic induction lines may point from the first magnetic conduction element 5407 to the second magnetic element 5402, or from the second magnetic assembly 5402 to the first magnetic conduction element 5407, thereby increasing the magnetic field strength in the magnetic gap. In addition, through configuring the magnetization directions of the third magnetic element 5403 and the fourth magnet element 5404, the fifth magnetic element 5405 and the sixth magnetic element 5406, the third magnetic element 5403 and the fifth magnetic element 5405 to the vertical direction and opposite to each other, the magnetic field generated by the first magnetic element 5401 in the magnetic gap may be suppressed, so that the magnetic induction lines corresponding to the magnetic field may be distributed horizontally in the magnetic gap. For example, the magnetic induction lines may extend from the ends of the first magnet element 5401 along the horizontal or near horizontal direction in the magnetic gap. In this way, the magnetic field direction at the voice coil in the magnetic gap may mainly be distributed in the horizontal or near horizontal direction, may improve the uniformity of the magnetic field, and may effectively improve the sound effects generated by the voice coil vibration. In some other embodiments, the magnetization direction of each magnetic element may further be in other directions. The combination of magnetic elements in different magnetization directions may further improve the magnetic field strength and/or make the strength distribution of the magnetic field more uniformly.

It should be noted that in this embodiment, the horizontal direction may be understood as the direction perpendicular to the direction of the voice coil, that is, the direction parallel to the plane where the top surface of the first magnetic element 5401 is located. The vertical direction may be understood as the vibration direction of the voice coil, that is, direction perpendicular to the plane where the top surface of the first magnetic element 5401 is located.

In some embodiments, the magnetization directions of the first magnetic element 5401 and the second magnetic element 5402 may be parallel to each other, the magnetization directions of the third magnetic element 5403, the fourth magnet element 5404, the fifth magnetic element 5405, and the sixth magnetic element 5406 may be parallel or may have preset angles. For example, the angle between the magnetized directions of the first magnetic element 5401 and the second magnetic element 5402 may be between 170° and 190°. More descriptions of the magnetization directions of the first magnetic element 5401 and the second magnetic element 5402 may be referred to in the related descriptions of magnetization directions of the first magnetic element 601 and the second magnetic element 602 in FIG. 6.

The third magnetic element 5403, the fourth magnet element 5404, the fifth magnetic element 5405, and the sixth magnetic element 5406 may form a magnetic shielding field, which increases the magnetic field strength in the magnetic gap. The connection methods between magnetic elements may include one or combinations of bonding, clamping, welding, riveting, and bolting, etc.

In some embodiments, the first magnetic conduction element 5407, the fifth magnetic element 5405, and the sixth magnetic element 5406 may be cylinders, cuboids, or triangular prisms, etc. The first magnetic element 5401, the second magnetic element 5402, the third magnetic element 5403, and the fourth magnet element 5404 may be annuluses (continuous annulus, non-continuous annulus, rectangular annulus, triangular annulus, etc.).

In some embodiments, the shapes and sizes of the cross sections of the second magnetic element 5402, the third magnetic element 5403, and the fourth magnet element 5404 perpendicular to the Z axis may be the same. The shapes and sizes of the cross sections of the outer ring of the first magnetic element 5401, the fifth magnetic element 5405 and the sixth magnetic element 5406 perpendicular to the Z axis may be the same. In some embodiments, the first magnetic conduction element 5407, the first magnetic element 5401, and the second magnetic element 5402 may be the same in thickness, the third magnetic element 5403 and the fifth magnetic element 5405 may be the same in thickness, the fourth magnetic element 5404 and the sixth magnetic element 5406 may be the same in thickness.

Figure 55:
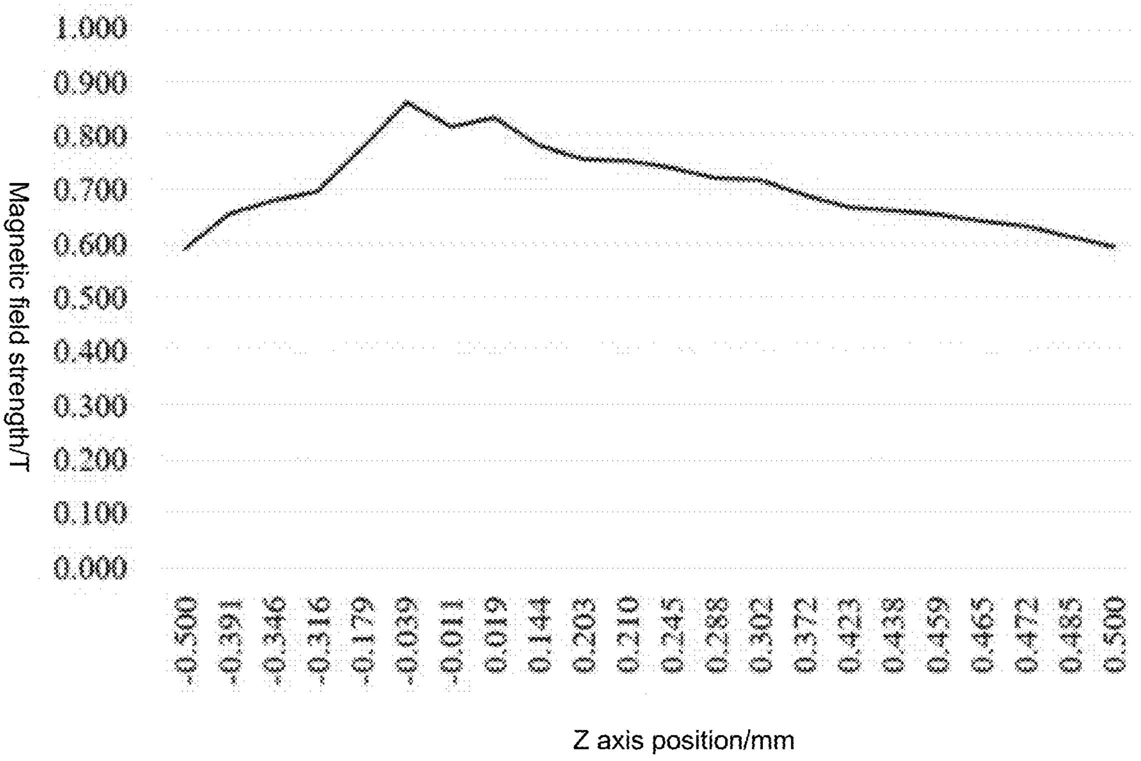
FIG. 55 is a schematic diagram illustrating the change of the magnetic field strength of the magnetic circuit assembly in FIG. 54 according to the present disclosure.

FIG. 55 is a schematic diagram illustrating the change of magnetic field strength of the magnetic circuit assembly in FIG. 54 according to the present disclosure. In a magnetic gap, the magnetic field strength at different points in the Z axis direction may be measured along the direction of the Z axis shown in FIG. 54. As shown in FIG. 55, due to the magnetic shielding field formed by the magnetic elements added, the magnetic field strength may be highly symmetrical about the zero point of the Z axis, and the magnetic field strength may be higher.

Figure 56:
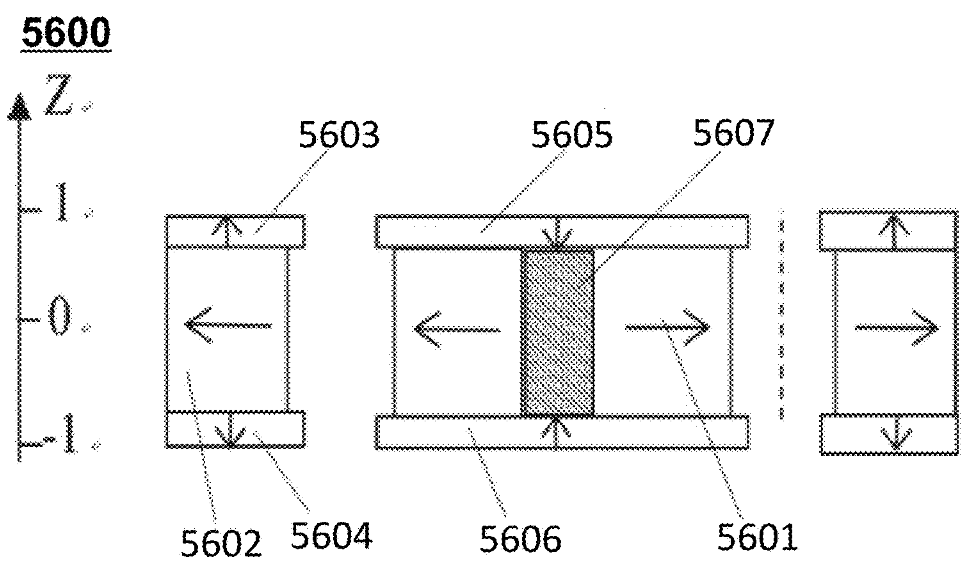
FIG. 56 is a schematic diagram illustrating the lengthwise section of a magnetic circuit assembly according to some embodiments of the present disclosure.

FIG. 56 is a schematic diagram illustrating the lengthwise section of magnetic circuit assemblies according to some embodiments of the present disclosure. As shown in FIG. 56, a magnetic circuit assembly includes a first magnetic elements 5601, a second magnetic element 5602, a third magnetic element 5603, a fourth magnet element 5604, a fifth magnetic element 5605, a sixth magnetic element 5606 and a first magnetic conduction element 5607. Compared with the embodiment shown in FIG. 54, the size of the inner ring of the third magnetic the element 5603 may be smaller than the size of the inner ring of the second magnetic element 5602, and the size of the inner ring of the fourth magnetic element 5604 may be smaller than the size of the inner ring of the second magnetic element 5602, the size of the outer contour of the fifth magnetic element 5605 may be greater than the size of the outer ring of the first magnetic assembly 5601, the size of the outer contour of the sixth magnetic element 5606 may be greater than the size of the outer ring of the first magnetic element 5601. Through such configurations, the fifth magnetic element 5605 and the sixth magnetic element 5606 may protrude toward the magnetic gap relative to the first magnetic elements 5601, the third magnetic element 5603 and the fourth magnetic element 5604 may protrude toward the magnetic gap relative to the second magnetic elements 5602.

Figure 57:
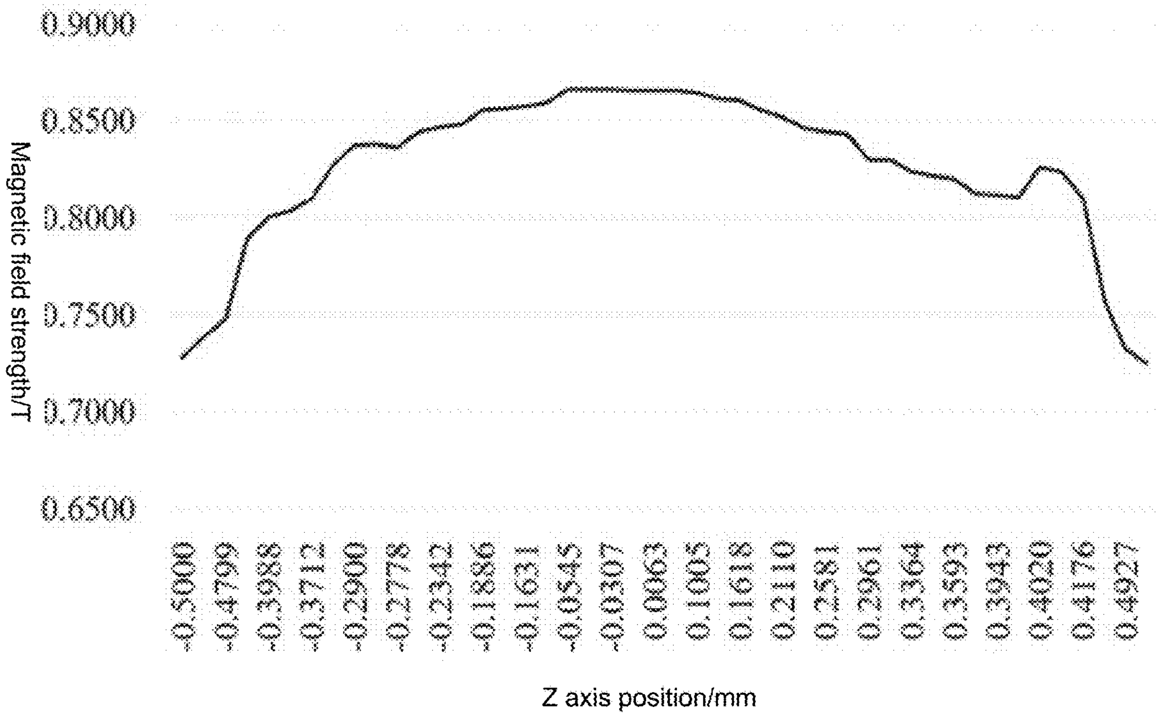
FIG. 57 is a schematic diagram illustrating the change of the magnetic field strength of the magnetic circuit assembly in FIG. 56 according to the present disclosure.

FIG. 57 is a schematic diagram illustrating the change of magnetic field strength of the magnetic circuit assembly in FIG. 56 according to the present disclosure. In a magnetic gap, the magnetic field strength at different points in the Z axis direction may be measured along the direction of the Z axis shown in FIG. 56. As shown in FIG. 57, due to the magnetic shielding field formed by the magnetic elements added, the magnetic field strength may be highly symmetrical about the zero point of the Z axis, and the overall magnetic field strength may be higher than that of the embodiment shown in FIG. 54.

Figure 58:
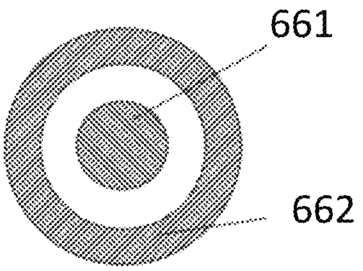
FIG. 58 is a schematic diagram illustrating the cross section of a magnetic element according to some embodiments of the present disclosure.
Figure 59:
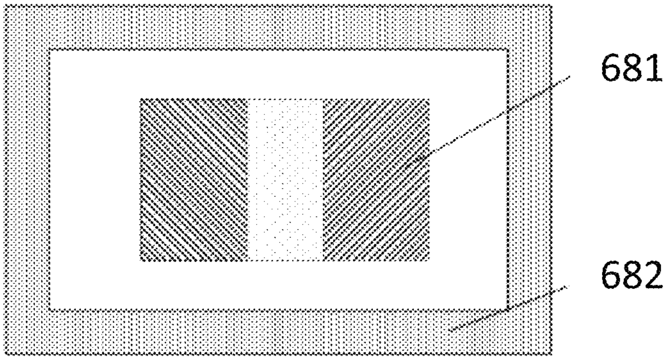
FIG. 59 is a schematic diagram illustrating the cross section of a magnetic element according to some embodiments of the present disclosure.

FIG. 58 and FIG. 59 are schematic diagrams illustrating the cross sections of magnetic elements according to some embodiments of the present disclosure. The magnetic elements may be applied to any magnetic circuit assembly formed by magnetic elements and magnetic conduction elements in the present disclosure.

As shown in the figure, the cross section of a magnetic element located inside may be a circle (e.g., the magnetic element 661 of FIG. 58), an oval, a rectangle (e.g., the magnetic element 681 of FIG. 59), a triangle, or any polygon, etc. The magnetic element surrounding and located the outside may be an annulus, such as a ring (for example, the magnetic element 662 of FIG. 58), an elliptical ring, a rectangular ring (e.g., magnetic element 682 of FIG. 59), a triangular ring, or arbitrary polygonal ring, etc.

The magnetic element 661 and the magnetic element 662 may form a magnetic gap. The magnetic element may include an inner ring and an outer ring. In some embodiments, the shapes of the inner ring and/or outer ring may be round, ellipse, triangular, quadrangle or any other polygon. In addition, the magnetic circuit assemblies of the embodiments shown in FIGS. 6, 8, 10, 12, 14, 16, 18, 20, 22, 24, 26, 28, 30, 32 may share structures similar to that shown in FIG. 58; the magnetic circuit assemblies of the embodiments shown in FIGS. 32, 34, 36, 40, 42, 44, 46, 48, 50, 52, 54 may share structures similar to that shown in FIG. 59.

In some embodiments, the magnetization direction of the magnetic element 661 may be radiated from the center to the outside. The magnetization direction of the magnetic element 662 may be from the inside to outside. In some embodiments, the magnetic element 681 may be composed of different magnets, and the magnetization direction of each magnet may correspondently point to one side of the magnetic element 682 opposite to the magnetic element 681.

Figure 60:
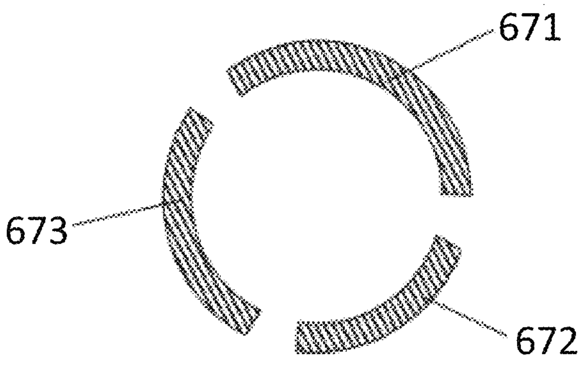
FIG. 60 is a schematic diagram illustrating a magnetic element according to some embodiments of the present disclosure.

FIG. 60 is a schematic diagram illustrating a magnetic element according to some embodiments of the present disclosure. The magnetic element may be applied to any magnetic circuit assembly composed of magnetic circuit elements and magnetic conduction elements in the present disclosure. As shown in the figure, the magnetic element may consist of a plurality of magnets. The two ends of any one of the plurality of magnets may be connected with both ends of an adjacent magnet or there may be a certain distance between the two adjacent magnets. The distances between the plurality of magnets may be the same or different. In some embodiments, the magnetic element may consist of 2 or 3 sheet-like magnets (e.g., magnets 671, 672 and 673) equidistantly arranged. The shapes of the sheet-like magnets may be a sector, a quadrilateral, etc.

Figure 61:
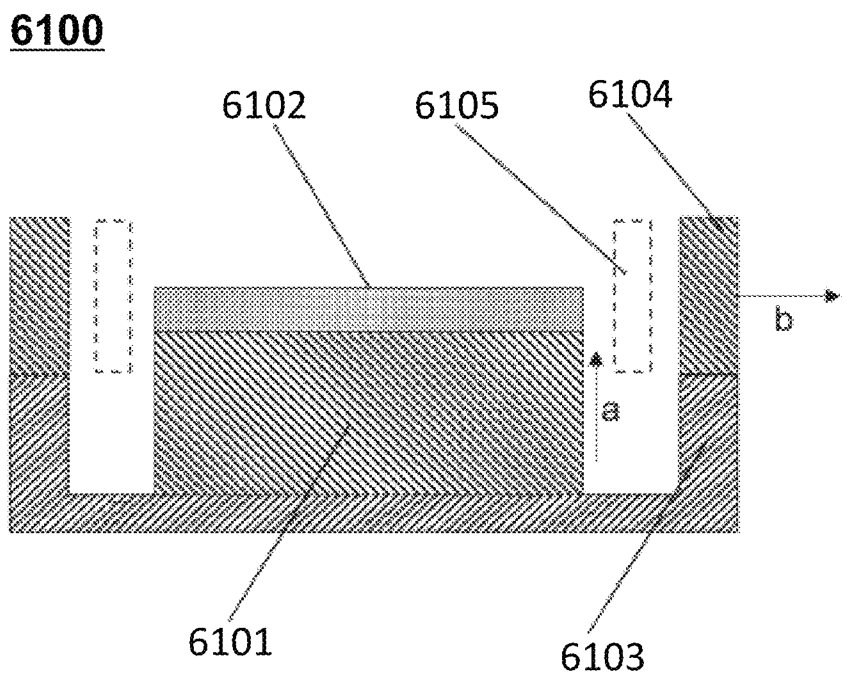
FIG. 61 is a schematic diagram illustrating the lengthwise section of a magnetic circuit assembly according to some embodiments of the present disclosure.
Figure 62:
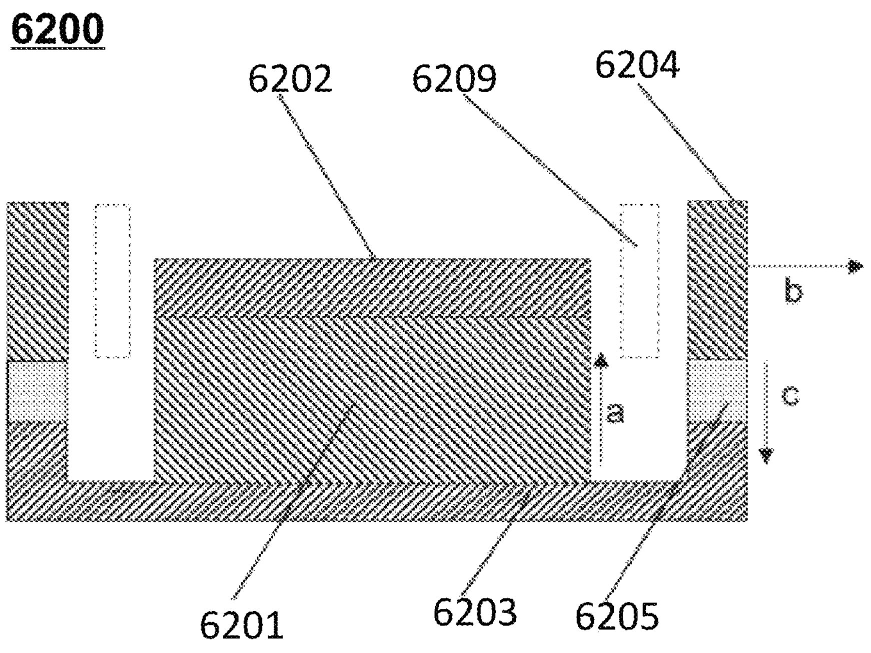
FIG. 62 is a schematic diagram illustrating the lengthwise section of a magnetic circuit assembly according to some embodiments of the present disclosure.

On the basis of the embodiments mentioned earlier, to further increase the magnetic field strength in a magnetic gap, the magnetic circuit assembly may further include other structures (such as shown in FIG. 61 and FIG. 62) to make the magnetic field strength in the magnetic gap may be strengthened. Those skilled in the art may combine the embodiments shown in FIG. 61, FIG. 62 and the embodiments mentioned earlier according to the actual needs of the speakers to make the magnetic field strength in the magnetic gap may be greater and may be distributed uniformly.

FIG. 61 is a schematic diagram illustrating the lengthwise section of a magnetic circuit assembly according to some embodiments of the present disclosure. As shown in FIG. 61, a magnetic circuit assembly 6100 may include a first magnetic element 6101, a first magnetic conduction element 6102, a second magnetic conduction element 6103, and a second magnetic element 6104. In some embodiments, the first magnetic element 6101 and/or the second magnetic element 6104 may include any or more magnets described in the present disclosure. In some embodiments, the first magnetic element 6101 may include a first magnet, and the second magnetic element 6104 may include a second magnet. The first magnet may be the same with or different from the second magnet. The first magnetic conduction element 6102 and/or the second magnetic conduction element 6103 may include any one kind of or several kinds of permeability materials described in the present disclosure. The processing manners of the first magnetic conduction element 6102 and/or the second magnetic conduction element 6103 may include any one or more processing manners described in the present disclosure. In some embodiments, the first magnetic element 6101 and/or the first magnetic conduction element 6102 may be set to be an axial symmetrical structure. For example, the first magnetic element 6101 and/or the first magnetic conduction element 6102 may be cylinders, cuboids, or hollow annulus (e.g., the horizontal cross section may be the shape of the runway).

In some embodiments, the first magnetic element 6101 and the first magnetic conduction element 6102 may be coaxal cylinders with the same or different diameters. In some embodiments, the second magnetic conduction element 6103 may be a grooved structure. The grooved structure may include a U-shaped section (as shown in FIG. 61). The second magnetic conduction element 6103 in the grooved structure may include a bottom plate and a side wall. In some embodiments, the bottom plate and the side wall may be integrally-formed. For example, the side wall may be formed by the bottom plate extending in the direction perpendicular to the bottom plate.

In some embodiments, the bottom plate may be connected with the side wall through any one or more connection manners described in the present disclosure. The second magnetic element 6104 may be configured as a ring or a sheet. More about the shape of the second magnetic element 6104 may be referred to in the descriptions of other parts in the present disclosure. In some embodiments, the second magnetic element 6104 may be coaxal with the first magnetic element 6101 and/or the first magnetic conduction element 6102.

The upper surface of the first magnetic element 6101 may connect the lower surface of the first magnetic conduction element 6102. The lower surface of the first magnetic element 6101 may connect the bottom plate of the second magnetic conduction element 6103. The lower surface of the second magnetic element 6104 may connect the side wall of the second magnetic conduction element 6103. The connection manner between the first magnetic element 6101, the first magnetic conduction element 6102, the second magnetic conduction element 6103 and/or the second magnetic element 6104 may include bonding, clamping, welding, riveting, bolting, or the like, or a combination thereof.

A magnetic gap may be formed between the first magnetic element 6101 and/or the first magnetic conduction element 6102 and the inner ring of the second magnetic element 6104. A voice coil 6105 may be set in the magnetic gap. In some embodiments, the heights of the second magnetic element 6104 and the voice coil 6105 relative to the bottom plate of the second magnetic conduction element 6103 may be the same. In some embodiments, the first magnetic element 6101, the first magnetic conduction element 6102, the second magnetic conduction element 6103, and the second magnetic element 6104 may form a magnetic circuit.

In some embodiments, the magnetic circuit assembly may generate a full magnetic field (also known as the "total magnetic field of the magnetic circuit assembly"). The first magnetic element 6101 may generate a first magnetic field. The full magnetic field may be formed by all components in the magnetic circuit assembly (for example, the first magnetic element 6101, the first magnetic conduction element 6102, the second magnetic conduction element 6103, and the magnetic field generated from the second magnetic element 6104). The magnetic field strength (also called magnetic induction intensity or magnetic flux density) of the full magnetic field in the magnetic gap may be greater than the magnetic field strength of the first magnetic field in the magnetic gap. In some embodiments, the second magnetic element 6104 may produce a second magnetic field, which may improve the magnetic field strength of the full magnetic field in the magnetic gap. The second magnetic field improving the magnetic field strength of the full magnetic field in the magnetic gap mentioned herein may refer to that when there is the second magnetic field (that is, when there is the second magnetic element), the magnetic field strength of the full magnetic field in the magnetic gap may be greater than the magnetic field strength of the full magnetic field in the magnetic gap when there is no second magnetic field (that is, there is no second magnetic element).

In other embodiments of the present disclosure, unless specifically explained, the magnetic circuit assembly represents the structure contains all magnetic elements and magnetic conduction elements, and the full magnetic field represents the magnetic field generated by the overall of the magnetic circuit assembly. The first magnetic field, the second magnetic field, the third magnetic field, . . . , the Nth magnetic field may respectively represent the magnetic field generated by the corresponding magnetic element. In different embodiments, the magnetic element that generates the second magnetic field (or the third magnetic field, . . . , the Nth magnetic field) may be the same or different.

In some embodiments, the angle between the magnetization directions of the first magnetic element 6101 and the second magnetic element 6104 may be between 0° and 180°. In some embodiments, the angle between the magnetization directions of the first magnetic element 6101 and the second magnetic element 6104 may be between 45° and 145°. In some embodiments, the angle between the magnetization directions of the first magnetic element 6101 and the second magnetic element 6104 may be equal to or more than 90°. In some embodiments, the magnetization direction of the first magnetic element 6101 may be perpendicular to the lower surface or the upper surface of the first magnetic element 6101 and vertically upwards (as shown in the direction of a in the figure), and the magnetization direction of the second magnetic element 6104 may point from the inner ring (inner surface) of the second magnetic element 6104 to the outer ring (outer surface) (as shown in the direction of b shown in the figure, on the right side of the first magnetic element, the magnetic direction of the first magnetic element rotates in the clockwise direction for 90°).

In some embodiments, at the position of the second magnetic element 6104, the angle between the direction of the full magnetic field and the magnetization direction of the second magnetic element 6104 may not be larger than 90°. In some embodiments, at the position of the second magnetic element 6104, the angle between the direction of the magnetic field generated by the first magnetic element 6101 and the magnetization direction of the second magnetic element 6104 may be 0°, 10°, 20° or other angles no greater than 90°. Compared with the magnetic circuit assembly of a single magnetic element, the second magnetic element 6104 may improve the total magnetic flux in the magnetic gap in FIG. 60, thereby increasing the magnetic induction intensity in the magnetic gap. In addition, under the action of the second magnetic element 6104, the originally divergent magnetic induction lines will converge toward the location of the magnetic gap, and further increase the magnetic induction intensity in the magnetic gap.

The description of the structure of the magnetic circuit assembly above is only a specific example and should not be considered the only feasible solution. Obviously, for those skilled in the art, after understanding the basic principles of magnetic circuit assembly, various of modifications and changes may be made to the forms and details of the specific methods and operations of implementing the magnetic assembly under the premise of not departing from the principles. However, these modifications and changes are still within the scope of the above description. For example, the second magnetic conduction element 6103 may be an annular structure or a sheet structure. For another example, the magnetic circuit assembly of FIG. 61 may further include a magnetic cover, which may surround the first magnetic element 6101, the first magnetic conduction element 6102, the second magnetic conduction element 6103, and the second magnetic element 6104.

FIG. 62 is a schematic diagram illustrating the lengthwise section of a magnetic circuit assembly according to some embodiments of the present disclosure. As shown in the figure, different from the magnetic circuit assembly in FIG. 61, the magnetic circuit assembly may further include a third magnetic assembly. The upper surface of the third magnetic element 6205 may be connected with a second magnetic element 6204, and the lower surface of the third magnetic element 6205 may be connected with the side wall of a second magnetic conduction element 6203. A magnetic gap may be formed between a first magnetic element 6201, a first magnetic conduction element 6202, the second magnetic element 6204 and/or the third magnetic element 6205. A voice coil 6209 may be set in the magnetic gap. In some embodiments, the first magnetic element 6201, the first magnetic conduction element 6202, the second magnetic conduction element 6203, the second magnetic element 6204, and the third magnetic element 6205 may form a magnetic circuit. In some embodiments, the magnetization direction of the second magnetic element 6204 may refer to the detailed description of FIG. 52 of the present disclosure.

In some embodiments, the magnetic circuit assembly may generate a first full magnetic field, and the first magnetic element 6201 may generate a second magnetic field. The magnetic field strength of the first full magnetic field in the magnetic gap may be greater than the magnetic field strength of the second magnetic field in the magnetic gap. In some embodiments, the third magnetic element 6205 may generate a third magnetic field, the third magnetic field may improve the magnetic field strength of the second magnetic field in the magnetic gap.

In some embodiments, the angle between the magnetization directions of the first magnetic element 6201 and the third magnetic element 6205 may be between 0° and 180°. In some embodiments, the angle between the magnetization directions of the first magnetic element 6201 and the third magnetic element 6205 may be between 45° and 145°. In some embodiments, the angle between the magnetization directions of the first magnetic element 6201 and the third magnetic element 6205 may be equal to or more than 90°. In some embodiments, the magnetization direction of the first magnetic element 6201 may be perpendicular to the lower surface or upper surface of the first magnetic element 6201 and vertically upwards (as shown in the direction of a in the figure), and the magnetization direction of the third magnetic element 6205 may point from the upper surface to the lower surface of the third magnetic element 6205 (as shown in the direction of c in the figure, on the right side of the first magnetic element, the magnetization direction of the first magnetic element rotates 180° along clockwise).

In some embodiments, at the position of the third magnetic element 6205, the angle between the direction of the full magnetic field and the magnetization direction of the third magnetic element 6205 may not be larger than 90°. In some embodiments, at the position of the third magnetic element 6205, the angle between the direction of the magnetic field generated by the first magnetic element 6201 and the magnetization direction of the third magnetic element 6205 may be less than or equal to 90°.

Compared with the magnetic circuit assembly in FIG. 61, the magnetic circuit assembly in FIG. 62 may include the third magnetic element 6205. The third magnetic element 6205 may further increase the total magnetic flux in the magnetic gap in the magnetic circuit assembly, thereby increasing the magnetic induction intensity in the magnetic gap. In addition, under the action of the third magnetic element 6205, the magnetic induction line may further converge towards the location of the magnetic gap, further increasing the magnetic induction intensity in the magnetic gap.

The description of the structure of the magnetic circuit assembly above is only a specific example and should not be considered the only feasible solution. Obviously, for those skilled in the art, after understanding the basic principles of magnetic circuit assembly, various of modifications and changes may be made to the forms and details of the specific methods and operations of implementing the magnetic assembly under the premise of not departing from the principles. However, these modifications and changes are still within the scope of the above description. For example, the second magnetic element may be an annular structure or a sheet structure. For another example, the magnetic circuit assembly may not include the second magnetic element. For another example, at least one magnetic element may further be added to the magnetic circuit assembly. In some embodiments, the lower surface of the further added magnetic element may connect the upper surface of the second magnetic element. The magnetization direction of the further added magnetic element may be opposite to the magnetization direction of the third magnetic element. In some embodiments, the further added magnetic element may connect the side walls of the first magnetic element and the second magnetic element. The magnetization direction of the further added magnetic element may be opposite to the magnetization direction of the second magnetic element. Regarding other magnetic circuit structures that may improve the magnetic field strength in the magnetic gap, please refer to the PCT application with the application number PCT/CN2018/071851 submitted on Jan. 8, 2018, the contents of which are entirely incorporated herein by reference, which will not be repeated here.

Figure 63:
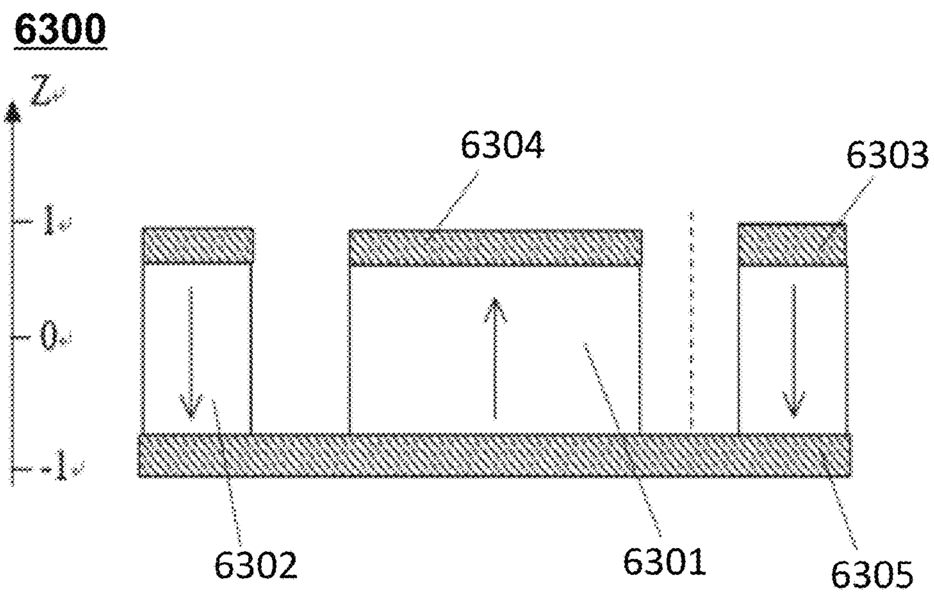
FIG. 63 is a schematic diagram illustrating the lengthwise section of a magnetic circuit assembly according to some embodiments of the present disclosure.

FIG. 63 is a schematic diagram illustrating the lengthwise section of a magnetic circuit assembly according to some embodiments of the present disclosure. In some embodiments, as shown in FIG. 63, a magnetic circuit assembly 6300 may include a first magnetic element 6301, a second magnetic element 6302, a first magnetic conduction element 6303, a second magnetic conduction element 6304, and a third magnetic conduction element 6305. The second magnetic element 6302 surrounds the first magnetic element 6301, a magnetic gap may be formed between the first magnetic element 6301 and the second magnetic element 6302. A voice coil of a speaker may be configured in the magnetic gap. The bottom surface of the first magnetic conduction element 6303 may be connected with the top surface of the second magnetic element 6302, and the bottom surface of the second magnetic conduction element 6304 may be connected with the top surface of the first magnetic element 6301. The top surface of the third magnetic conduction element 6305 may be connected with the top surfaces of the first magnetic element 6301 and the second magnetic element 6302. The magnetization directions of the first magnetic element 6301 and the second magnetic element 6302 may both extend along the vertical direction, and the magnetization direction of the first magnetic element 6301 may be opposite to the magnetic direction of the second magnetic element 6302. In some embodiments, the N pole of the first magnetic element 6301 may point to the second magnetic conduction element 6304 (i.e., the upward direction in FIG. 71), and the N pole of the second magnetic element 6302 may point to the third magnetic conduction element 6305 (i.e., the downward direction in FIG. 71).

Figure 64:
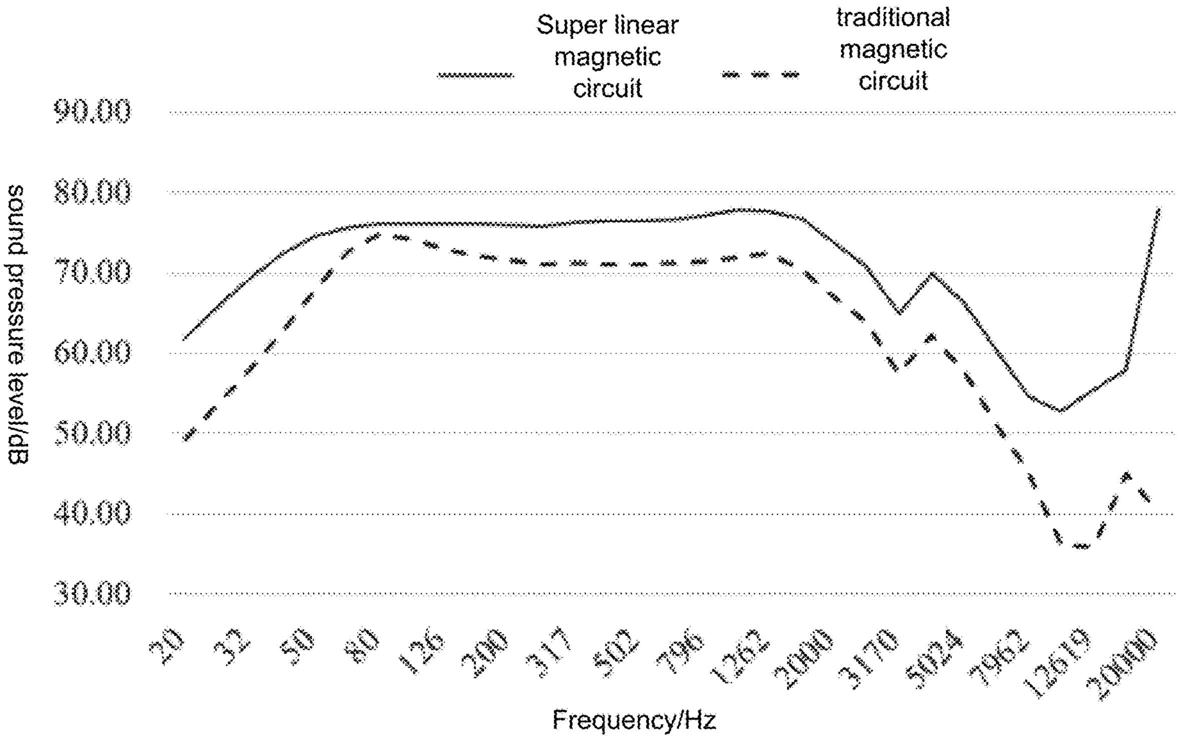
FIG. 64 is a diagram illustrating a comparison of frequency response curves of speakers including the magnetic circuit assemblies shown in FIG. 63 and FIG. 56 according to the present disclosure.

FIG. 64 is a diagram illustrating a comparison of frequency response curves of speakers including the magnetic circuit assemblies shown in FIG. 63 and FIG. 56 according to the present disclosure. As shown in FIG. 64, comparing a speaker using the magnetic circuit assembly shown in FIG. 56 (also called "super linear magnetic circuit") and a speaker using the magnetic circuit assembly shown in FIG. 63 (also called "traditional magnetic circuit"), the volume of the speaker using the magnetic circuit assembly shown in FIG. 63 in each frequency band may be higher and the changes of the volume in the low frequency and high frequency range may be more gentle, the overall frequency response may be more linear, and the sound quality may be better.

The basic concepts have been described above. Obviously, for those skilled in the art, the above disclosure of the invention is merely by way of example, and does not constitute a limitation on the present disclosure. Although not explicitly stated here, those skilled in the art may make various modifications, improvements, and amendments to the present disclosure. These modifications, improvements, and amendments are proposed in the present disclosure, and shall be within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references of "an embodiment" or "one embodiment" or "an alternative embodiment" in various parts of the present disclosure are not necessarily all referring to the same embodiment. In addition, some features, structures, or characteristics of one or more embodiments in the present disclosure may be appropriately combined.

In addition, those skilled in the art may understand that various aspects of the present disclosure may be illustrated and described through several patentable categories or situations, including any new and useful processes, machines, products or combinations of materials or any new and useful improvements to them. Accordingly, all aspects of the present disclosure may be performed entirely by hardware, may be performed entirely by software (including firmware, resident software, microcode, etc.), or may be performed by a combination of hardware and software. The above hardware or software may be referred to as "data block", "module", "engine", "unit", "assembly" or "system". In addition, aspects of the present disclosure may appear as a computer product located in one or more computer-readable media, the product including computer-readable program code.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various assemblies described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

We claim:

1. An acoustic device, comprising:

a shell including a first accommodation cavity;

a speaker configured in the first accommodation cavity, the speaker including: one or more magnetic circuit assemblies, a voice coil, a vibration assembly, and a vibration transmission plate; the one or more magnetic circuit assemblies forming a magnetic gap; one end of the voice coil being arranged in a magnetic gap, the vibration assembly being connected with the vibration transmission plate, the vibration transmission plate being connected with the shell; wherein the vibration assembly includes an inner support, an outer support, and a vibration diaphragm;

another end of the voice coil is connected with the inner support;

one end of the outer support is physically connected with both sides of the one or more magnetic circuit assemblies;

the vibration diaphragm is physically connected with the inner support and the outer support to limit a relative movement of the inner support and the outer support in a first direction; the first direction being a radial direction of the first accommodation cavity;

at least one of the inner support, the outer support, or the vibration diaphragm is connected with the vibration transmission plate to transmit vibration to the vibration transmission plate.

2. The acoustic device of claim 1, wherein:

the outer support and the inner support are movably connected with the vibration diaphragm to limit the relative movement of the outer support and the inner support in the first direction and allow a movement of the inner support and the vibration diaphragm relative to the outer support in a second direction; the second direction being an extension direction of the inner support and the outer support.

3. The acoustic device of claim 2, wherein:

a first convex column is configured on another end of the outer support, the vibration diaphragm has a first through hole, the first convex column movably connects the vibration diaphragm through the first through hole.

4. The acoustic device of claim 2, wherein:

one end of the inner support is configured with a second convex column, the vibration diaphragm has a second through hole, the second convex column movably connects the vibration diaphragm through the second through hole.

5. The acoustic device of claim 4, wherein:

the speaker further includes an elastic shock absorber arranged between the vibration transmission plate and the one end of the inner support to slow down vibration of the inner support in the second direction.

6. The acoustic device of claim 5, wherein:

the second convex column includes a first column section and a second column section physically connected with the first column section, the second column section is configured above the first column section; the first column section is configured to pass through the second through hole, the second column is inserted in the vibration transmission plate;

the elastic shock absorber has a third through hole, the elastic shock absorber is sleeved on the second column section through the third through hole, and is supported on the first column section.

7. The acoustic device of claim 1, further including: a protection element;

the protection element includes a fitting part, an accommodation part, and a supporting part, and the fitting part and the accommodation part form a second accommodation cavity;

the vibration transmission plate is configured in the second accommodation cavity, the fitting part is fitted on an outer end surface of the vibration transmission plate, and the supporting part is connected with the second accommodation cavity, and arranged above the shell.

8. The acoustic device of claim 7, wherein:

an inner wall of the shell is configured with an annular bearing platform to support the supporting part and an elastic shock absorber.

9. The acoustic device of claim 1, wherein:

the one or more magnetic circuit assemblies include a set of magnetic elements and a magnetic conduction cover;

the magnetic conduction cover includes a cover bottom, a cover side, and a cylinder groove, the cylinder groove is formed by the cover bottom and the cover side;

the set of magnetic elements are configured in the cylinder groove and form the magnetic gap with the magnetic conduction cover.

10. The acoustic device of claim 1, wherein:

the one or more magnetic circuit assemblies include a first magnetic circuit assembly and a second magnetic circuit assembly, the second magnetic circuit assembly surrounds the first magnetic circuit assembly to form the magnetic gap;

the first magnetic circuit assembly includes a first magnetic element and a second magnetic element, a magnetic field strength of a total magnetic field generated by the one or more magnetic circuit assemblies in the magnetic gap is greater than a magnetic field strength of the first magnetic element or the second magnetic element in the magnetic gap.

11. The acoustic device of claim 10, wherein an angle between magnetization directions of the first magnetic element and the second magnetic element is between 150° and 180°.

12. The acoustic device of claim 10, wherein the magnetization directions of the first magnetic element and the second magnetic element are both perpendicular to or parallel with a vibration direction of the voice coil in the magnetic gap.

13. The acoustic device of claim 10, wherein:

the second magnetic circuit assembly includes a third magnetic element, the first magnetic circuit assembly includes a first magnetic conduction element;

the first magnetic conduction element is arranged between the first magnetic element and the second magnetic element, and at least a part of the third magnetic element surrounds the first magnetic element and the second magnetic element.

14. The acoustic device of claim 13, wherein: a magnetization direction of the first magnetic element and a magnetization direction of the second magnetic element are perpendicular to a connection surface between the first magnetic element and the first magnetic conduction element, and the magnetization directions of the first magnetic element and the second magnetic element are opposite.

15. The acoustic device of claim 13, wherein: an angle between a magnetization direction of the third magnetic element and a magnetization direction of the first magnetic element or the second magnetic element is between 60° and 120° or between 0° and 30°.

16. The acoustic device of claim 10, wherein:

the second magnetic assembly includes a first magnetic conduction element and the first magnetic assembly includes a second magnetic conduction element;

the second magnetic conduction element is configured between the first magnetic element and the second magnetic element; at least a portion of the first magnetic conduction element surrounds the first magnetic element and the second magnetic element.

17. The acoustic device of claim 16, wherein: a magnetization direction of the first magnetic element and a magnetization direction of the second magnetic element are perpendicular to a connection surface between the first magnetic element and the second magnetic conduction element, and the magnetization direction of the first magnetic element and the magnetization direction of the second magnetic element are opposite.

18. The acoustic device of claim 16, wherein: the second magnetic conduction element surrounds the first magnetic element, the first magnetic element surrounds the second magnetic element.

19. The acoustic device of claim 16, wherein: an upper surface of the second magnetic conduction element is connected with a lower surface of the first magnetic element, a lower surface of the second magnetic conduction element is connected with an upper surface of the second magnetic element.

* * * * *